United States Patent [19]
Redford et al.

[11] Patent Number: 5,957,695
[45] Date of Patent: Sep. 28, 1999

[54] STRUCTURE AND METHOD FOR DISPLAYING COMMERCIALS AND SENDING PURCHASE ORDERS BY COMPUTER

[75] Inventors: Peter M. Redford, Los Gatos; Donald S. Stern, San Jose, both of Calif.

[73] Assignee: TV Interactive Corporation, San Jose, Calif.

[21] Appl. No.: 08/601,936

[22] Filed: Feb. 15, 1996

Related U.S. Application Data

[62] Division of application No. 08/269,492, Jul. 1, 1994, Pat. No. 5,624,265.

[51] Int. Cl.$^6$ ...................................................... G09B 5/00
[52] U.S. Cl. ..................... 434/307 R; 434/118; 434/365; 380/24; 340/825.33; 455/4.2
[58] Field of Search ..................................... 434/118, 16 P, 434/307 R, 308, 317, 365; 348/6, 10, 12, 13, 734; 455/3.1, 5.1, 6.1, 6.2, 4.2; 340/825.22, 825.24, 825.25, 825.37, 825.55, 825.6 P, 825.72, 825.76, 825.33; 379/93.24, 93.13, 93.12, 93.19, 100.08; 380/24, 30

[56] References Cited

U.S. PATENT DOCUMENTS

| | | |
|---|---|---|
| 2,900,446 | 8/1959 | McLaughlin et al. . |
| 2,907,824 | 10/1959 | Peek, Jr. . |
| 3,005,050 | 10/1961 | Koenig, Jr. . |
| 3,304,612 | 2/1967 | Proctor et al. . |
| 3,308,253 | 3/1967 | Krakinowski . |

(List continued on next page.)

FOREIGN PATENT DOCUMENTS

| | | |
|---|---|---|
| 0 222 919 A1 | 5/1987 | European Pat. Off. . |
| 61-137797 | 6/1986 | Japan . |
| 63-213016 | 9/1988 | Japan . |
| 104699 | 4/1992 | Japan . |
| 1120526 | 7/1968 | United Kingdom . |

OTHER PUBLICATIONS

"Key Firms Launching Digital Video Disks Reach Licensing Pact", *The Wall Street Journal*, Sep. 16, 1996, p. B7.
Search Report "Exhibit A", 37 pgs.
Search Report "Exhibit B" 48 pgs.
"LaserMouse Receiver Chip", TVI701, TV Interactive Corporation, 1 page believed to be prior to Jul. 1, 1994.
"TVIQ™Remote Control Transmiter", TVI701, TV Interactive Corporation, 1 page, believed to be prior to Jul. 1, 1994.
"Membrane Switch Products", EECO Incorporated, 1985, 8 pgs.
"Microsoft Windows Device Kit", Version 3.1, Microsoft, 1985–1992, Chapter 11, pp. 1–8.

(List continued on next page.)

*Primary Examiner*—Joe H. Cheng
*Attorney, Agent, or Firm*—Skjerven, Morrill, MacPherson, Franklin & Friel LLP; Omkar K. Suryadevara; Glen B. Choi

[57] ABSTRACT

In accordance with this invention, a remote control for an interactive media can include a printed publication and/or a storage media and/or a data button. One embodiment of a remote control includes a printed publication (such as a book, magazine or a catalog) and one or more buttons physically attached to the printed publication to allow users to remotely control use of associated electronic content by a host device. Another embodiment of a remote control has a housing capable of removably holding a storage media encoded with electronic content associated with a button of the remote control. Yet another embodiment of a remote control has at least one data button which permits the user to select the data to be displayed by the host device. An autostart driver in the host device detects insertion of a storage media into a peripheral and automatically starts an application. The application interprets button codes transmitted by the remote control and displays the results or initiates other events. An application development system allows an author to quickly create interactive media applications.

49 Claims, 38 Drawing Sheets

U.S. PATENT DOCUMENTS

| | | |
|---|---|---|
| 3,470,538 | 9/1969 | Harbaugh . |
| 3,522,664 | 8/1970 | Lambright et al. . |
| 3,541,541 | 11/1970 | Engelbart . |
| 3,591,718 | 7/1971 | Asamo . |
| 3,593,115 | 7/1971 | Dym et al. . |
| 3,662,105 | 5/1972 | Hurst et al. . |
| 3,699,439 | 10/1972 | Turner . |
| 3,705,956 | 12/1972 | Dertourzos . |
| 3,798,370 | 3/1974 | Hurst . |
| 3,806,912 | 4/1974 | Eckert . |
| 3,885,097 | 5/1975 | Pobgee . |
| 3,906,197 | 9/1975 | Grover . |
| 3,911,215 | 10/1975 | Hurst et al. . |
| 3,959,585 | 5/1976 | Mattes et al. . |
| 4,022,971 | 5/1977 | Rodgers . |
| 4,071,691 | 1/1978 | Pepper, Jr. . |
| 4,079,194 | 3/1978 | Kley . |
| 4,102,067 | 7/1978 | Tarrant . |
| 4,124,888 | 11/1978 | Washburn . |
| 4,126,760 | 11/1978 | Gordon . |
| 4,149,029 | 4/1979 | Pobgee . |
| 4,208,648 | 6/1980 | Naumann . |
| 4,214,122 | 7/1980 | Kley . |
| 4,222,188 | 9/1980 | Tarrant et al. . |
| 4,286,399 | 9/1981 | Funahashi et al. . |
| 4,289,925 | 9/1981 | Lambden . |
| 4,291,303 | 9/1981 | Cutler et al. . |
| 4,293,734 | 10/1981 | Pepper, Jr. . |
| 4,299,041 | 11/1981 | Wilson . |
| 4,313,113 | 1/1982 | Thornurg . |
| 4,315,238 | 2/1982 | Eventoff . |
| 4,319,078 | 3/1982 | Yokoo et al. . |
| 4,363,081 | 12/1982 | Wilbur . |
| 4,444,998 | 4/1984 | House . |
| 4,455,450 | 6/1984 | Margolin . |
| 4,484,026 | 11/1984 | Thornburg . |
| 4,488,179 | 12/1984 | Kruger et al. . |
| 4,497,126 | 2/1985 | Dejean . |
| 4,503,286 | 3/1985 | Kubo et al. . |
| 4,564,079 | 1/1986 | Moore et al. . |
| 4,570,149 | 2/1986 | Thornburg et al. . |
| 4,581,483 | 4/1986 | Ralston . |
| 4,587,378 | 5/1986 | Moore . |
| 4,607,747 | 8/1986 | Steiner . |
| 4,614,266 | 9/1986 | Moorhead . |
| 4,703,573 | 11/1987 | Montgomery et al. . |
| 4,716,543 | 12/1987 | Ogawa et al. . |
| 4,736,356 | 4/1988 | Konshak . |
| 4,739,299 | 4/1988 | Eventoff et al. . |
| 4,740,912 | 4/1988 | Whitaker ................................ 345/353 |
| 4,742,485 | 5/1988 | Carlson et al. . |
| 4,810,992 | 3/1989 | Eventoff . |
| 4,855,725 | 8/1989 | Fernandez . |
| 4,866,522 | 9/1989 | Beckley . |
| 4,866,865 | 9/1989 | Yang . |
| 4,884,974 | 12/1989 | DeSmet . |
| 4,897,511 | 1/1990 | Itaya et al. . |
| 4,920,432 | 4/1990 | Eggers et al. . |
| 4,926,255 | 5/1990 | Von Kohorn . |
| 4,951,249 | 8/1990 | McClung et al. . |
| 4,963,702 | 10/1990 | Yaniger et al. . |
| 4,963,876 | 10/1990 | Sanders et al. . |
| 4,966,285 | 10/1990 | Otake et al. . |
| 4,974,085 | 11/1990 | Campbell et al. . |
| 4,990,092 | 2/1991 | Cummings . |
| 5,008,497 | 4/1991 | Asher . |
| 5,008,662 | 4/1991 | Tokizane et al. . |
| 5,053,945 | 10/1991 | Whisler . |
| 5,063,698 | 11/1991 | Johnson et al. . |
| 5,073,931 | 12/1991 | Audebert et al. . |
| 5,093,718 | 3/1992 | Hoarty et al. . |
| 5,101,490 | 3/1992 | Getson, Jr. et al. . |
| 5,120,230 | 6/1992 | Clark et al. . |
| 5,132,992 | 7/1992 | Yurt et al. . |
| 5,146,353 | 9/1992 | Isoguchi et al. . |
| 5,148,419 | 9/1992 | Koguchi . |
| 5,188,533 | 2/1993 | Wood . |
| 5,189,237 | 2/1993 | Koguchi . |
| 5,213,337 | 5/1993 | Sherman . |
| 5,233,333 | 8/1993 | Borsuk . |
| 5,233,423 | 8/1993 | Jernigan et al. . |
| 5,235,328 | 8/1993 | Kurita . |
| 5,245,171 | 9/1993 | Fox et al. . |
| 5,250,789 | 10/1993 | Johnson ................................ 705/14 |
| 5,257,388 | 10/1993 | Hayamizu . |
| 5,275,285 | 1/1994 | Clegg . |
| 5,287,224 | 2/1994 | Tsuchiya et al. . |
| 5,299,181 | 3/1994 | Koguchi . |
| 5,319,455 | 6/1994 | Hoarty et al. . |
| 5,335,079 | 8/1994 | Yuen et al. . |
| 5,336,870 | 8/1994 | Hughes et al. . |
| 5,363,487 | 11/1994 | Willman et al. . |
| 5,377,269 | 12/1994 | Heptig et al. . |
| 5,419,705 | 5/1995 | Sandvik . |
| 5,440,244 | 8/1995 | Richter et al. . |
| 5,457,780 | 10/1995 | Shaw et al. . |
| 5,464,092 | 11/1995 | Seeley . |
| 5,524,193 | 6/1996 | Covington et al. ................ 707/512 |
| 5,530,960 | 6/1996 | Parks et al. . |
| 5,551,905 | 9/1996 | Billings et al. . |
| 5,574,519 | 11/1996 | Manico et al. . |
| 5,645,432 | 7/1997 | Jessop . |
| 5,703,795 | 12/1997 | Mankovitz ............................ 363/21 |
| 5,724,424 | 3/1998 | Gifford ................................ 380/24 |
| 5,759,101 | 6/1998 | Von Kohorn ........................ 463/40 |

OTHER PUBLICATIONS

SyQuest, SQ555, SQ51110 and SQ5110C Removable Cartridge Disk Drive, Hardware Installation User's Guide, pp. i–viii, and 3–1 to 3–8.

"Developer Network", Microsoft Development Library, Oct. 1994.

Glaskowsky, Peter N., "PCs Head Toward Appliance Status," Microdesign Resources, Microprocessor Report, May 6, 1996, pp. 12–14.

Thompson, M., "Advances in Passive Infrared Sensors Based on Pyroelectric Polymer Films," Presented at the 1991 Sensors Conference, Chicago, IL, Oct., 1991, pp. 1–20.

"Summary of Operating Properties: DT1–028K", Appln. Spec. 114–1801, Aug. 01, 1993, Rev. A, pp. 1–6, AMP Incorp.

"Piezo Film Component Design Kits", Cat. 65715, Rev. Sep. 1993, pp. 1–2, AMP Incorp.

"Piezo Film Sensors, Product Summary and Price List", Aug. 1, 1993, Rev. A, pp. 1–4, Amp Incorp.

"Passive Infrared Module (PIRM)", Cat. 65774, Aug. 1993, pp. 1–2, Amp Incorp.

"PIRL 180–100 Passive Infrared Detector", Cat. 65776, Dec. 1993, pp. 1–2, Amp Incorp.

"PIRL 180–100 Amplifier Schematic", Instruction Sheet 408–9950, Aug. 1, 1993, 1 page, Amp Incorp.

"Passive Infrared Sensor Design Tips", Appln. Note 65753, Aug. 1, 1993, Rev. A., pp. 1–2, Amp Incorp.

"Standard Products for Many Applications" (piezo film sensors), 6 pages, believed to be prior to 1997, Amp Incorp.

"Create Your Own Sensor, Use this free sample of Piezo Film to demostrate some of the film's principles," 1 page, believed to be prior to 1997, Amp Incorp.

Sensory Inc., "RSC–164, Recognition • Synthesis • Control," From the *Interactive Speech*™ Line of Products, © 1995 Sensory Inc., 8 pages.

Sharp, "PT460/PT460F/PT461F/PT465F Double–end Type Phototransistor", pp. 234, 235 and 238, believed to be prior to 1997.

Advertisment for Casio Portable CD Player, Model PZ–830, 1 page, believed to be prior to 1997.

GIST, "www.GIST. com. . . . connecting TV & the Internet," <http://www.the GIST.com/>, Copyright ©1996 GIST Communications, Inc. Dec. 2, 1996, pp. 1–3.

Microsoft, "OnNow and ACPI: Introduction and Specifications," <http://www.microsof . . . /pcfuture/ONNOW.HTM.> ©1996 Microsoft Coporation, Nov. 22, 1996, pp. 1–3.

Microsoft, "SIPC: Introduction to Simply Interactive PC," <http://www.microsof . . . V/pcfuture/sipc.htm> ©1996 Microsoft Corporation, Nov. 22, 1996, pp. 1–3.

VideoGuide, "Welcome to Video Guide," <http://www.vgi.com/>, Copyright ©1995–1996 VideoGuide Inc., Oct. 11, 1996, 16 pages.

Brochure, "Micropad", Micropad Ltd., 1981, one page.

"Analog data Tablet"J. F. Hevesi, IBM Technical Disclosure Bulletin, vol, 23, No. 2, Jul. 1980, pp. 666–667.

"Switches, Special Advertising Section", Electronics, Jul. 12, 1984, p. SW–6.

"PC–MS DOS 4.0 for Hard Disk Users", David D. Busch, Bantam Books, 1989, pp. 27–32 and 141–163.

Hamm, Steve, "The Full–Figured PC", *PC Week*, Prior to Jun. 1996.

Curran, Lawrence J., "Video Networks Poised for Commercial Service", *EDN*, Jun. 22, 1995, pp. S–20, S–22 and S–23.

Manes, Stephen, "Destination Computer/TV Not Ready for Prime Time", *San Jose Mercury News*, May 19, 1996, 1 page.

Rupley, Sebastian, "The Simple PC", *PC Magazine*, May 28, 1996, p. 31.

Slater, Michael, "Universal Serial Bus to Simplify PC I/O", *Microprocessor Report*, vol. 9, No. 5, Apr. 17, 1995, pp. 1, 6–9.

"Attaching and IBM Dock I or Dock II Expansion Unit", ThinkPad 760E/760ED Use's Guide, First Ed. (Apr. 1996), p. 199.

"CDU33A Double Speed Series, CD–ROM Drive Unit" User's Guide, prior to Jun. 1996, pp. 8–25.

"Resources", *Microprocessor Report*, Dec. 25, 1995, p. 24.

"Literature Watch", *Microprocessor Report*, May 30, 1995, p. 22.

"Literature Watch", *Microprocessor Report*, May 6, 1995, p. 24.

"Resources", *Microprocessor Report*, Jul. 10, 1995, p. 24.

"TES3/GES3 Hardware Manual", *norpak corporation*, Nov. 10, 1995, pp. 1–1, 2–1–2–9, 3–1–3–2, 4–1 and 4–2.

"TES3 EIA–516 NABTS Data Broadcast Encoder Software User's Manual", *norpak corporation*, Feb. 14, 1996, pp. 1, 3–13 and 15–19.

"DVD Main Specifications", *Philips Electronics N.V.*, 1996, 2 pages.

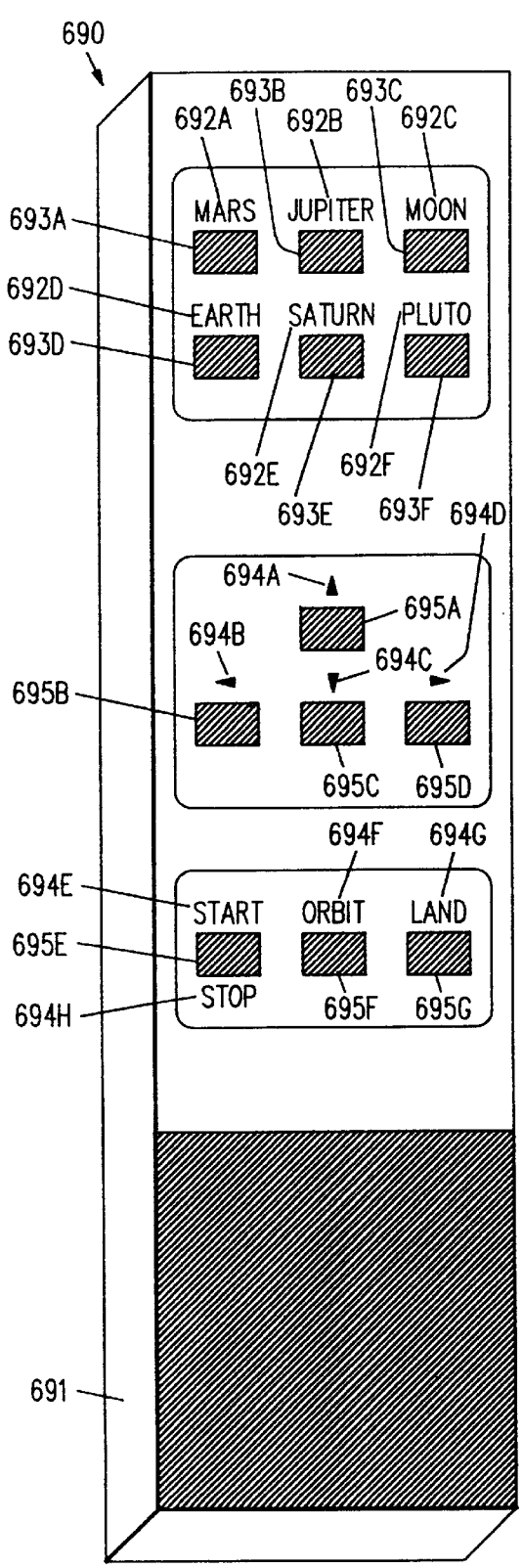
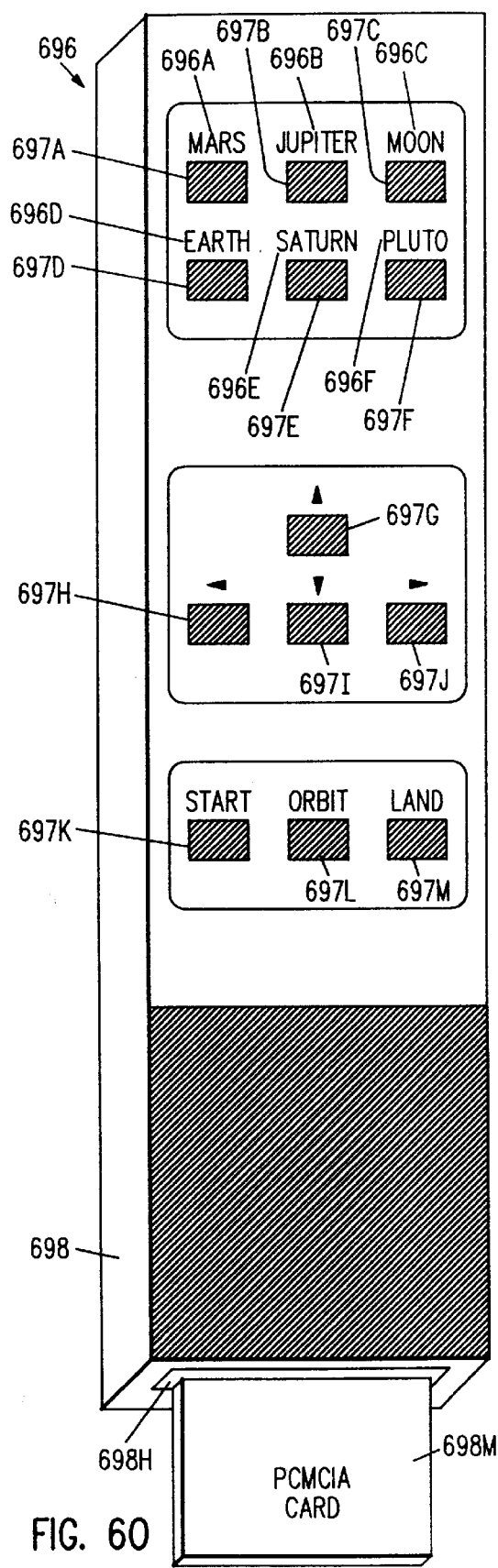
FIG. 6N
FIG. 6O

STRUCTURE AND METHOD FOR DISPLAYING COMMERCIALS AND SENDING PURCHASE ORDERS BY COMPUTER

CROSS-REFERENCE TO RELATED APPLICATION

This application is a divisional application of U.S. patent application Ser. No. 08/269,492, filed Jul. 1, 1994, now U.S. Pat. No. 5,624,265.

CROSS REFERENCE TO MICROFICHE APPENDIX

Appendix A, which is a part of the present disclosure, is a microfiche appendix consisting of one sheet of microfiche having a total of 29 frames. Microfiche Appendix A is a listing of computer programs and related data for a remote control based on the 6805K1 microprocessor, which is described more completely below.

Appendix B, which is a part of the present disclosure, is a microfiche appendix consisting of one sheet of microfiche having a total of 21 frames. Microfiche Appendix B is a listing of computer programs and related data for a touch panel remote control, which is described more completely below.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates to an apparatus and method for wireless remote control and use of interactive media and in particular to a remote control including a printed publication and/or a storage media and/or a data button.

BACKGROUND

Today's multimedia devices have sophisticated digital sound and full motion video capabilities which make such devices very suitable for entertainment and educational applications in users' homes. The contents of many printed books are now commercially available as multimedia books and applications encoded in CD-ROMs. Unfortunately, using a multimedia book or application on a host device is not simple at all.

Most of today's multimedia books lack the feel of printed books and cannot easily be categorized as books on a bookstore shelf. Children, the main targets of multimedia books, usually cannot use such books without adult help. Today's multimedia books have the feel and ease of use of ordinary computer programs. A significant level of computer knowledge is required to "read" a multimedia book, typically by using input devices such as a mouse, computer keyboard or game controller.

For example, to use a CD-ROM based multimedia book, the user must do the following on an IBM PC host device:
1. Start the Windows operating environment;
2. Insert the CD-ROM into the drive;
3. Find the appropriate icon and double click on the icon, or,
   If the icon is not available, use the File Manager's menu to select "File" and "Run" and then type the name of the executable file such as "WP", followed by the Enter key.

The above procedure is not simple for anyone other than experienced Windows users. A similar procedure must be followed for a Macintosh host device.

Although in using a game platform such as 3DO platform or a Sega platform it is considerably simpler to start an application, the user is required to toggle the power switch after insertion of a game cartridge, which can be a significant task for a two year old child. A similar toggling of power switch is required for boot-up diskettes for personal computers. Toggling of the power switch forces a user to wait for the personal computer or game platform to go through the boot-up sequence which can last for typically 20 to 30 seconds. Moreover, the user must know that merely inserting a CD-ROM into a peripheral is not enough and that some button must be toggled or pressed. Also, the user must know the specific button on the host device such as a power switch or CTL-ALT-DEL for an IBM PC.

Although some host devices automatically check a disk drive for a file of commands to be run, such checking is done only during power up for booting the operating system. Once a host device has been powered up and is running the operating system, the user must manually start an application (for example by clicking the mouse on an icon or by typing commands such as "MSINSTR"). After the application has started, the user must know and remember the commands necessary to perform various functions of retrieval and display, the names of data accessible by the host device and must make the associations between the commands, functions and data. Another problem with today's multimedia books is that book authors find it difficult to turn ideas for children's books into products because of the inherent complexity of a multimedia book development process.

Remote controls for television (TV) are well known in the art. Conventional TV remote controls have a rectangular box shape and have function buttons which can cause the TV to switch to a desired channel. However, a user must find out the programs available for viewing (for example by consulting a TV guide to find a desired program), remember the associated channel number and then switch to the desired channel by pressing the appropriate function button on the remote control.

Children's sound books are well known in the art. Such children's sound books have a button which when pressed plays a sound locally from a speaker embedded in the sound book and electrically connected to the button.

SUMMARY OF THE INVENTION

In accordance with this invention, a remote control for interactive media (henceforth "remote control"), includes remote control circuitry and one or more feature(s) from: a printed publication (such as a book, magazine or a catalog), a storage media holder and a data button. A printed publication remote control in accordance with this invention includes a printed publication having printed content and one or more button(s) connected to a remote control circuitry which allows users to remotely control use of associated electronic content by a host device.

In accordance with this invention, the remote control circuitry is capable of transmitting a wireless signal to a host device wherein an application running on the host device displays the desired results. The button(s) of the remote control have a visual association with text and/or graphic content on the remote control. The text and/or graphic content and the associated electronic content have a representative (descriptive and/or derivative) association (such as the association between a title or abstract and the electronic content associated with the title or abstract). The associated electronic content and the button(s) have a remote electronic association implemented through a wireless signal encoded with a button code. There is a correspondence between the representative association and the remote electronic association such that the function and/or data indicated by the text and/or graphic content visually associated with the pressed button is used by a host device in displaying associated electronic content. Such a unique combination of printed publication, associated electronic content and one or more button(s) into a single remote control allows the button(s) to be customized depending on the content of the associated electronic content.

In one embodiment of this invention, the associated electronic content is encoded in one or more remote storage media and accessed through a remote server although the associated electronic content is an integral part of the remote control. Such a remote control allows a user to simply push a button on the remote control to cause the host device to access electronic content from a remote server.

In an alternative embodiment, the associated electronic content is encoded in and accessed from a local storage media (such as, for example, a compact disk (CD), a game cartridge, a floppy disk and a memory card). Such a local storage media can be removably mounted in a holder physically attached to the printed publication in accordance with this invention. The storage media can be inserted into a suitable peripheral of a host device (such as a personal computer, a game machine or interactive television). The additional cost of a storage media is comparable to the costs associated with connect charges and the communication hardware and software necessary for communications between the host device and a remote server.

In one embodiment of this invention, one and only one button is provided in the remote control. The remote control includes a normal book's front cover, a normal book's back cover, both made of cardboard and a single button bound into the back cover. In one specific embodiment, a CD-ROM holder (with a CD-ROM) is physically attached to or integrated into and forms the back cover of the remote control.

In accordance with this invention, an application's use of associated electronic content (of local or remote storage media) is controlled by pressing a button on the remote control. In one embodiment, pressing a button causes the host device to retrieve the associated electronic content for the next page and display the results of retrieval or appear to the user to "turn" the page (or initiate other actions). A remote control having a single button allows pre-school children to enjoy using associated electronic content or a host device remotely from a distance without need for parental assistance because of simplicity of use.

In one embodiment of this invention the button on the remote control is a large button which encloses all the necessary remote control circuitry in a self-contained unit. In another embodiment of this invention, several buttons are mounted on a printed circuit board (PCB) integrated into the housing.

Multiple button remote controls permit a wide variety and range of interactivity with a host device. In one embodiment, a remote control has four buttons each button being visually associated with text and/or graphics which have a representative descriptive and/or derivative association with the associated electronic content of a next page, a previous page, beginning (for example a front cover) and end (for example, a back cover). Such a remote control is idiot proof and can be easily used by pre-school children.

When a user pushes on the surface of a button on a remote control in accordance with this invention, a microcontroller in the remote control wakes up and sends a button code by pulsing an infrared LED. The infrared pulse is received by an infrared receiver connected to a host device microcomputer which interprets the button code to perform the indicated function and/or retrieve the indicated data and display the desired results. Single button control of an application allows even pre-school children to use selections of interactive media accessed via a remote server or from local storage media (such as CD's included in some remote control embodiments).

In one embodiment, the host device is configured with an autostart driver which starts an application for interpreting button codes from the remote control. The application can access associated electronic content from a remote server or from a local storage media on receipt of a button code from the remote control. Hence, soon after a button on the remote control is pressed, the title screen of the interactive media is displayed by the host device.

An autostart driver in a host device equipped with appropriate communications hardware and software can be triggered on receipt of a button code to start communicating with a remote server. In the embodiment of the remote control including a removable storage media, the host device autostart driver, on finding a storage media of a remote control in a local peripheral, checks the inserted storage media for a file of a first predetermined name. If the file of the first predetermined name exists, the autostart driver automatically executes the file which in turn starts the appropriate application. The application automatically displays the title screen on the monitor of the host device.

Therefore when the autostart driver is installed in a host device, compatible applications start up automatically, as soon as a storage media is inserted into the drive. Automatic start-up of an application on insertion of a storage media allows even pre-school children to use applications encoded on a storage media without adult supervision. Therefore using an interactive media in accordance with this invention is made as simple as playing a video cassette recorder (VCR) tape, and even pre-school children can "read" interactive media without adult supervision.

In one embodiment, the same button can indicate a first function/data and alternatively indicate a second function/data at different points during display of electronic contents of an interactive media depending on the specific programming of the application. In such an embodiment, each of such buttons is visually associated with alternative text/graphic content having a representative association with functions and/or data code selections of the associated electronic content.

A storage media remote control in accordance with this invention includes a housing having human understandable content and a shape and size capable of removably holding a storage media. A storage media is removably but securely held in the housing. Encoded in the storage media is associated electronic content which has a representative (descriptive and/or derivative) association with the human understandable content of the housing.

One embodiment of a storage media remote control has the form of a CD box with a number of buttons having a remote electronic association with music video selections encoded in a CD removably mounted in the CD box. Buttons on the housing have a visual association with names of music video selections encoded in the CD. Touching a button causes an application running in a host device to retrieve the desired music video selection from the CD and display the retrieved results. In an alternative embodiment, instead of music video selections, music audio selections are encoded in the CD.

Another embodiment of a storage media remote control has the form of a conventional magazine (henceforth "periodical" remote control). The periodical remote control has a normal magazine front cover and a normal magazine back cover and embedded in the front cover and back cover are several buttons which have a visual association with the printed content of the front cover and back cover. Furthermore, there is a remote electronic association between the buttons in the housing and the associated electronic content encoded in the CD-ROM. Touching a button causes a video recording identified by the text and graphic content to be displayed on a monitor of a host device. In one embodiment of a periodical remote control, membrane buttons are used to identify the desired associated electronic content. In another embodiment, the front and back covers each form flexible touch panel surfaces which permit the X and Y coordinates of the touched location to be determined and thereby identify the desired associated electronic content.

A data button remote control in accordance with this invention includes a housing having data selecting text and/or graphic content visually associated with a data button, wherein the data button has a remote electronic association with data specific associated electronic content accessible by a host device. The data specific associated electronic content is electronic content which includes data which has a data selecting descriptive and/or derivative association with the data selecting text and/or graphic content of the housing. Therefore a data button in accordance with this invention allows a user to remotely select a desired selection from one or more selections accessible by a host device.

One embodiment of a data selecting remote control is a picture book remote control for children which has four buttons, each button being associated with printed text/graphic content of an object (such as, for example, a train) which has a video recording selection accessible by the host device. Pressing a button causes the application to display a video recording selection of the desired object (such as a train button for a train video).

The periodical remote control described above is another embodiment of a data selecting remote control.

Yet another embodiment of a data selecting remote control has a housing in the shape and size of a globe with membrane buttons attached to the housing, one button on each continent and a video recording selection accessible by the host device. Touching any of the buttons causes a video recording selection on the visually associated continent to be displayed on the host device.

Yet another embodiment of a data selecting remote control has a rectangular box housing with content representative of a component of the solar system such as "Mars" and "Jupiter" visually associated with corresponding buttons and solar system component selections accessible by a host device. Pressing one of these buttons causes the selected solar system component selection to be used in a video game software.

An application development system in accordance with this invention allows an author (such as a book writer or an artist) to quickly create interactive applications for children. For example, to create a picture book remote control, the author needs to (1) draw pictures, scan them and store them (2) write captions and store them (3) record sounds and store them and (4) run a compiler engine to generate a run file. Such a simple application development system allows even a person with rudimentary computer knowledge to author applications for remote controls for multimedia books, magazines or audio/video compact disks.

BRIEF DESCRIPTION OF THE DRAWINGS

FIGS. 6N and 6O illustrate two embodiments of a data button remote control for an orbiter simulator with text content for various environments such as Mars, Jupiter, Moon, Earth, Saturn and Pluto.

DETAILED DESCRIPTION

Figure 1A:
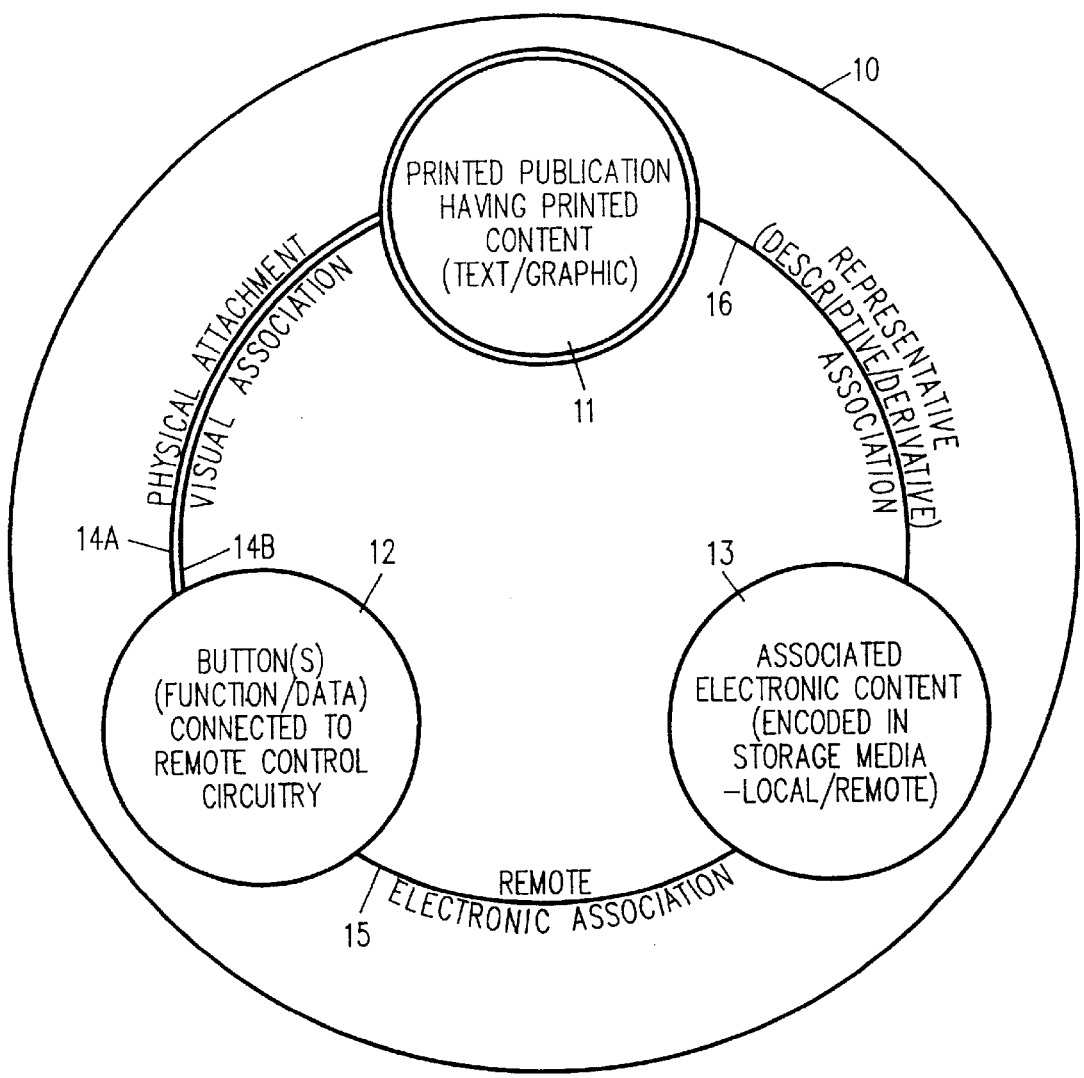
FIG. 1A illustrates a printed publication remote control in accordance with this invention.

In accordance with this invention, a remote control for interactive media includes one or more of the following feature(s): a printed publication, a storage media holder and a data button.

A printed publication remote control includes a printed publication (such as a book, a periodical, a catalog, a brochure, a postcard, a flyer, a calendar and a document) having human understandable printed text and/or graphic content which is visually associated with one or more buttons attached to the printed publication such that the button(s) allow users to automatically start-up and remotely control use of associated electronic content by a host device.

A storage media remote control includes buttons physically attached to a housing having a shape and size capable of removably holding a storage media. A storage media removably but securely held in the housing is encoded with associated electronic content which have a descriptive and/or derivative association with the text and/or graphic content of the housing and remote electronic associations with the buttons of the storage media remote control.

A data button remote control has a data button physically attached to a housing having data selecting text and/or graphic content visually associated with the data button. The data button has a remote electronic association with data specific associated electronic content.

As used herein, the term "host device" is intended to mean any device which can display to the user associated electronic content encoded in remote and/or local storage media. The host device can be equipped with a peripheral suitable for retrieving associated electronic content encoded in a local storage media. Also, the host device can be equipped with communications hardware and software suitable for retrieving associated electronic content encoded in a remote storage media through a remote server. In accordance with this invention, a host device can be any IBM personal computer (or clone), Macintosh computer, 3DO platform, Sega platform, and an interactive television set top.

As used herein, the term "storage media" is intended to mean media for storing digital data and/or code such as optical disks (for example compact disks (CDs)), flexible disks (for example 5¼ floppy disks), rigid disks (for example hard disks), tapes, game cartridges, memory cards (for example PCMCIA card) or any other media suitable for use in a host device. The term storage media includes such structures and any other structure which performs the function of information storage. In one embodiment the storage media is removable from a host device although other storage media (for example on a remote server) can also be used in accordance with this invention.

Rather than buttons, alternatively any one of a number of identifying mechanisms can be used (such as the well-known "koala pad" structure or a touch panel) which allows the user to transmit a signal to pull up associated electronic content. The enclosed description is not intended to limit the types of identifying mechanisms which can be used to pull up the desired contents on the storage media but rather it could be illustrative of such mechanisms. Rather than a touch sensitive device even a wand or a pointer can be used in a remote control to identify the desired electronic content to be displayed by a host device.

In accordance with this invention, associated electronic content include selections which can contain information found in a conventional printed publication such as book, magazine, catalog or other printed document. As used herein, the term "selection" is intended to mean data and/or code and includes a grouping or combination of one or more files such as software, still graphics, picture, text, audio recording, video recording or other data related to one another, suitable for display by a host device. For example, a selection can include the multimedia equivalent of a magazine article or a television program or a digitized song or a video game software program or a spread sheet for financial information. While in one embodiment, data and/or code selections are in multimedia form suitable for use in a multimedia host device, a single media host device can also be used with suitable selections in accordance with this invention.

As used herein, the term "interactive media" is intended to mean any communication media with which a user can interact such as a computer, an interactive television and a video game machine.

As used herein, the term "category" is intended to mean one or more selections which have some common characteristic. Examples of categories are "fish" and "birds". A fish category can contain selections of audio and/or video recordings and text captions relating to, for example, 200 different fish. Another example of a category is a "rock and roll music" category encoded on audio CD, the audio CD containing 20 selections of music, each music selection being representative of rock and roll music.

As used herein, the term "application" is intended to mean code and/or data which interprets button codes from a remote control. Applications run on host devices. Applications can include selections or alternatively selections and applications can be distinct entities. In one embodiment of this invention applications are distributed to users on storage media housed in a remote control. In one specific embodiment of this invention, an application and associated selections are all integrated into a single executable (such as BUSWEEK.EXE described below). In an alternative embodiment of this invention, applications for retrieving and displaying selections are distributed to users independent of the storage media containing the selections. Applications and/or selections can be distributed to users and accessed by a host device through various communication channels such as phone lines, TV cable and/or satellite link.

An application in accordance with this invention, includes code which interacts with the user regardless of whether the code is created using a high level presentation development system or is hard coded using a programming language such as C. Furthermore, an application can include either a small run time engine or a larger presentation development software for displaying multimedia selections. In accordance with this invention, an application and/or selection can reside on removable local storage media and/or the host device's storage media and/or a remote server. In other alternative embodiments, a part of the application is resident in the host device, and another part is resident on a remote server's storage media and/or a local storage media.

As used herein, the term "display" is intended to mean presenting one or more selections by the host device in a form suitable for use by a human on a display device such as a monitor/screen, a speaker/headset or a printer. Display includes running a software program, playing a sound recording (through a speaker/headset), showing a video recording (on a monitor/screen) and printing a graphics image (on a printer). As used herein, the term "use" is intended to be more than mere display and includes any use whatsoever in a host device.

As used herein, the term "function/data button" is intended to mean a button having a remote electronic association which causes a host device to perform a desired function and/or to retrieve desired data and/or code and to display the results of retrieval on the host device. Function/data button can refer to a function button, a data button or a button having mixed function and data attributes. A function button causes a host device to perform a function. Some examples of a function button are a STOP button, a PRINT button, a left arrow button, a BEGIN button and a SELECT button. A data button in accordance with this invention is visually associated with content on the remote control housing wherein the content indicates to a user one or more categories and/or selections containing specific data on a storage media (local or remote). A data button indicates to a host device, selections containing spcecific data to be retrieved from a local or remote storage media and to be displayed to the user. Some examples of a data button are a TRAIN button, a JUPITER button, an AFRICA button, a BIRDS button, a I WANT TO HOLD YOUR HAND button and a 100 TOP US COMPANIES IN 1993 button. A mixed function and data button can indicate retrieval of data with one or more functions to be performed before and/or after retrieval. Some examples of mixed function and data button are a NEXT PACE button, an ORBIT button, a LAND button, a SKIP button, a REPEAT button, and an INFO button. A mixed function and data button can also indicate retrieval of code and execution of retrieved code.

FIG. 1A illustrates a printed publication remote control 10 for an interactive media in accordance with this invention. Such a printed publication remote control 10 includes a printed publication 11 which has printed content. Printed publication 11 is shown highlighted (double circle) to indicate that the printed publication is an essential feature included in remote control 10. Printed content can be any content such as text and/or graphics which is printed on a housing of printed publication 11.

Printed publication remote control 10 includes one or more function/data button(s) 12, remote control circuitry (not shown in FIG. 1A) and associated electronic content 13. Function/data button(s) 12 have a physical attachment 14A to printed publication 11. Function/data button(s) 12 have a visual association with the printed content of printed publication 11.

Physical attachment 14A and visual association 143 can be implemented by gluing a button to a page adjacent to associated printed text and/or graphic content. Printed text and/or graphic content can also be placed directly on an associated button 12. In another embodiment, text and/or graphic content are placed far off from an associated button 12 and visual association 14B is formed by one or more printed lines on the printed publication which connect button 12 and the text and/or graphic content to be associated with button 12. The printed text and/or graphic content can indicate user directions (such as "Press the button"), functions and selections (data/code) accessible by a button 12. A user can review a printed publication by looking at the graphics and/or reading the text (including reading braille by touching).

Function/data button(s) 12 are connected to remote control circuitry capable of causing a function/data button code to be transmitted as a wireless signal from remote control 10 to a host device (not shown in FIG. 1A). On receipt of the wireless signal, the host device can access associated electronic content 13 to display the desired results indicated by the text and/or graphic content of printed publication 11. Therefore, there is a remote electronic association 15 between function/data button(s) 12 and associated electronic content 13. There is a representative (descriptive and/or derivative) association 16 between the text and/or graphic content of printed publication 11 and associated electronic content 13.

Representative association 16 is implemented when a publisher of a printed publication remote control 10 makes some indication of associated electronic content 13 in the printed publication 11, which allows a user to use a button 12 to enjoy associated electronic content 13 accessible by a user's host device. Representative association 16 can be descriptive and/or derivative such as the association between a title, an abstract or a graphic and the associated electronic content (for example an icon of a paint brush associated with the software for painting or an icon of a fire truck associated with a video recording of a fire truck).

In one embodiment of this invention, a publisher publishes the printed content of the printed publication as well as the associated electronic content (remote or local) simultaneously as a single interactive media publication. A printed publication remote control sold to a user includes at least printed publication 11 with physically attached function/data button(s) 12 which have a visual association 14B with the printed content of printed publication 11.

An associated electronic content 13 which forms a part of remote control 10 and which is accessible by a user's host device and is encoded either in a removable storage media local to the host device or in a remote storage media accessible through a remote server. The removable storage media is physically included and removably mounted inside a remote control in accordance with this invention. The remote storage media is not physically included in remote control 10.

One embodiment of a remote control for pre-school children is a picture book remote control in which the associated electronic content contains content similar or identical to that of standard children's books such as "Cinderella" and "Pete the Police Car." Such associated electronic content can include selections containing drawings and/or photographs with text captions as in the print version, and/or audio recordings, and/or video recordings for multimedia host devices.

Figure 1B:
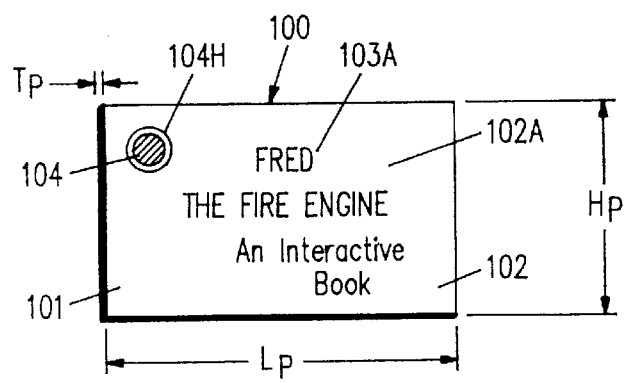
FIGS. 1B and 1C are illustrations of one embodiment of a printed publication remote control in shut and open positions respectively.

FIG. 1B illustrates one embodiment of a picture book remote control 100 in accordance with this invention. Externally, picture book remote control 100 looks and feels much like a printed publication, such as a regular children's book. Picture book remote control 100 includes a printed publication 101 which has a colorful front cover 102. Front cover 102, a thick cardboard piece, is a children's book front cover. Front cover 102 has an outer side 102A which includes text printed content 103A, "FRED THE FIRE ENGINE An Interactive Book." Printed content 103A is a descriptive title for remote control 100.

Remote control 100 includes a button 104 accessible through a hole 104H in front cover 102. Printed publication 101 includes, in addition to front cover 102, a back cover 105 having an inner side 105A. Inner side 105A has graphic printed content 103B, an illustration of a fire truck, the fire truck being associated with electronic content (not shown in FIG. 1C) in the form of a picture, text, video recording and audio recording of a fire truck which is displayed to a user by a host device when button 104 is pressed.

Figure 1C:
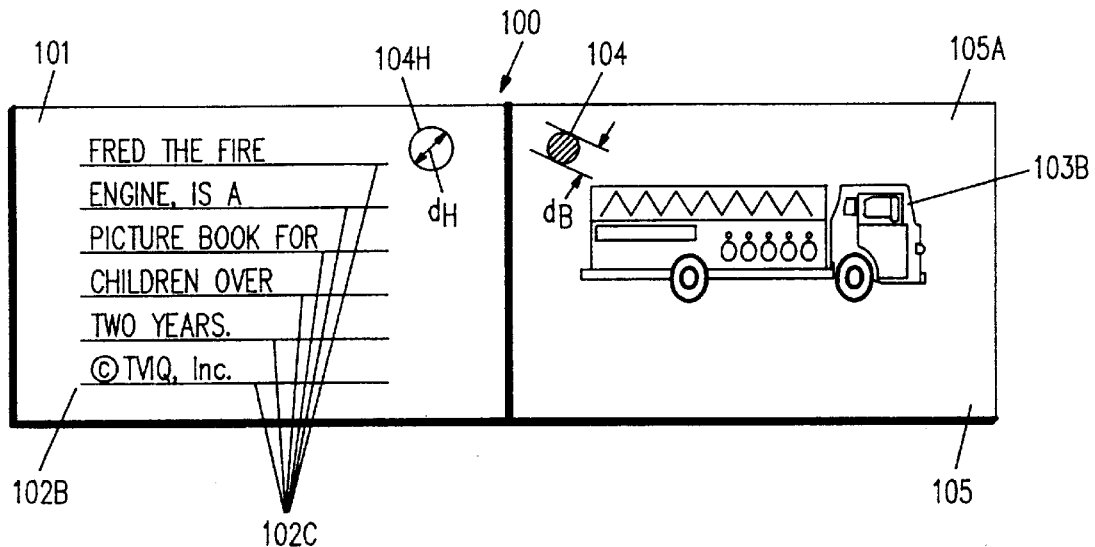

Button 104 is physically attached by glue to the inner side 105A of back cover 105 (FIG. 1C). Hole 104H has a diameter $d_H$=1.5 inch to allow a button 104 of diameter $d_B$=1.25 inch to be accessible when picture book remote control 100 is shut by bringing together front cover 102 and back cover 105 (FIG. 1B). Visual associations between button 104 and text content 103A and also between button 104 and graphic content 103B and text content 102C are formed because of physically adjacent presence to each other (without any other intervening button(s) and/or text/graphic content).

Picture book remote control 100 includes remote control circuitry (not shown in FIG. 1B) supported by printed publication 101 and connected to button 104. In one embodiment the remote control circuitry is embedded in the spine of picture book remote control 100. In another embodiment, the remote control circuitry is encased inside button 104. The remote control circuitry is capable of causing a function identifying button code to be transmitted by remote control 100 and thus provides a remote electronic association with electronic content 133A of FIG. 1E which is accessible to a host device. Picture book remote control 100 has a length $L_B$=9.25 inches a height $H_P$=6.2 inches and a thickness $T_P$=0.35 inches (FIG. 1B).

Although in one embodiment there are no pages between front cover 102 and back cover 105, in alternative embodiments there are pages, such as, for example, thick cardboard pages similar or identical to the pages in conventional children's books, with or without additional buttons.

Figure 1D:
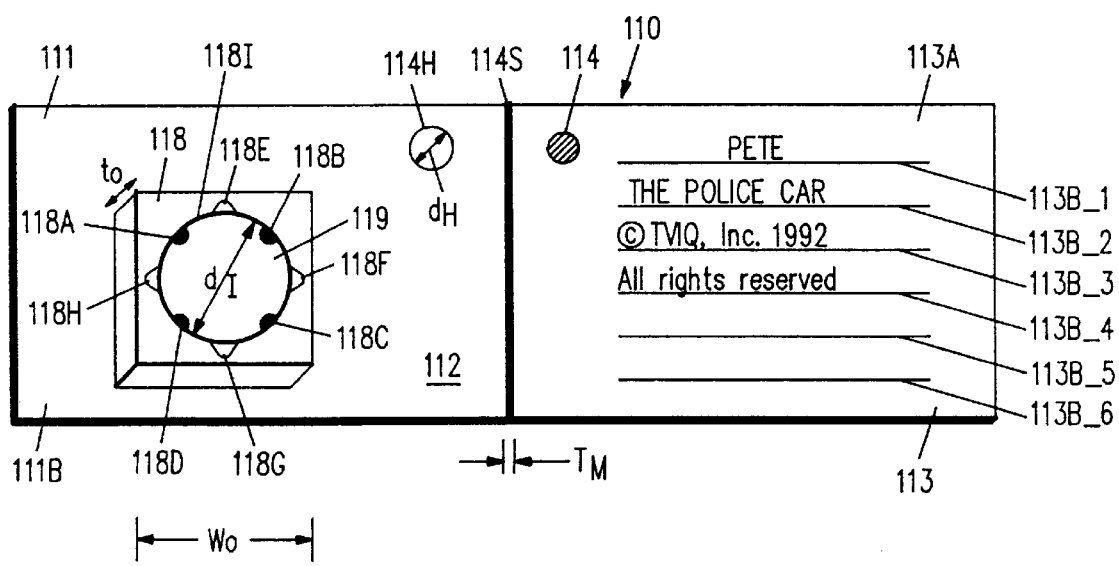
FIG. 1D illustrates another embodiment of a printed publication remote control including a removable storage media containing associated electronic content in accordance with this invention.

In some embodiments, a printed publication remote control includes a holder for removably holding storage media such as CD-ROMs. FIG. 1D illustrates a picture book remote control 110 which includes a removable CD ROM storage media 119. Picture book remote control 110 is similar to picture book remote control 100 in most respects described above. Picture book remote control 110 includes a printed publication 112, with a front cover 111, and a button 114 accessible though a hole 114H of front cover 111.

A storage media holder 118 is physically attached to inner side 111B of front cover 111. Storage media holder 118 has a circular inner periphery 118I with diameter $d_I$=4.75 inch and thickness $t_I$=0.10 inch (not shown in FIG. 1D). Storage media holder 118 is a square holder with a side having width $W_O$=5.4 inch and a thickness $t_O$=0.15 inch. Inner periphery 118I is provided with several notches 118E, 118F, 118G and 118H to facilitate easy removal of CD ROM 119 from storage media holder 118. Furthermore, storage media holder 118 has several ears 118A, 118B, 118C and 118D which hold CD-ROM 119 securely in place when CD ROM 119 is removably mounted in storage media holder 118. CD ROM 119 includes the associated electronic content for picture book remote control 110 (similar or identical to electronic content 133A of FIG. 1E).

Printed publication 112 has a spine 114S of thickness $T_S$=0.35 inch which connects front cover 111 and back cover 113. When picture book remote control 110 is shut, compact disk 119 is held securely in the resulting enclosure between holder 118, and back cover 113. Back cover 113 has, on its inner side 113A, text printed content 113B_1, 113B_2, 113B_3, 113B_4, 113B_5 and 113B_6 which includes a summary description and copyright notice of associated electronic content 133A encoded in CD ROM 119.

In an alternative embodiment of this invention, a CD ROM holder in the form of a pouch having length $l_O$=5.5 inch and height $a_O$=4.75 inch is mounted on back cover 113A. In other alternative embodiments, the remote control has a storage media holder of dimensions and structure suitable for removably holding other types of storage media such as floppy disk (FIG. 6C) and game cartridge (FIG. 6D).

Although in one embodiment, a button is physically attached to the inner side of a back cover of a printed publication, a button in accordance with this invention can be physically attached anywhere on a printed publication including the outer side and inner side of a front cover, a back cover and/or the spine.

Electronic content 133A encoded in CD-ROM 119 includes selections having a representative (descriptive/ derivative) association with the text and/or graphic printed content of printed publication 112. In one embodiment, compact disk 119 is a CD-ROM manufactured by Sony Corp.

Figure 1E:
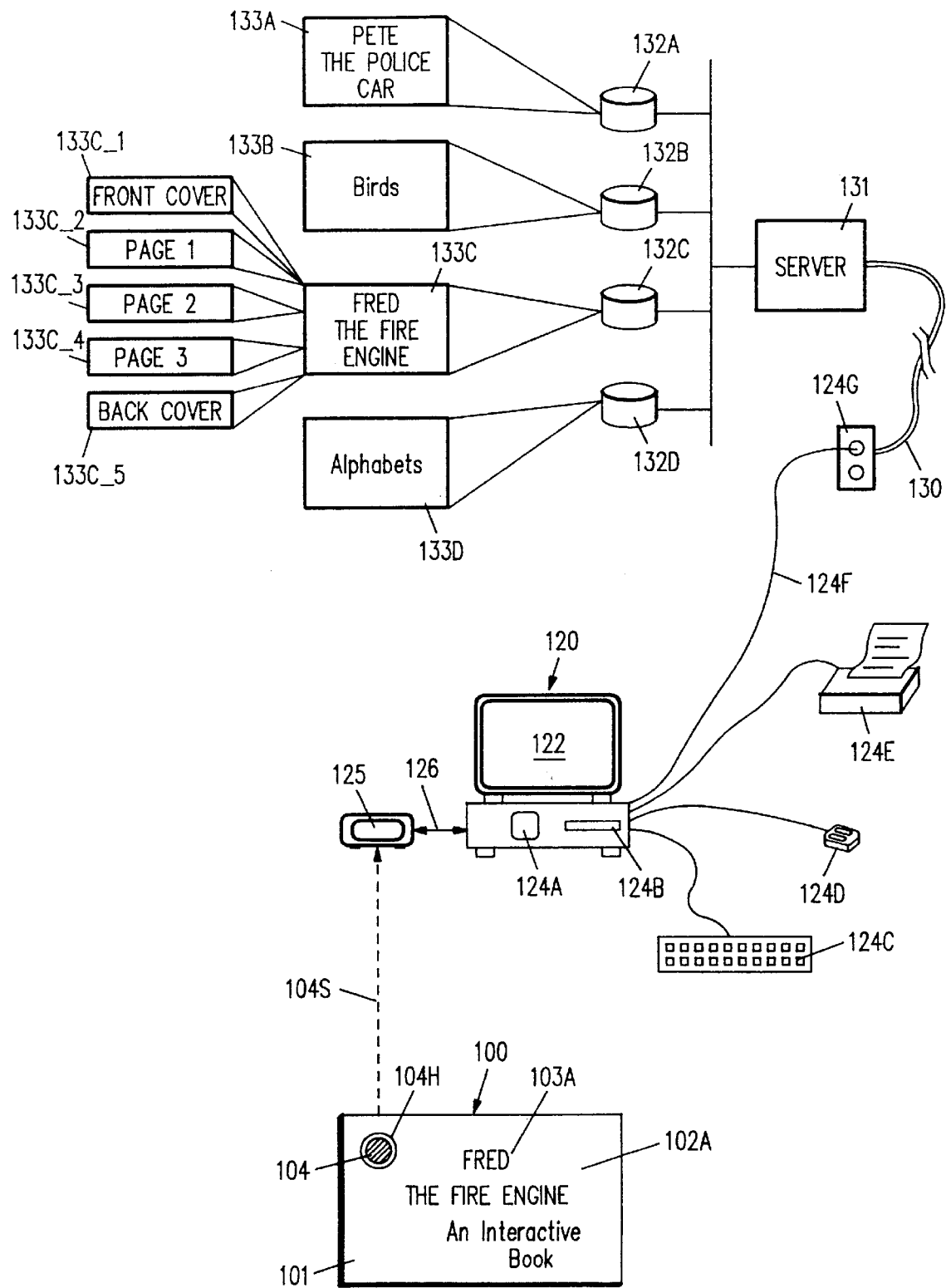
FIG. 1E illustrates the remote control of FIGS. 1B and 1C being used with a host device in accordance with this invention.

FIG. 1E illustrates use of picture book remote control 100 with a host device 120 in accordance with this invention. Host device 120 is an IBM compatible personal computer (PC) equipped with a monitor 122, a speaker 124A, a CD drive 124B, a keyboard 124C, a mouse 124D, a printer 124E and, a cable/wire 124F connected to a jack 124G. Host device 120 includes a signal receiver 125 connected via a cable 126 to the microprocessor in host device 120. In one specific embodiment of this invention, jack 124G is connected to the Internet computer communication network. In other embodiments jack 124G is connected to other computer communication networks (such as Information Super Highway, Prodigy and CompuServe). In alternative embodiments, jack 124G is connected to a telephone network, a cable TV network or a satellite network.

A user such as a child can "read" an interactive media on a host device 120 by pressing button 104 in remote control 100. Pressing remote control button 104 causes a "turn to next page" function identifying button code to be encoded in a wireless signal and transmitted via a wireless signal link 104S to signal receiver 125. Signal receiver 125 transmits the received button code to a microprocessor in host device 120 via cable 126. Host device 120 interprets the received button code as command to an application running in its microprocessor.

In one embodiment, on receipt of the button code, the application computes the next page address from the current page address, retrieves from associated electronic content 133C, the electronic content for the next page and displays the retrieved electronic content on host device 120. Such a display causes the image of a title screen on monitor 122 to be replaced by the image of the first page of the interactive media, or causes a first page image to be replaced by a second page image and so on, depending on the image being displayed when the button code was received.

In the embodiment shown in FIG. 1E the associated electronic content 133C for picture book remote control 100 is encoded in remote storage media 132C connected to a remote server 131. Associated electronic content 133C includes a category of selections for "FRED THE FIRE ENGINE" which is used with remote control 100 having the text printed content 103A "FRED THE FIRE ENGINE."

In one embodiment of this invention, a portion of the remote control button code determines the associated electronic content referenced by the button of a remote control. For example, in one embodiment, in a remote control button code 0027, the number 27 uniquely identifies the associated electronic content 133C containing the story of "FRED THE FIRE ENGINE" while the number 00 indicates the title screen.

A host device 120 can log into remote server 131 and use remote control button code 0027 to retrieve associated electronic content 133C, (which has a representative association with text printed content 103A) and display the title screen. In one embodiment of this invention each successful retrieval of associated electronic content by a user's host device causes the remote server to bill the user for the costs associated with use of the associated electronic content.

Also shown in FIG. 1E are electronic contents 133A, 133B and 133D encoded on storage media 132A, 132B and 132D which are associated with other picture book remote controls. Each such picture book remote control can have a button capable of transmitting a button code which distinctly identifies one of the electronic contents 133A, 133B and 133D and the function/data being referenced. In an alternative embodiment, a single remote control includes multiple buttons, with each button distinctly identifying a different one of electronic contents 133A, 133B, 133C and 133D (as in FIG. 6B).

In the embodiment of FIG. 1E, remote server 131 is accessible to host device 120 via the TV cable system 130 connected to cable jack 124G. Although in the embodiment of FIG. 1E, electronic contents 133A, 133B, 133C and 133D are resident on distinctly separate storage media and accessed through a single server, such electronic contents can all be resident on a single storage media or each can be accessible through different servers in accordance with this invention.

In one specific embodiment of this invention, host device 120 is an IBM compatible personal computer from Astrix Computer Corporation, 1546 Centre Pointe Drive, Milpitas, Calif. 95035. Host device 120 includes multimedia hardware such as a full motion video card, "Real Magic" available from Sigma Designs, Inc., 47900 Bayside Parkway, Fremont, Calif. 94538. The Real Magic card implements an audio/video compression algorithm compatible with MPEG/1 specification available from the Motion Pictures Expert Group. Host device 120 also includes a commercially available CD drive, NEC CDR/84 available from NEC Corporation. In an alternative embodiment of this invention, host device 120 includes the full motion video card "ProAudio Spectrum 16" available from Media Vision Inc., 47300 Bayside Parkway, Fremont, Calif. 94538.

In one embodiment of this invention host device 120 is a Macintosh personal computer (PC) equipped with a monitor, a floppy drive, a speaker, a headset, a signal receiver, a CD drive and a keyboard.

In one embodiment of this invention, remote control 100 includes a signal transmitter (as described below) for transmission of a button code from button 104 as a wireless signal, which can be received by signal receiver 125. In one embodiment, cable 126 is an RS 232 serial cable. In the embodiment described above, each time button 104 is pressed, a function identifying button code is transmitted by remote control 100 and an application running in host device 120 retrieves the electronic content for the next page until reaching the back cover after which, on the next retrieval and display the host device goes back to the beginning and displays the title screen.

Figure 1F:
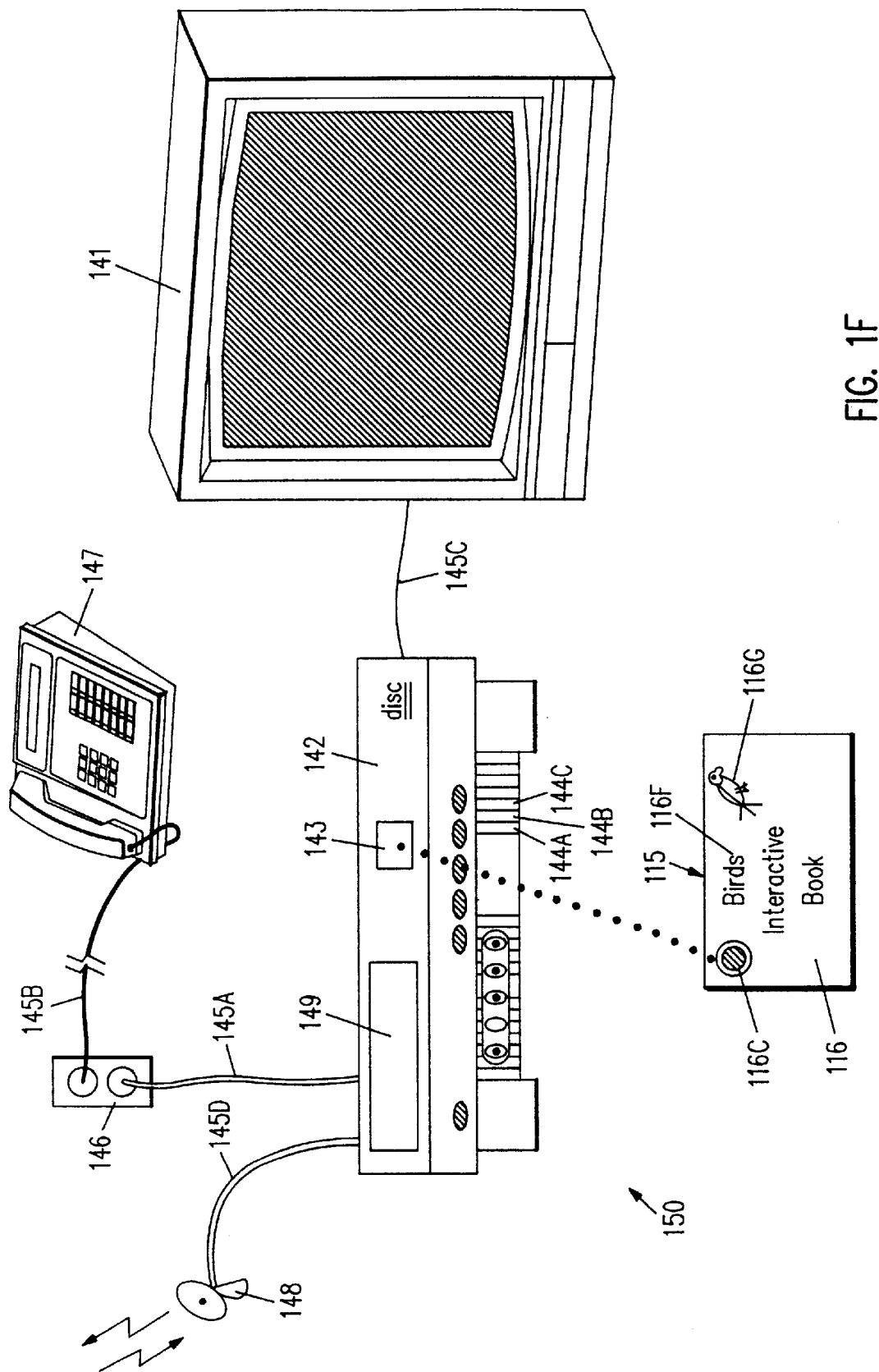
FIG. 1F illustrates another embodiment of a printed publication remote control being used with a host device in the form of a game machine.

FIG. 1F shows a picture book remote control 115 being used with a host device in the form of a game machine platform 150. Text content 116F and graphic content 116G are visually associated with button 116C on front cover 116. A game cartridge is removably mounted inside a holder in interactive book remote control 115 (as shown in FIG. 6D).

Game machine platform 150 includes a television 141, which has a screen (also called a "monitor"). Game machine platform 150 also includes a game machine 142 connected to television 141 by a cable 145C. Game machine 142 includes a built-in receiver 143, a modem 144A, a fax card 144B, a battery protected memory card 144C and game cartridge receiver 149. Game cartridge receiver 149 is suitable for retrieving the electronic contents encoded in a game cartridge. Game machine 142 is connected via a cable 145A to a telephone jack 146. Game machine 142 is also connected to a satellite antennae 148 by a cable wire 145D.

Although a game machine 142 is being described and shown in FIG. 1F, other host devices such as an interactive television set top can be used instead of game machine 142 in accordance with this invention.

Modem 144A of game machine 142 permits a game machine platform 150 to communicate with devices connected via a modem to the telephone network (not shown). Game machine platform 150 supports applications involving multiple users participating in a single video game application. Alternatively applications which permit a user to purchase various products by merely pressing a button in a remote control (as described below) can be used in game machine platform 150.

A telephone 147 is connected by phone cable 145B to phone jack 146 and permits a user to have a voice link with another user. Alternatively telephone 147 can be used by a user to communicate with a publisher of interactive media or an advertiser of products in a periodical remote control (as described below). In one embodiment of this invention, a user's credit card number and password are saved in battery protected memory card 144C for use by an application to order an advertised product when a user issues a buy command using a remote control (as described below in reference to application 860). In one embodiment, the application sends (see step 865H in FIG. 8D) a purchase order to the advertiser of a commercial as described below.

One advantage of combining a button and a printed publication into a single remote control as described above is that a button of the remote control can be uniquely customized depending on the specific text and/or graphic content of the printed publication and depending on the associated electronic content.

Another advantage of a printed publication remote control is that such a remote control can be sold through the existing normal printed publication channels such as a book store, a magazine stand and direct mail order.

A picture book remote control with one and only one button which causes page turning and caption reading on a host device allows even preschool children to enjoy interactive multimedia CD-ROM books on a host device without need for parental assistance.

In accordance with this invention, a user, such as a two year old child, can remove storage media 119 (FIG. 1D) from housing 118 of a remote control 110 and insert storage media 119 into a host device's peripheral 124B (FIG. 1E). As soon as storage media 119 is inserted, an application automatically starts and the interactive media's title screen is retrieved from storage media 119 and displayed on monitor 122 of host device 120.

Alternatively, in a remote control associated with electronic content encoded on a remote storage media, as soon as a button (such as button 104 of remote control 100) is touched by a user, an application automatically starts on host device 120 and communicates with a remote server to access the remote storage media. Either some portion or all of an associated electronic content 133C is retrieved by the application and the title screen is displayed on monitor 122 of host device 120. Also, in some embodiments audio is displayed through speaker 124A. The display of audio depends on content of the selection available to the application running in host device 120.

Next, if button 104 on remote control 100 is pressed, a book "opens" on monitor 122 (irrespective of whether local or remote storage media is being used).

Figure 1G:
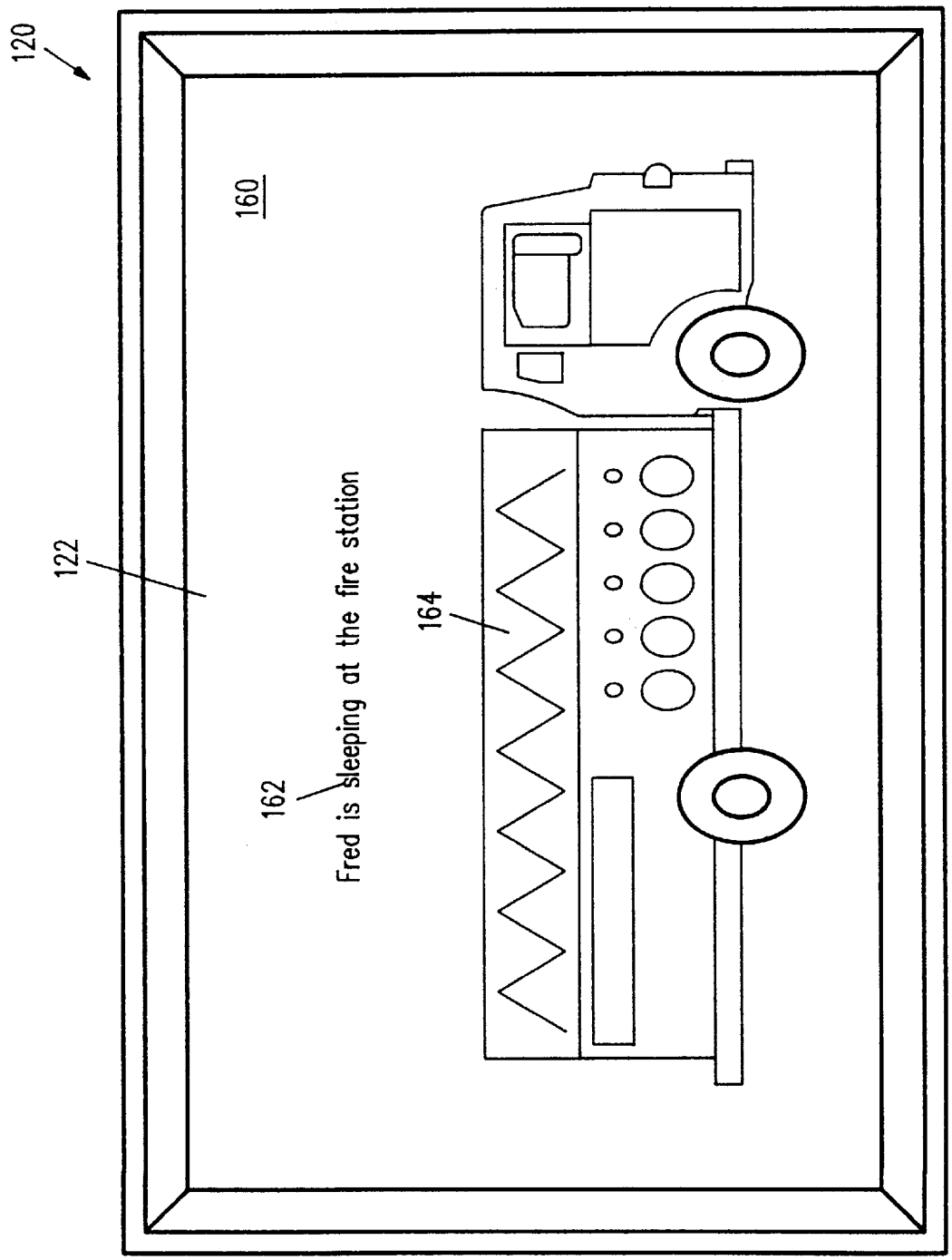
FIG. 1G illustrates the display of electronic content on the monitor of a host device controlled by the remote control illustrated in FIGS. 1B and 1C.

After the title screen, a first page 160 is displayed on monitor 122 (FIG. 1G). First page 160 includes graphic content 164 illustrating the fire truck and text content 162 which reads "Fred is sleeping at the fire station."

When button 104 is pressed again, a sound recording of text content 162 is displayed through speaker 124, while graphic content 164 and text content 162 continue to be displayed on monitor 122. Next time button 104 is pressed, the text and graphic content for page 2 are displayed (not shown). In this manner, is preschool children can now enjoy interactive media using just one simple button on the remote control.

In an alternative embodiment, pressing a button of a remote control a second time turns the page on monitor 122 instead of the text content being read to the user. In other alternative embodiments, other multimedia events such as full motion video, sound effects and multiple choice questions are presented to a user depending on when a button of a remote control is pressed and the programming of the selection and application.

In one embodiment of this invention, a picture book remote control can be created from off-the-shelf children's sound books such as "Fred the Fire Engine", "Cinderella" and "Pete the Police Car", commonly available in bookstores such as Barnes & Noble Bookstore, 3600 Stevens Creek Boulevard, San Jose, Calif. 95117.

Children's sound books contain one or more sound buttons which, when pressed, play sound (for example, the sound of a fire engine) through a speaker inside the sound book. Such a children's book is modified to create a picture book remote control by removing all pages between the front and back covers, modifying the sound buttons and optionally gluing a CD holder on the inside back cover of the sound book. The sound buttons are modified by removing the existing sound electronics and substituting the remote control circuitry as described below. The CD holder can be any commercially available CD holder such as DIGIPAK available from AGI Inc. 153 2nd Street, Los Altos, Calif. 94022 (415) 949-5870.

Although one embodiment of a picture book remote control is created by modifying a children's sound book, in another embodiment of this invention, a picture book remote control is mass produced from various new materials. Although in one embodiment, a storage media holder is physically attached to a printed publication, in another embodiment, the holder is formed integral with the printed publication and the button is physically attached to the holder (FIG. 6H). In an alternative embodiment, the buttons are formed integral with the housing of a remote control (FIG. 7D).

An interactive media remote control with multiple buttons permits a wide variety and range of interactivity between a user and a host device. The multiple buttons are mounted on a flexible printed circuit board which is bound into the housing of the printed publication to form a remote control for an interactive media. The number of buttons included in a remote control depends on the associated electronic content. Simple multiple button remote controls (for example for two year olds) can have two, three or four buttons. More advanced remote controls can have an entire computer keyboard.

Figure 2A:
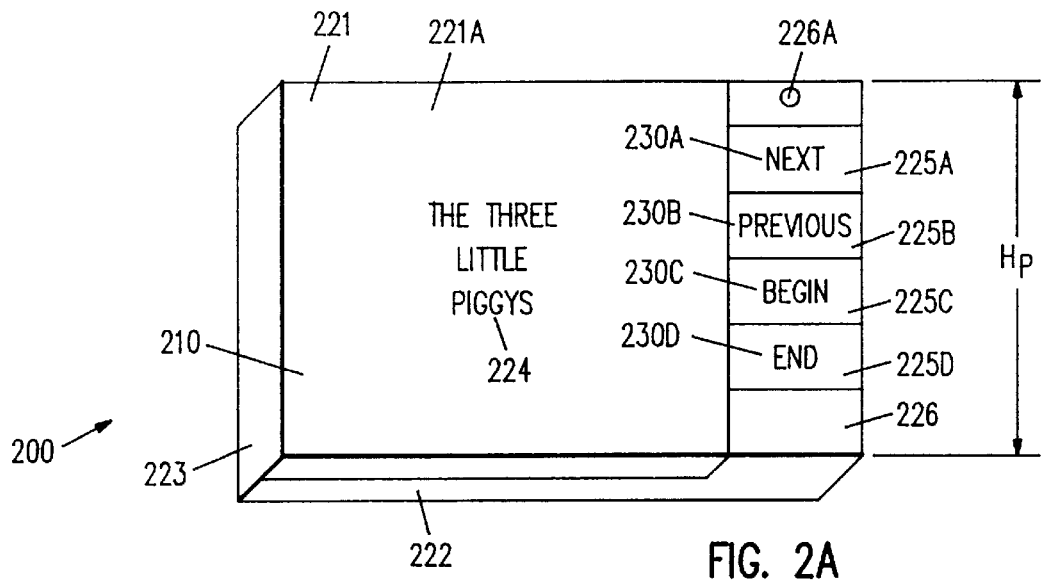
FIGS. 2A and 2B are illustrations of one embodiment of a multiple button printed publication remote control in the shut and open positions respectively in accordance with this invention.
Figure 2B:
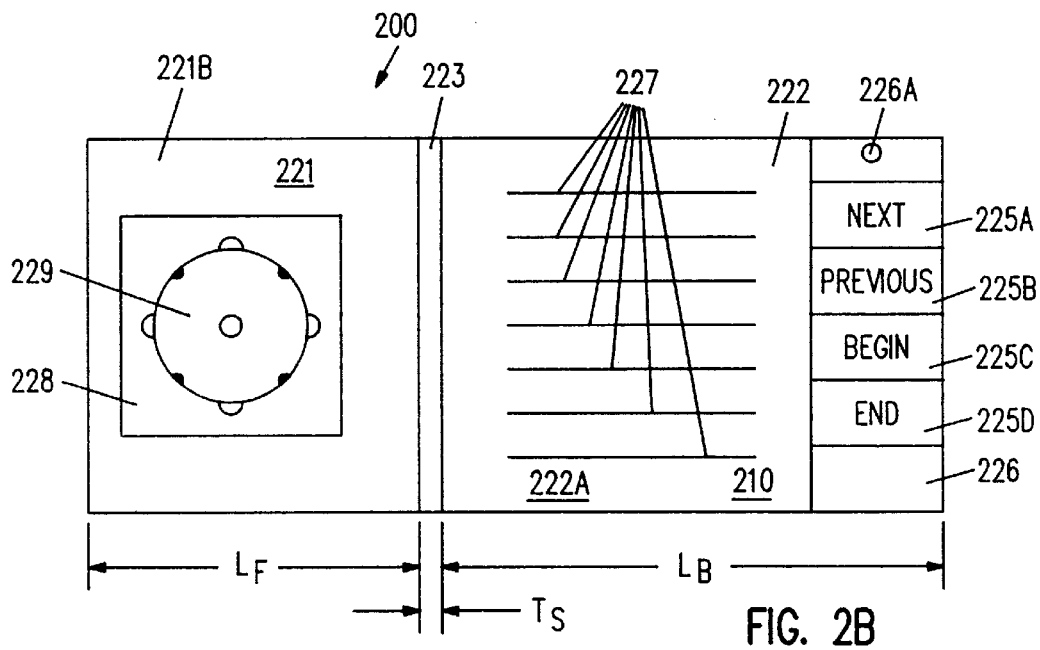

FIGS. 2A and 2B are illustrations of one embodiment of a multiple button remote control 200 in the closed and opened positions respectively. Remote control 200 includes a printed publication 210 which has a front cover 221 and a back cover 222 joined by a spine 223. Outerside 221A of front cover 221 has text printed content 224 "THE THREE LITTLE PIGGIES". Remote control 200 has a number of buttons: NEXT button 225A, PREVIOUS button 225B, BEGIN button 225C and END button 225D, all of which are mounted on back cover 222 of printed publication 210.

Remote control 200 also includes remote control circuitry 226 and transmitter 226A such that when any of buttons 225A, 225B, 225C and 225D is pressed, a corresponding function identifying button code is transmitted via transmitter 226A. Remote control 200 has a height $H_P$=7.85 inch (FIG.2A) with front cover 221 having a length $L_F$=6.6 inch, back cover 223 having a length $L_B$=8.5 inch and spine 223 having a width $T_S$=0.35 inch (FIG. 2B)

Mounted on inner side 221B of front cover 221 is a CD ROM holder 228 in which is removably mounted CD ROM 229. On inner side 222A of back cover 222 is text and/or graphic printed content 227 which is part of printed publication 210. Encoded in CD ROM 229 is associated electronic content having a representative association with text and/or graphic printed content 227 and text printed content 224 of printed publication 210.

Physically attached to a surface of each of buttons 225A, 225B, 225C and 225D is a corresponding text content 230A ("NEXT"), 230B ("PREVIOUS"), 230C ("BEGIN") and 230D ("END"). For instance, when NEXT button 225A is pressed, remote control circuitry 226 causes a remote control button code indicating the next page to be transmitted by transmitter 226A to a host device 120 (FIG. 1E). The remote control button code is interpreted by host device 120 which computes the next page from the page currently being displayed and then retrieves the corresponding electronic content from CD ROM 229.

A similar previous page function is implemented on pressing PREVIOUS button 225B. When BEGIN button 225C is pressed, host device 120 looks up the starting address for the selection, "THREE LITTLE PIGGY'S" and retrieves the electronic content for the title screen from CD ROM 229. Similarly, host device 120 retrieves the electronic content for the back cover when button 225D is pressed. The results of retrieval are then displayed to the user by host device 120. Therefore buttons 225A and 225B allow a user to sequentially access the pages of selection "THE THREE LITTLE PIGGY'S" whereas buttons 225C and 225D allow the user to directly access the beginning or the end of the selection.

Although picture book remote controls 100, 115 and 200 have been described above as printed publication remote controls, they can also be described as storage media remote controls (described below).

Figure 3A:
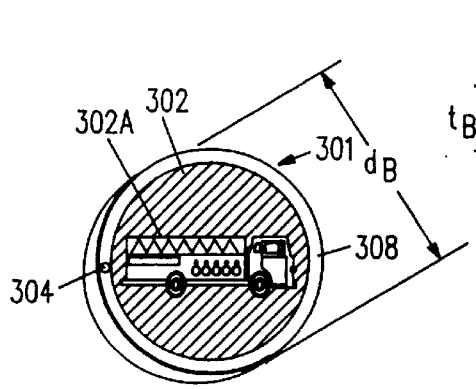
FIG. 3A is a perspective view of a button for a remote control such as the remote control of FIG. 1B.
Figure 7A:
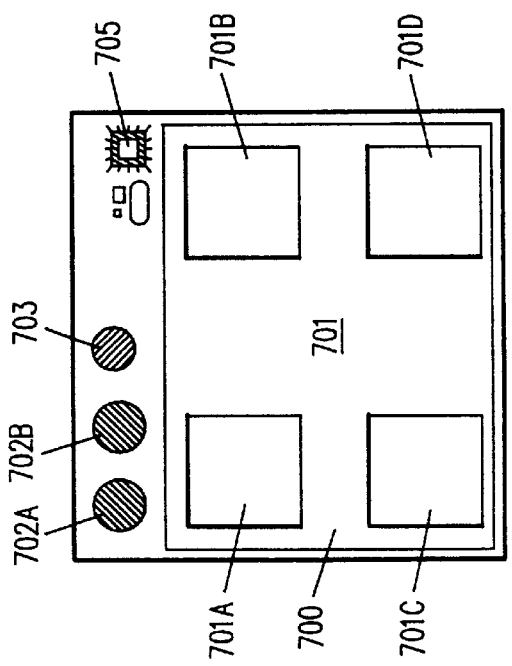
FIG. 7A is a plan view of a printed circuit board for use with a multiple button remote control, such as the remote control of FIGS. 6B, 6D, 6E, 6J and 2A.

FIG. 3A is an illustrative perspective view of a button 301 for a single button remote control (such as button 104 shown in FIGS. 1B and 1C). In the embodiment of FIG. 3A, button 301 is a large plastic button that contains all remote control circuitry enclosed in a self-contained unit. However, remote control circuitry can also be provided outside a button (FIGS. 2B and 7A).

Button 301 has an enclosure wall 308 (made of red plastic transparent to infrared light in one embodiment of this invention). Button 301 has a button surface 302 which is spring mounted and surrounded by enclosure wall 308. A graphic content 302A of a fire truck is physically attached to button surface 302.

Figure 3B:
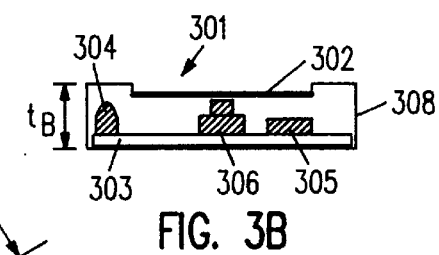
FIGS. 3B and 3C are the elevation and plan views of the button shown in FIG. 3A.
Figure 3C:
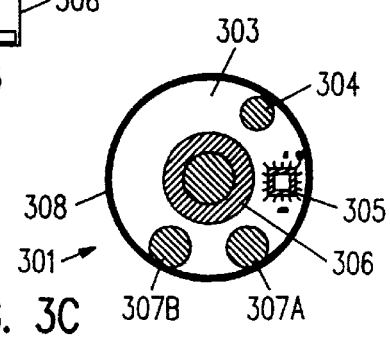

FIGS. 3B and 3C are the elevation and plan views of button 301 of FIG. 3A. As shown in FIGS. 3A and 3B, surrounded by enclosure wall 308 is remote control circuitry including a round printed circuit board (PCB) 303 with electronic components, such as an infrared light emitting device (LED) 304 and a microcontroller 305. Infrared LED 304 is mounted at a location that ensures proper transmission of infrared signals through button 301. Button 301 also includes a switch activating protrusion 306 attached to PCB 303. Although in FIG. 32 protrusion 306 is attached to PCB 303, in another embodiment of this invention, protrusion 306 is attached to button surface 302.

Enclosure wall 308 acts as a guide for button surface 302 to permit reciprocating motion of protrusion 306 with respect to PCB 303. In the embodiment of FIG. 3C microcontroller 305 is mounted in die form on PCB 303 to save space and ensure compact nature of button 301. Also, button 301 is powered by two button cells 307A and 307B (FIG. 3C).

In one embodiment, infrared LED 304 is mounted facing a transparent surface such as enclosure wall 308 (FIG. 3B) (or opposite a transparent button surface in an alternative embodiment). Button 301 can be formed from a sound button of an existing children's book by drilling a hole in button surface 302 of button 301 to accommodate infrared LED 304. Alternatively, infrared LED 304 can be mounted facing a hole in an enclosure wall 308, if necessary.

In accordance with this invention, instead of microcontroller 305, other logic circuits can be used such as an ASIC, a PLD or a FPGA (appropriately programmed). A microprocessor can also be used if desired for this function, although the cost will be higher than the cost of a microcontroller.

Furthermore, instead of infrared LED 304, other types of wireless signal transmitters such as a radio frequency transmitter or an ultrasonic transmitter can also be used in accordance with this invention.

Any sized button can be used in accordance with this invention. In one specific embodiment, remote control button 301 is one inch in diameter. In another embodiment the whole surface of a front cover of a remote control is a button (FIG. 7D).

Microcontroller 305 is normally in SLEEP mode. If a user pushes on button surface 302 of button 301 by a distance sufficient for protrusion 306 to contact button surface 302, microcontroller 305 wakes up and sends a single button code by pulsing infrared LED 304. Microcontroller 305 then immediately returns to SLEEP mode even before button 301 is released by the user.

In one embodiment of this invention, the button code sent by microcontroller 305 corresponds to the pressing of a mouse button on a mouse connected to a host device. In one specific embodiment of a picture book remote control, the button code sent by the remote control corresponds to the button code generated by pressing a left mouse button in a mouse of an IBM personal computer (PC). However, in alternative embodiments, the button's switch (formed by protrusion 306 and PCB 303) is connected to other pins on microcontroller 305 so that a different button code is generated.

In accordance with this invention, any number can be used as a button code as long as the corresponding application can recognize the received number and perform the desired function (such as "STOP"). Although in one embodiment of this invention, the button code generated by each button is unique, in other embodiments, the same button code can be generated by more than one button to indicate the same desired function and/or data.

One advantage of enclosing remote control circuitry inside button 301 is that the switch and circuitry are combined into a single unit resulting in simplicity of design and cost savings. Also, a large sized button allows even preschool children to easily use a remote control for an interactive media.

Figure 4A:
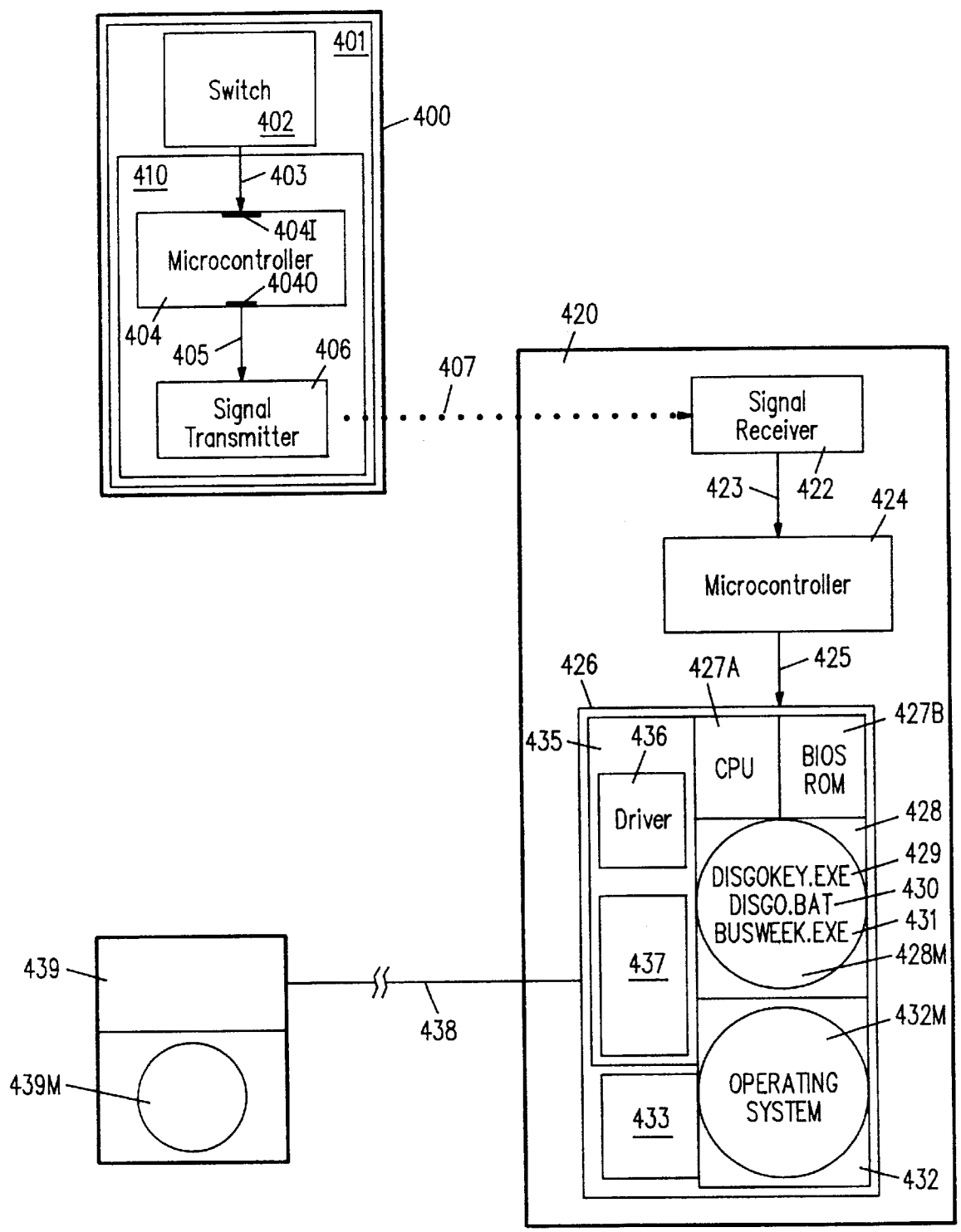
FIG. 4A is an illustrative block diagram of a remote control and a host device in accordance with this invention.

FIG. 4A is an illustrative block diagram of one embodiment of a remote control 400 for an interactive media being used with a host device 420. Remote control 400 includes a button 401 which includes a switch 402, and remote control circuitry 410 connected to each other by switch output line 403. Remote control circuitry 410 includes a microcontroller 404 and a signal transmitter 406. Switch 402 is connected by switch output line 403 to an input pin 404I of microcontroller 404. An output pin 404O of microcontroller 404 is connected by transmitter input line 405 to signal transmitter 406.

When button 401 is pressed by a user, microcontroller 404 detects the closure of switch 402 via switch output line 403. Microcontroller 404 then sends a signal to signal transmitter 406 via transmitter input line 405. In one particular embodiment, signal transmitter 406 is an infrared transmitter such as an infrared LED 304 (above).

Signal transmitter 406 transmits a wireless signal 407 to a host device 420 (such as host device 120 of FIG. 1E. Host device 420 senses wireless signal 407 in a signal receiver 422. Signal receiver 422 is connected by receiver output line 423 to microcontroller 424. On receipt of a signal from remote control 400, signal receiver 422 sends a signal on receiver output line 423 to microcontroller 424. Microcontroller 424 is connected to a microcomputer 426 by microcomputer input line 425.

Microcomputer 426 includes several components such as a central processing unit 427A (for example, Intel microprocessor 80486), a read only memory (ROM) 427B in which is stored a basic input output system (BIOS), a display device 433 and main memory 435. Main memory 435 contains an autostart driver 436, and an application 437. Microcomputer 426 also has removable storage media peripherals 428 and 432 containing storage media 428M and 432M respectively. Storage media 428M is a local storage media which was removed by a user from a remote control and inserted into removable storage media peripheral 428, storage media 428M includes three files: DISGOKEY.EXE 429, DISGO.BAT 430, and BUSWEEK.EXE 431 (described below). Storage media 432M is a boot disk containing an operating system such as Microsoft™ DOS. All the components of microcomputer 426 are operatively coupled to central processing unit 427A through a bus, such as the well known ISA bus (not shown).

Also shown in FIG. 4A is a communication line 438 connecting host device 420 to a remote server 439. Remote server 439 allows host device 420 to access remote storage media 439M which can be encoded with associated electronic content for remote control 400.

Microcomputer 426 passes to application 437 any button codes received from microcontroller 424. Application 437 interprets the received button code as a user command such as a command to turn pages in the currently displayed selection. Application 437 is a memory resident version of the executable application encoded in storage media 428M (such as BUSWEEK.EXE 431 described below).

Figure 4B:
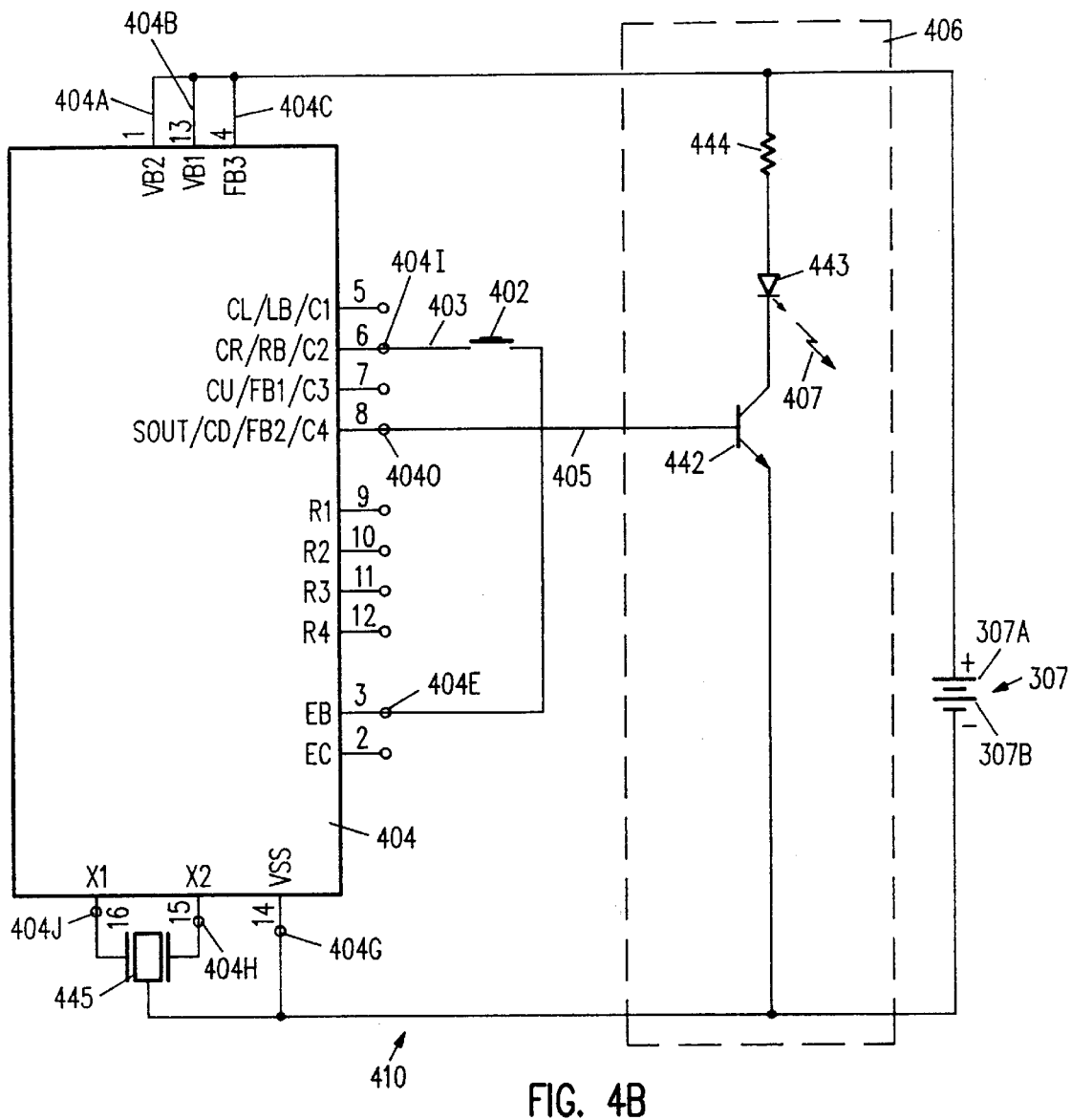
FIG. 4B is an illustrative diagram of the remote control circuitry for connecting the switch, the microcontroller and the signal transmitter of the remote control of FIG. 4A.

FIG. 4B is an illustrative circuit diagram of remote control circuitry 410 for one embodiment of a button 401 described above. Remote control circuitry 410 is formed on a PCB 303 supported on a housing of one embodiment of a remote control, as described above. Microcontroller 404 of remote control circuitry 410 has various pins including VB2 power pin 404A, VB1 power pin 404B and FB3 reset pin 404C which are tied to the positive terminal of power supply 307 (formed by batteries 307A and 307B connected in series). Microcontroller 404 is also connected through a X1 pin 404J and X2 pin 404H to a resonator crystal 445 which causes an oscillator in microcontroller 404 to oscillate (in one embodiment at 3.58 MHz).

Signal transmitter 406 (dotted line) includes an npn transistor 442, an LED 443 and a resistor 444. Transmitter input line 405 connects the base of transistor 442 to SOUT/CD/FB2/C4 pin 404O of microcontroller 404. The collector of transistor 442 is connected to the cathode of LED 443. The anode of LED 443 is connected to one end of resistor 444. The other end of resistor 444 is connected to the positive terminal of power supply 307. The emitter of transistor 442 is connected to the negative terminal of power supply 307. The VSS pin 404G of microcontroller 404 is also connected to the negative terminal of power supply 307.

Initially, the CR/RB/C2 input pin 404I of microcontroller 404 is internally pulled down to ground by an internal resistor while the enable EB pin 404E of the microcontroller is forced high. Therefore microcontroller 404 is triggered when switch 402 is depressed sufficiently to short CR/RB/C2 pin 404O to EB pin 404E and force pin 404I high. Such a closure of switch 402 causes a button interrupt to awaken software running in microcontroller 404. The software rapidly pulses transistor 442 via SOUT/CD/FB2/C4 pin 404O. Transistor 442 in turn causes infrared LED 443 to transmit a modulated infrared signal 407.

In one embodiment, infrared signal 407 has the form of an infrared RS232C serial link at 1200 baud modulated with a 40 KHz carrier with 1's represented by 40 KHz square wave (25 pulses to 600 sec interval) and 0's by zero volts. Approximately 800 m Amp of current flow through LED 443, limited only by resistor 444. The current through LED 443 is limited by resistor 444 to approximately 400 m Amp. In another embodiment two transistors are used to increase current through LED 443 as described in copending U.S. patent application 08/076,032 filed Jun. 15, 1993 incorporated herein in its entirety.

In the embodiment of FIG. 4B, microcontroller 404 is a Motorola Microcontroller, M68HC05K0 available from Motorola Inc., Semiconductor Products Sector 2100 E. Elliot Road, Tempe, Ariz. 85284. In FIG. 4B transistor 442 is MMBT4401 also available from Motorola, Inc. Infrared LED 443 is NEC-SE1003C available from NEC Electronics, Inc., 475 Ellis Street, Mountain View, Calif. 94043, resistor 444 is a 1 ohm resistor, resonator 445 is a 3.58 MHz resonator Part # KBR 3.58 MKS available from Kyocera America, 8611 Balboa Avenue, San Diego, Calif. 92123. Power supply 307 is two 1.5 volt watch batteries connected in series, Part # GR927 available from Panasonic Industrial Co., 1600 McCandless Drive, Milpitas, Calif. 95035 (408) 946-7481. Switch 402 is Part # JPM 1110 available from SMK Electronics Corp., 4633 Old Ironsides Drive, Suite 403, Santa Clara, Calif. 95054.

One advantage of the circuit of FIG. 4B is its extremely low power consumption which allows the use of watch batteries 307A and 307B and results in a compact size. Also, use of microcontroller 404 with software which emulates the Microsoft mouse (FIG. 4C and Appendix A), eliminates the need for a special driver to generate button codes for transmission to a host device.

Figure 4C:
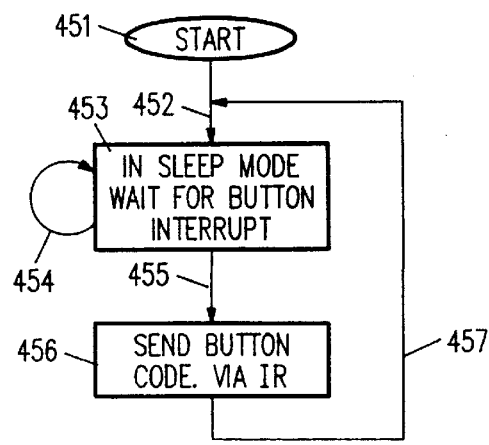
FIG. 4C is an illustrative flow chart for the software running in the microcontroller of the remote control of FIG. 4A.

FIG. 4C is an illustrative flow chart of the software running in microcontroller 404 of FIG. 4A. As shown in FIG. 4C, microcontroller 404 initializes variables in step 451 and then goes to step 453 via branch 452. Microcontroller 404 then executes steps 453 and 456 in an infinite loop as shown by branches 452, 455 and 457. In step 453, microcontroller 404 waits for a button interrupt in a SLEEP mode. Microcontroller 404 stays in step 453 as shown by branch 454, until a button interrupt is received.

As noted above, a button interrupt is generated when switch 402 is closed by a user pressing on a button surface of button 401 (FIG. 4A). Once a button interrupt is received, microcontroller 404 goes via branch 455 to step 456. In step 456, microcontroller 404 sends a button code by rapidly pulsing infrared LED 443. In one specific embodiment, a button code includes a button press code and a button released code. The button released code is sent immediately following the sending of the button pressed code. After sending infrared signal 407 (FIG. 4A), microcontroller 404 goes back via branches 457 and 452 to step 453 where microcontroller 404 continues in the SLEEP mode.

In an alternative embodiment of this invention, instead of microcontroller 404 transmitting a button released code immediately after a button pressed code, microcontroller 404 first transmits the button pressed code and when the button is released, a button released code is transmitted, as shown by the software listed in Appendix A. The Appendix A software can be compiled and linked by Motorola M68HC705KICS In-Circuit Simulator available from Motorola, Inc. (at above address).

Figure 4D:
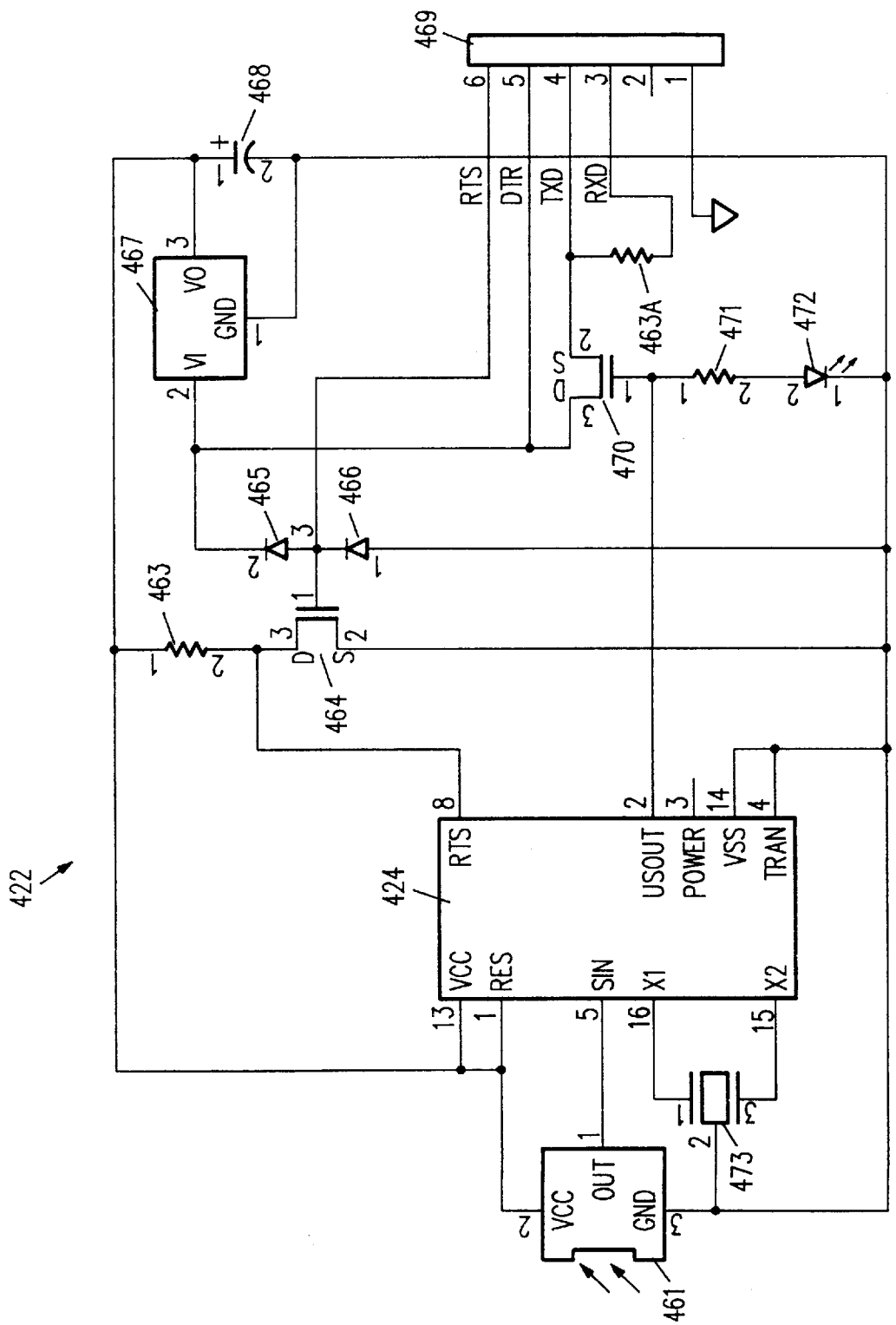
FIG. 4D is an illustrative diagram of the circuitry for connecting the signal receiver, microcontroller and microcomputer of FIG. 4A.

FIG. 4D is an illustrative circuit diagram for one embodiment of a signal receiver 422 in accordance with this invention. Signal receiver 422 is described in detail in the co-pending U.S. patent application Ser. No. 08/076,032 and filing date Jun. 15, 1993, referenced above, with 5.1K ohm resistor 463A added to pull TXD to −5V when transistor 470 is off. Pin 3 on connector 469 is RXD.

Signal receiver 422 includes an infrared photodiode 461, a microcontroller 424, a resonator 473, FETs 404 and 470, diodes 465 and 466, LED 472, capacitor 468, resistors 463, 463A and 471 and a voltage regulator 467. Signal receiver 422 derives VCC power from the serial port of a microcomputer 426 (FIG. 4A). In one embodiment, microcontroller 424 is the Motorola Microcontroller M68HC05KO (above address).

Resonator 473 is a 3.58 MHz resonator Part # KBR 3.58 MKS from Kyocera America (above address). Infrared photodiode 461 is the module GPIU52Y available from Sharp Microelectronics, 5700 NW Pacific Rim Boulevard, Camas, Wash. 98607. Transistors 464 and 470 are MOS FET, 2N7002 available from Motorola, Inc. (above address).

Figure 4E:
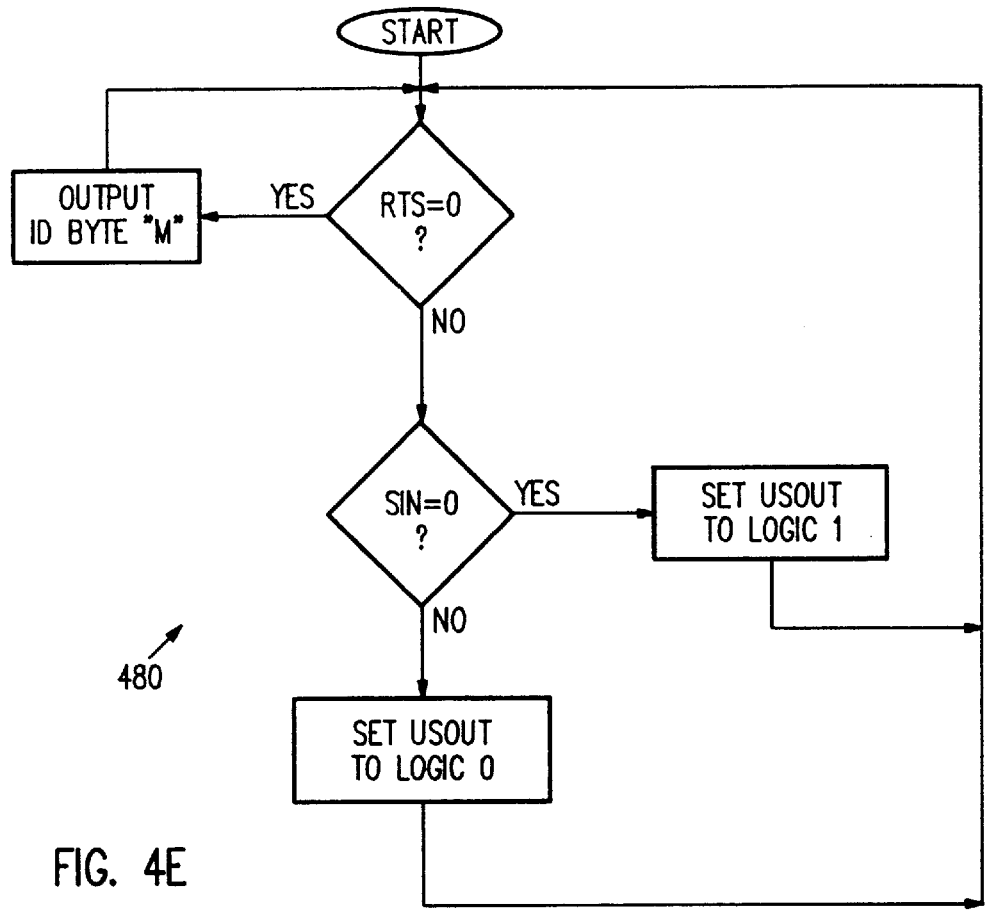
FIG. 4E is an illustrative flow chart for the software running in the microcontroller of the host device of FIG. 4A.

FIG. 4E is an illustrative flow chart 480 for the software running in the microcontroller 424 of FIG. 4D. The software for FIG. 4E is listed in Appendix A and described in detail in the copending application referenced above. The software can be compiled and linked by the Motorola M68HC705KICS (above address).

As seen from FIG. 4E, USOUT output of microcontroller 424 follows and inverts SIN input except when RTS goes low in which case an identifying ASCII byte "M" is output on USOUT.

In accordance with this invention, a user can place a storage media (such as CD-ROM 110) into a compatible peripheral of a powered up and booted host device (such as host device 120) running an operating system and automatically retrieve selections encoded in the storage media using a remote control without touching any keys or switches of the host device. To facilitate automatic detection of insertion of a storage media, a host device is installed during booting with an autostart driver which periodically polls one or more peripherals of the host device. In an alternative embodiment, the autostart driver is invoked by an interrupt from a removable storage media peripheral caused by insertion of a storage media into the peripheral.

In one embodiment of this invention, all host devices are configured with an autostart driver (described below). The autostart driver is installed during the start up of a host device such as host device 120 by inserting an instruction to install the autostart driver in "CONFIG.SYS" in a boot disk of host device 120. For example, the instruction "DEVICE EQUALS C:\V6.000\AUTOSTRT.SYS" can be inserted in CONFIG.SYS for an IBM PC host device.

Figure 5A:
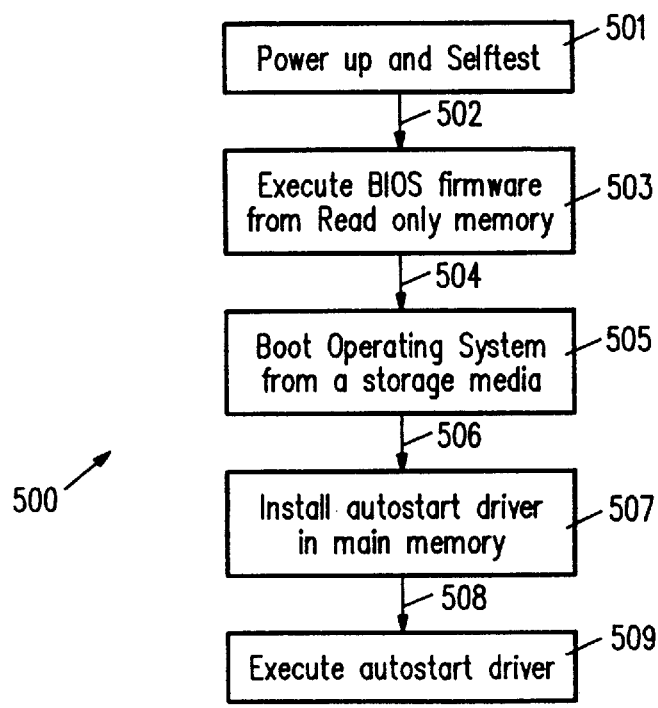
FIG. 5A is a flow chart illustrating the installation of a software driver in a host device.

In one embodiment of this invention, a host device 120 executes step by step each instruction illustrated by the flow chart 500 of FIG. 5A. When a user turns on the power to host device 120, host device 120 powers up and performs self test in step 501. Then host device 120 goes via branch 502 to step 503 where host device 120 executes firmware encoded in a ROM on the mother board of host device 120. Then host device 120 goes via branch 504 to step 505 where host device 120 boots the operating system from a storage media, wherein the storage media containing the operating system can be either a removable storage media (such as a floppy disk) or a permanent storage media which is an integral part of host device 120 (such as a hard drive). During booting, host device 120 checks for initialization files such as startup files and configuration files. On finding a valid initialization file, host device 120 uses the initialization file during booting. Then host device 120 goes via branch 506 to step 507 where host device 120 installs an autostart driver (such as driver 436) in main memory (such as memory 435). Then host device 120 goes via branch 508 to step 509 where host device 120 executes the instructions coded in the installed autostart driver.

Although not shown in FIG. 5A, host device 120 can execute several instructions unrelated to installing an autostart driver at various points not shown in flow chart 500 (such as within branch 506 to install other drivers and within branch 508 to execute other drivers).

In one embodiment of this invention, an autostart driver in a host device 120 detects insertion of a storage media and upon detection of a storage media such as CD-ROM 119 in a peripheral, seeks a file having a first predetermined name such as, the unique symbol DISGO™. A predetermined name is any name which is determined ahead of time and which is consistently used in the autostart driver and also in compatible storage media. In one embodiment of this invention, files with first and second predetermined names (such as DISGOKEY.EXE and DISGO.BAT) are present in a set of storage medias released by licensees of the owner of this patent. At the very least, a file with second predetermined name (such as DISGO.BAT) must be present on a storage media to be compatible with an autostart driver which seeks a file of the second predetermined name DISGO.BAT in accordance with this invention.

Every file having the second predetermined name (such as DISGO.BAT 430 of FIG. 4A) contains a sequence of application start-up instructions to be executed to start an application for using selections encoded in the inserted storage media. In one embodiment of this invention, the file with second predetermined name is executed by a user manually. In another embodiment of this invention, the file with second predetermined name is executed by an autostart driver of a host device.

Application start-up instructions include for example the instruction to (1) start application either from the inserted storage media or alternatively from a remote server's storage media, (2) access a specified location on the inserted storage media, (3) retrieve and display certain selections contained at a location on the storage media, and/or (4) execute certain application instructions located in memory of the host device or in the storage media.

Prior to starting an application, the autostart driver can seek to identify a security key to ensure the authenticity of the storage media and then execute the sequence of application start-up instructions once the security key has been correctly identified. For example, the key could be a uniquely identifiable encoding in the inserted storage media of a copyright notice in file of a first predetermined name (driver 436) such as, DISGOKEY.EXE.

Figure 5B:
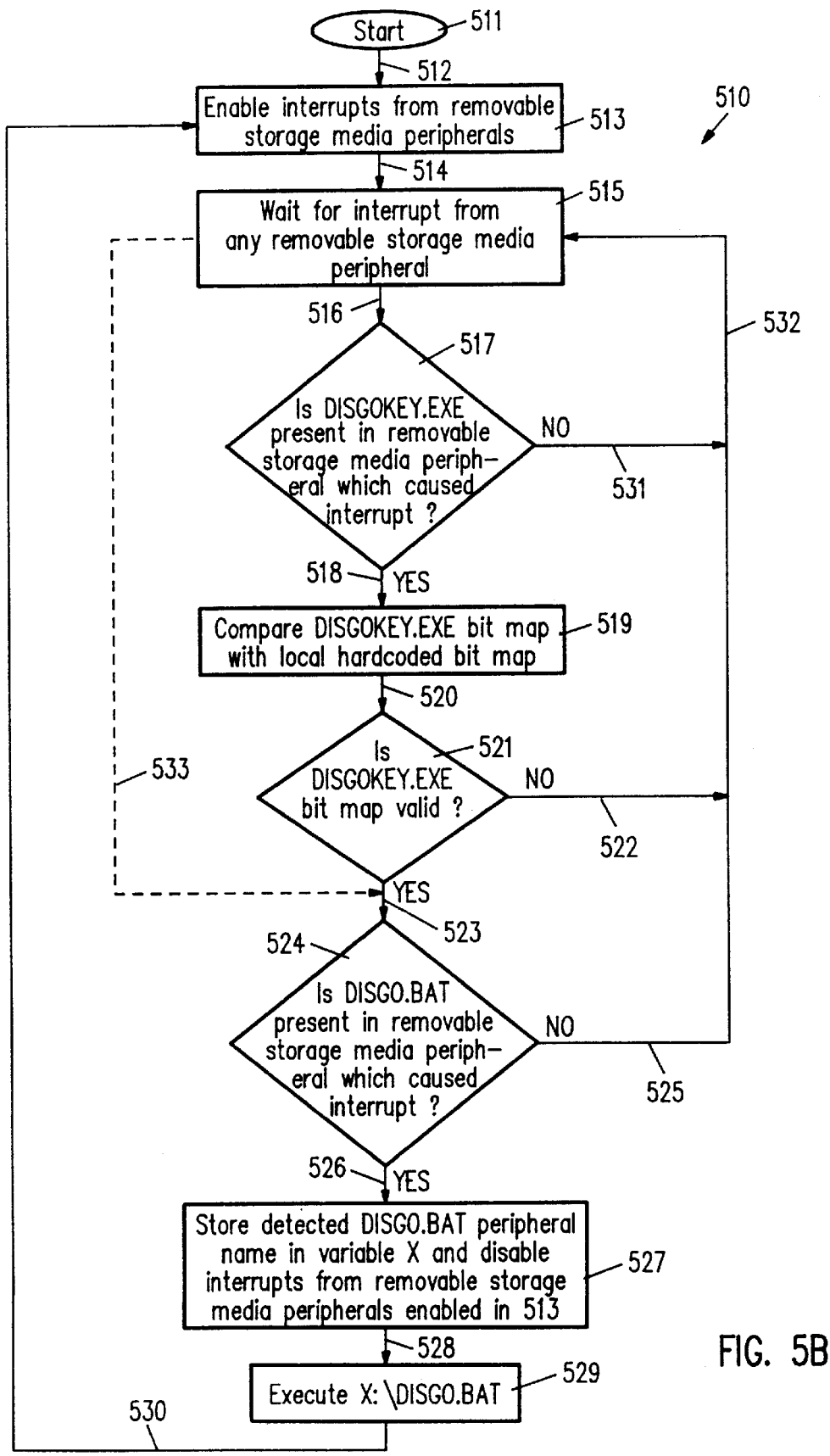
FIGS. 5B and 5C are flow charts of alternative embodiments of a software driver running in the microcomputer of FIG. 4A.

FIG. 5B is a flow chart of an autostart driver 510 running on microcomputer 426 of a host device 420 in accordance with this invention. Autostart driver 510 at first initializes variables in step 511 and goes via branch 512 to step 513. In step 513, autostart driver 510 enables interrupt from removable storage media peripherals. A removable storage media peripheral is any peripheral of a host device into which a storage media can be removably and repeatedly inserted and withdrawn, for example drive A, drive B and a CD drive of an IBM PC host device 120.

Then autostart driver 510 goes via branch 514 to step 515. In step 515, autostart driver 510 waits for an interrupt from a removable storage media peripheral. Then on receipt of an interrupt, autostart driver 510 goes via branch 516 to decision box 517. In decision box 517 autostart driver 510 checks to see if a file of a first predetermined name DISGOKEY.EXE is accessible from the removable storage media peripheral which caused the interrupt. If DISGOKEY.EXE is not accessible, autostart driver 510 goes via branches 531 and 532 back to step 515 (described above).

If DISGOKEY.EXE is accessible in the removable storage media peripheral which caused the interrupt, autostart driver 510 goes via branch 518 to step 519. In step 519, autostart driver 510 checks to see if a security key is present in a file of a first predetermined name on the storage media. For example, autostart driver 510 opens the file of first predetermined name, DISGOKEY.EXE and compares the bitmap in DISGOKEY.EXE with a bitmap locally hard coded in autostart driver 510. Then autostart driver 510 goes via branch 520 to decision box 521.

In decision box 521 autostart driver 510 checks if the bitmap in DISGOKEY.EXE was valid. If the bitmap in DISGOKEY.EXE was invalid, autostart driver 510 goes via branches 522 and 532 back to step 515 (described above). Alternatively if DISGOKEY.EXE bitmap is valid, autostart driver 510 goes via branch 523 to decision box 524.

In decision box 524, autostart driver 510 checks to see if a file of a second predetermined name DISGO.BAT is accessible from the removable storage media peripheral which caused the interrupt. If DISGO.BAT is not accessible, autostart driver 510 goes via branches 525 and 532 back to step 515 (described above). If DISGO.BAT is accessible in the removable storage media peripheral which caused the interrupt, autostart driver 510 goes via branch 526 to step 527.

In step 527 autostart driver 510 stores the peripheral name in which DISGO.BAT was found and in which DISGOKEY.EXE was found valid into a variable X. For example, autostart driver 510 can store the drive letter A in variable X if a removable storage media containing DISGO.BAT and a valid DISGOKEY.EXE was inserted in drive A of IBM PC host device 120.

Then autostart driver 510 disables the interrupt that were enabled in step 513. The disabling of interrupts allows autostart driver 510 to execute an application without being interrupted by user insertion of a removable storage media. Then autostart driver 510 goes via branch 528 to step 529. In step 529 autostart driver 510 executes the command X:DISGO.BAT which executes instructions in DISGO.BAT of the removable storage media inserted by a user into the peripheral of host device 120. DISGO.BAT in turn loads into main memory at least a portion of the software of the application encoded on the inserted storage media and then passes control to the application. The application interprets the button codes of the wireless signal transmitted by a user pressing an associated button of a remote control (as described below) in accordance with this invention.

Once the application has terminated, control returns from the application to step 529 of autostart driver 510. Autostart driver 510 goes via branch 530 back to step 513 (described above) which allows autostart driver 510 to continue to be responsive to the insertion of a storage media into a peripheral of host device 120.

In another embodiment of this invention, in step 529, instead of the autostart driver executing the instructions in DISGO.BAT as shown in FIG. 5B, the autostart driver starts up or spawns a new process which executes the instructions in DISGO.BAT.

When autostart driver 510 fails to find a DISGO.BAT or fails to find a DISGOKEY.EXE or if DISGOKEY.EXE bitmap is invalid, autostart driver 510 returns to step 515 (as noted above) so that a user can invoke other applications encoded on a removable storage media in the conventional manner, thus bypassing the automatic startup feature provided by autostart driver 510.

In an alternate embodiment of this invention, an autostart driver 510 skips steps 517, 519 and 521 in which a security key is checked. In such an embodiment, autostart driver 510 goes from step 515 via branch 533 (shown dotted) to step 523.

Figure 5C:
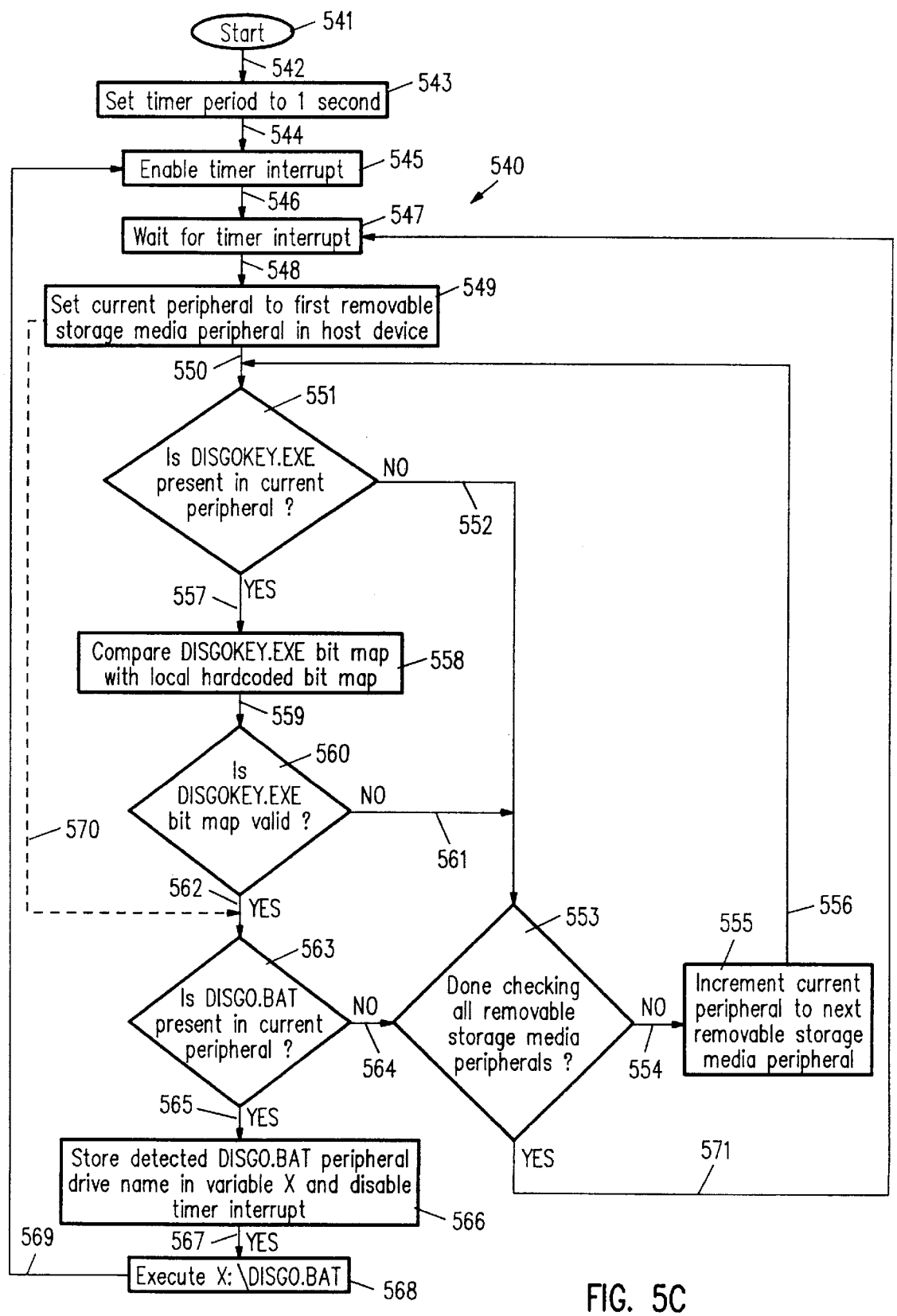

FIG. 5C shows an alternative embodiment of an autostart driver 540 in accordance with this invention. Autostart driver 540 is similar to autostart driver 510 except that instead of setting up and waiting on interrupts from removable storage media peripherals, autostart driver 540 sets up a timer interrupt and waits on the timer interrupt, thereby periodically checking the peripherals of a host device such as host device 120.

Autostart driver 540 initializes variables in step 541 and goes via branch 542 to step 543. In step 543, autostart driver 540 sets a timer period to one second. Then autostart driver 540 goes via branch 544 to step 545. In step 545 autostart driver 540 enables the timer interrupt.

Then autostart driver 540 goes via branch 546 to step 547. In step 547 autostart driver 540 waits for a timer interrupt. Then autostart driver 540 on receiving an interrupt from the timer (which occurs after one second, the timer period set in step 543) autostart driver 540 goes via branch 548 to step 549. In step 549, autostart driver 540 sets the current peripheral variable to the name of the first removable storage media peripheral in host device 120. Then autostart driver 540 goes via branch 550 to decision box 551. In decision box 551 autostart driver 540 checks to see if the file DISGOKEY.EXE is present in the peripheral having the name in the current peripheral variable. If autostart driver 540 is unsuccessful (either because a storage media is not present in the current peripheral or the file DISGOKEY.EXE is not present in the storage media) then autostart driver 540 goes via branch 552 to decision box 553.

In decision box 553 autostart driver 540 decides whether all removable storage media peripherals of host device 120 have been checked during the current timer interrupt. If autostart driver 540 finds that not all the removable storage media peripherals have been checked, autostart driver 540 goes via branch 554 to step 555. In step 555 autostart driver 540 increments the current peripheral variable by setting the peripheral name of the next removable storage media peripheral to the current peripheral variable. Then autostart driver 540 goes via branch 556 and 550 back to decision box 551 (described above). If all of the removable storage media peripherals have been checked in decision box 553, then autostart driver 540 goes via branch 571 to step 547.

If DISGOKEY.EXE was found by autostart driver 540 in decision box 551, autostart driver 540 goes via branch 557 to step 558. Step 558, branch 559 and decision box 560 are similar to step 519, branch 520 and decision box 521 (described above in reference to FIG. 5B). If autostart driver 540 is unsuccessful in decision box 560, autostart driver 540 goes via branch 561 to decision box 553 (described above). If autostart driver 540 is successful in decision box 560, autostart driver 540 goes via branch 562 to decision box 563. In decision box 563, autostart driver 540 checks if DISGO- .BAT is present in the current peripheral. If autostart driver is unsuccessful in decision box 563, autostart driver 540 goes via branch 564 to decision box 553 else autostart driver 540 goes to step 566 via branch 565.

In step 566 autostart driver 540 stores the name of the peripheral in which DISGO.BAT was found in variable X and disables the timer interrupt enabled in step 535. Then autostart driver 540 goes via branch 567 to step 568 which is similar to step 529 (FIG. 5B). Once the application has completed, and control has returned to autostart driver 540, autostart driver 540 goes via branch 569 to step 545 described above.

In an alternative embodiment of autostart driver 540, decision box 551, step 558 and decision box 560 are skipped by using branch 570 (shown dotted) to go from step 549 to step 563.

Although in FIGS. 5A, 5B and 5C, the host device is shown being configured with an autostart driver which is a separate executable image, the instructions to a host device shown in FIG. 5A, 5B and 5C can be issued in other forms suitable for the host device (such as commands to the operating system).

Although in one embodiment of this invention, the autostart driver includes instructions executed by a central processing unit, in an alternative embodiment, the host device includes a first hardwired logic which detects insertion of a storage media into a peripheral. A second hardwired logic checks the inserted storage media for a file of a first predetermined name and compares a bitmap in the file with a bitmap stored in a read only memory. In another embodiment, there is a third hardwired logic which checks for a file of a second predetermined name. In one specific embodiment of this invention, the first, second and third hardwired logics are all included in the peripheral's hardware and generate an autostart interrupt to the central processing unit on a successful result. On receipt of the autostart interrupt, the central processing unit executes the file of the second predetermined name from the peripheral which generated the autostart interrupt.

Figure 5D:
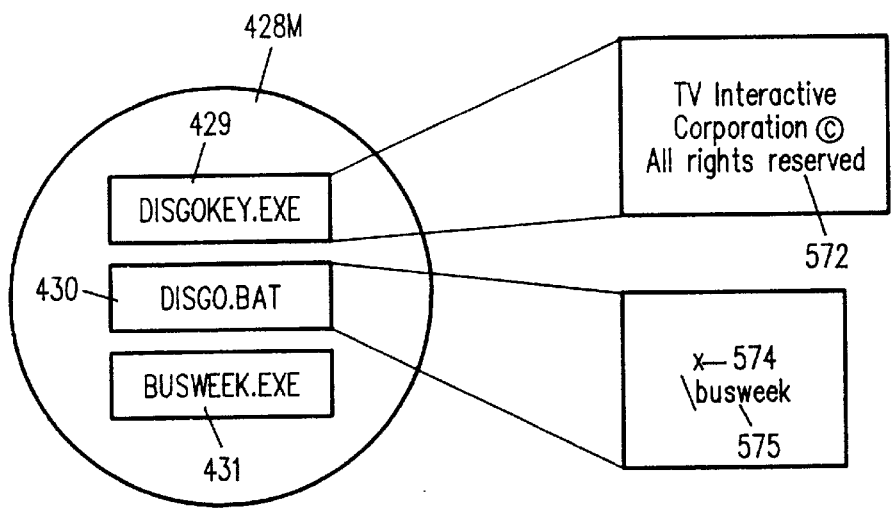
FIG. 5D illustrates the commands for starting an application in the DISGO.BAT file executed by the software driver of FIGS. 5A, 5B and 5C.

FIG. 5D shows the contents of the file with second predetermined name DISGO.BAT 430 which is invoked in step 524 by autostart driver 510 and in step 563 by autostart driver 540. DISGO.BAT 430 contains the operating system command 574 which reads "X:". Operating system command 574 changes the current default drive to the drive in which a storage media has been inserted. The next command in DISGO.BAT 430 is operating system command 575 which reads "\busweek". Operating system command 575 initiates the running of an application encoded as BUSWEEK.EXE 431 (FIG. 4A).

While in one specific embodiment of this invention, the application is encoded as BUSWEEK.EXE 431, other file names (such as FIREBOOK.EXE) can be used for an application so long as the same name is consistently used in operating system command 563 in file with second predetermined name DISGO.BAT 430 (which contains the application startup instructions which start the application for using selections on the inserted storage media).

Therefore when an autostart driver is installed in a host device, this invention allows applications encoded in compatible storage media (as described above) to start up automatically without any additional user input, soon after a storage media is inserted into a peripheral of the host device. Therefore once a host device is powered up, booted and installed with an autostart driver, a user need not touch any keys or switches of a host device, and can merely insert a storage media to start an application in accordance with this invention.

FIG. 5D also illustrates a copyright notice 564 which is used as a security key bitmap and which is compared with an identical copyright notice bitmap locally hard coded in autostart drivers 510 and 530.

One advantage of the autostart driver of this invention is that the user need not have any computer knowledge to start an application. Pre-school children can now enjoy interactive media without even toggling a power switch (for example, merely inserting a storage media into a host device). Although an autostart driver is used to start an application for a remote control in one embodiment of this invention, an autostart driver can also automatically start other applications such as LOTUS 1-2-3™ and Word Perfects if so programmed.

An application for displaying selections encoded on a storage media is a simple software program which stores and manipulates many types of data including: graphics files for the pictures, text files for the captions, sound files for captions (for a picture interactive book) and video recording files.

One embodiment of a remote control intended for educative interactive media includes associated electronic content of drawings and voice recordings of words, numbers and/or facts. The selections of words, numbers and/or facts, drawings and voice recordings are organized by category (such as a category of "FISH" selections and another category of and "BIRDS" selections) and each category is accessed by a different button.

Figures 5F, 5G, 5H:
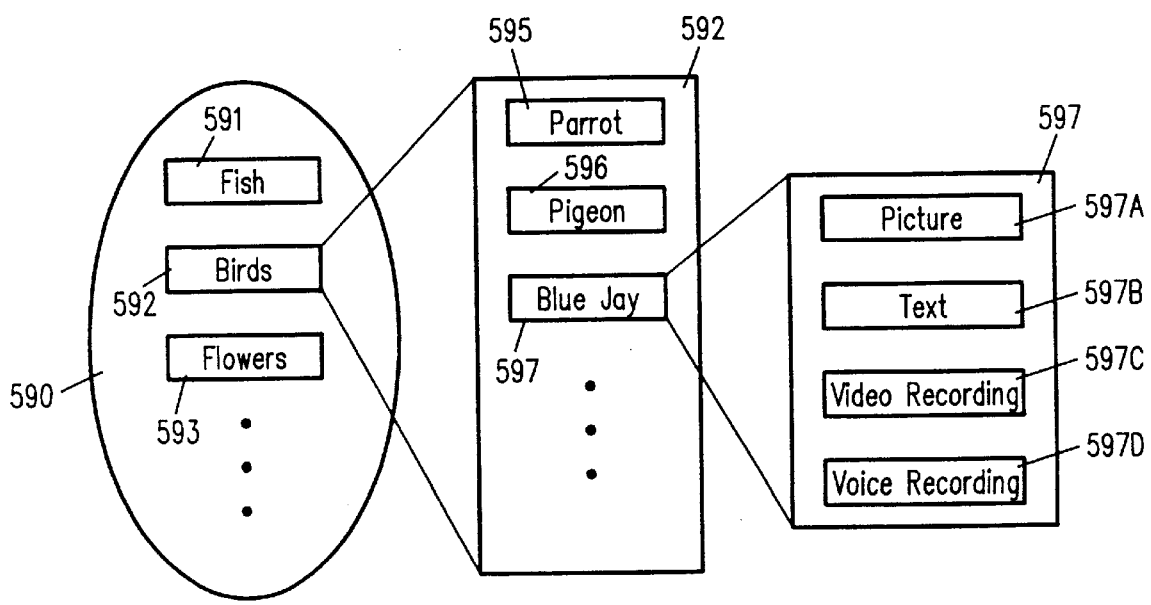
FIGS. 5F, 5G and 5H illustrate electronic content for use with the application of FIG. 5E.
Figure 5E:
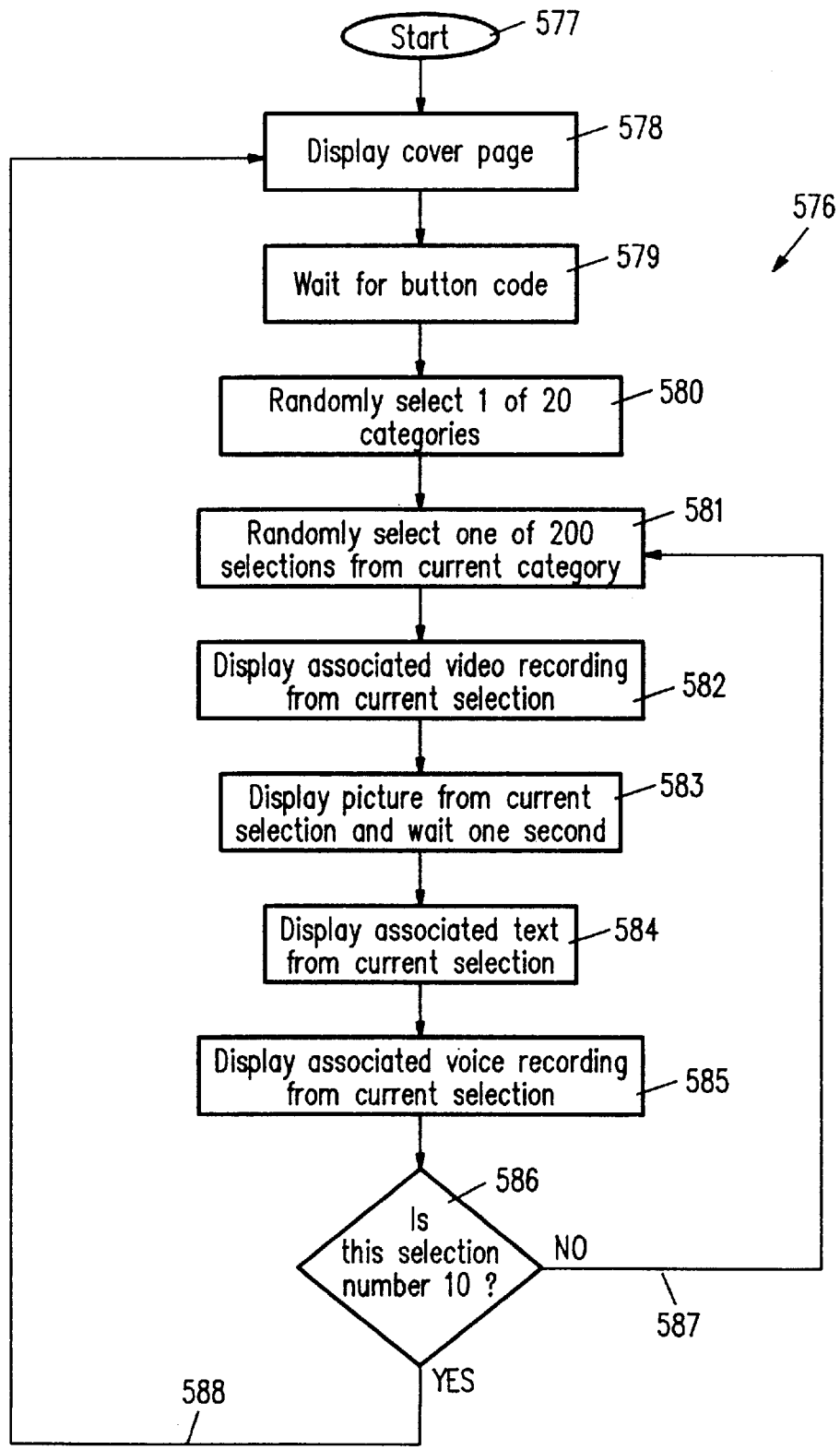
FIG. 5E is an illustrative flow chart of an application running in the microcomputer of FIG. 4A.

FIG. 5E illustrates a flow chart for one embodiment of an application 570 for use with a remote control entitled "Teach Your Baby to Read" which has associated electronic content containing twenty categories, each category containing 200 selections, each selection containing a picture, text, video recording and voice recording. When a storage media containing the associated electronic content is inserted, application 576 initializes in step 577 and displays the title screen of the interactive media in step 578. Application 576 then waits for a button code from the remote control in step 579. On receiving an appropriate button code, in step 580 application 576 randomly picks one of the 20 categories as the current category. Next in step 581, the application randomly picks one of 200 selections of words from the current category.

Next in step 582, application 526 displays the associated video recording from the current selection. Next in step 583, application 576 display the picture from the current selection and waits for one second. In step 584 application 576 displays the associated text from the current selection. Then in step 585, application 576 displays the associated voice recording from the current selection. In step 586, application 576 increases the selection count and compares the selection count with 10 to see if ten selections have been displayed. If ten selections have not been displayed, application 576 takes branch 587 and returns to step 581. If the word count indicates that ten selections have been displayed, application 576 goes from step 586 via branch 588 to step 578.

In an alternative embodiment the application is driven by an interrupt caused by receipt of a button code instead of a wait for one second (in step 583) prior to displaying the voice recording.

An application similar to application 576 is used with a picture book remote control. Instead of randomly selecting and displaying a word, the picture book application sequentially displays the cover page, then the first selection and then the second selection and so on, until all selections are displayed and then the back cover is displayed, after which the front cover is again displayed. Such an application implements the functions indicated by the buttons on the remote control, such as "NEXT", "PREVIOUS", "BEGIN" and "END" (shown in FIGS. 2A and 2B on a different remote control).

FIGS. 5F, 5G and 5H illustrate the electronic content which can be used with an application 576 shown in FIG. 5E. As shown in FIG. 5F, electronic content 590 includes fish category 591, birds category 592 and flowers category 593. As shown in FIG. 5G, birds category 592 includes a parrot selection 595, pigeon selection 596 and blue jay selection 597. As shown in FIG. 5H, a blue jay selection 597 includes a picture file 597A, text file 597B, video recording file 597C and voice recording file 597D.

Application 576 can be used with electronic content 590 wherein birds category 592 is randomly selected from the various categories in step 580. Then in step 581, a blue jay selection 597 is randomly selected from category 592. Then in step 582 video recording 597C is retrieved from a storage media containing electronic content 590 and displayed to the user on a display device (suitable for displaying a video recording). Then in step 583 application 576 displays picture 597A from selection 597 on the display device. Then in step 584 application 576 displays text 597B from selection 597 on the display device. Next in step 585 application 576 displays a voice recording 597D from selection 597.

Figure 6A:
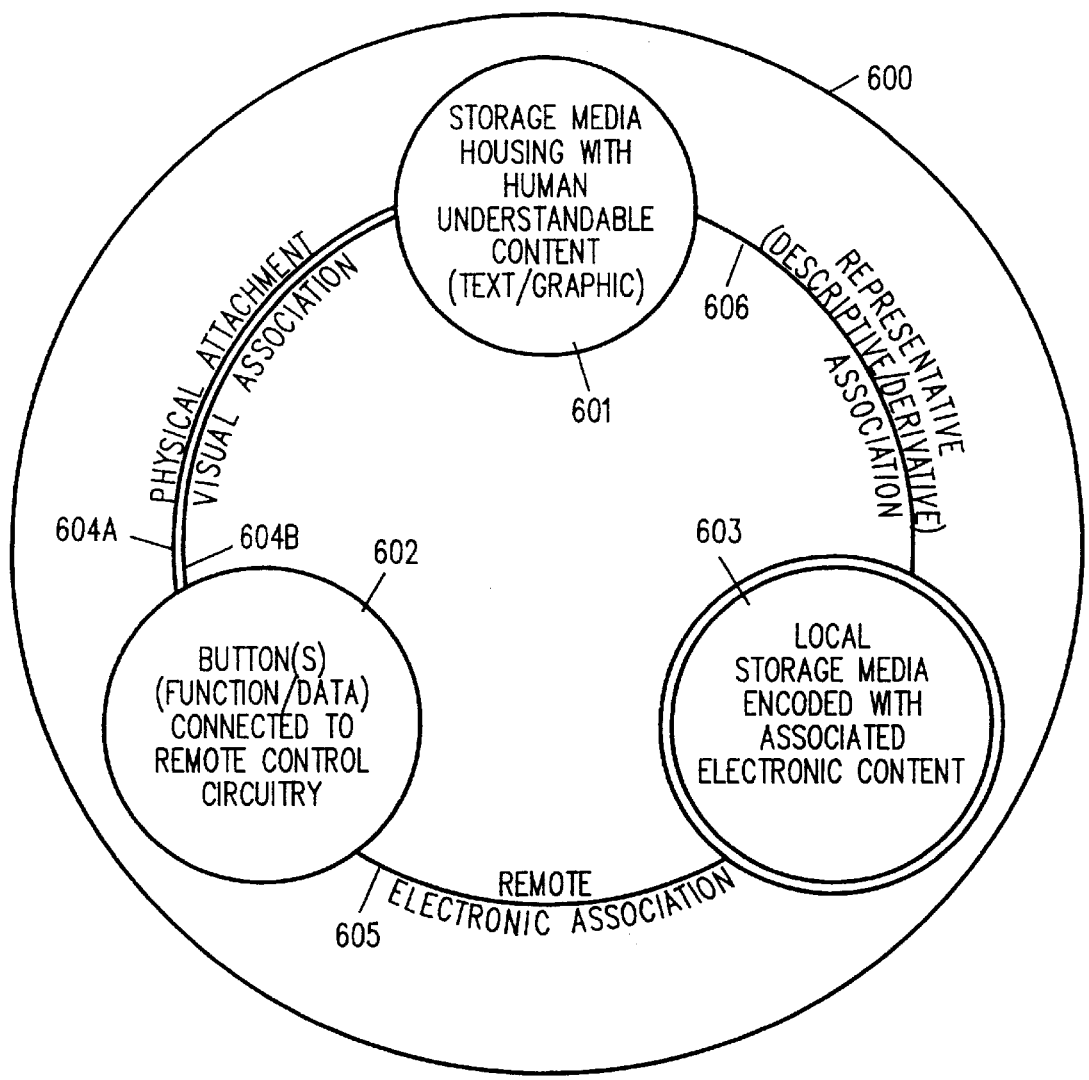
FIG. 6A illustrates a storage media remote control in accordance with this invention.

FIG. 6A illustrates a storage media remote control 600 in accordance with this invention. Such a storage media remote control 600 includes a local storage media 603 and a storage media housing 601. In FIG. 6A, local storage media 603 is shown highlighted (double circle) to indicate that the storage media is an essential feature included in remote control 600. A storage media remote control 600 is similar to printed publication remote control 10 (above) except that storage media housing 601 can be in any arbitrary shape and size including a holder designed to hold a storage media. Storage media housing 601 is inclusive of but is not limited to a printed publication. Human understandable content of housing 601 can be in any form such as text and/or graphics which are engraved, laminated and/or printed on housing 601.

Storage media housing 601 can be any housing that can removably hold a storage media such as a printed publication with a CD-ROM holder, an audio/video CD box and the jacket of a floppy disk. Storage media housing 601 has human understandable content such as text and/or graphic content.

Storage media remote control 600 also includes one or more button(s) 602 and associated electronic content encoded on a local storage media 603. Button(s) 602 have a physical attachment 604A to storage media housing 601. Also, button(s) 602 have a visual association 604B to the human understandable content of storage media housing 601.

Each of buttons 602 can include a switch connected to remote control circuitry supported by housing 601. The remote control circuitry is capable of transmitting a wireless signal with an encoded button code from remote control 600 to a host device (not shown in FIG. 6A) having a suitable peripheral to retrieve selections from local storage media 603. Therefore there is a remote electronic association 605 between button(s) 602 and associated electronic content encoded on local storage media 603. There is a representative (descriptive/derivative) association 606 between the human understandable content of housing 601 and associated electronic content encoded on local storage media 603.

Figure 6B:
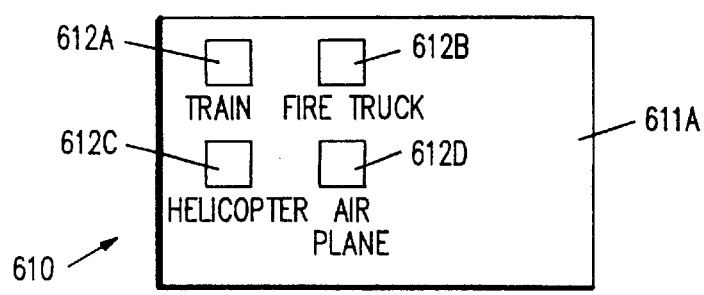
FIGS. 6B and 6C are illustrations of one embodiment of a storage media remote control in the closed and open position respectively.
Figure 6C:
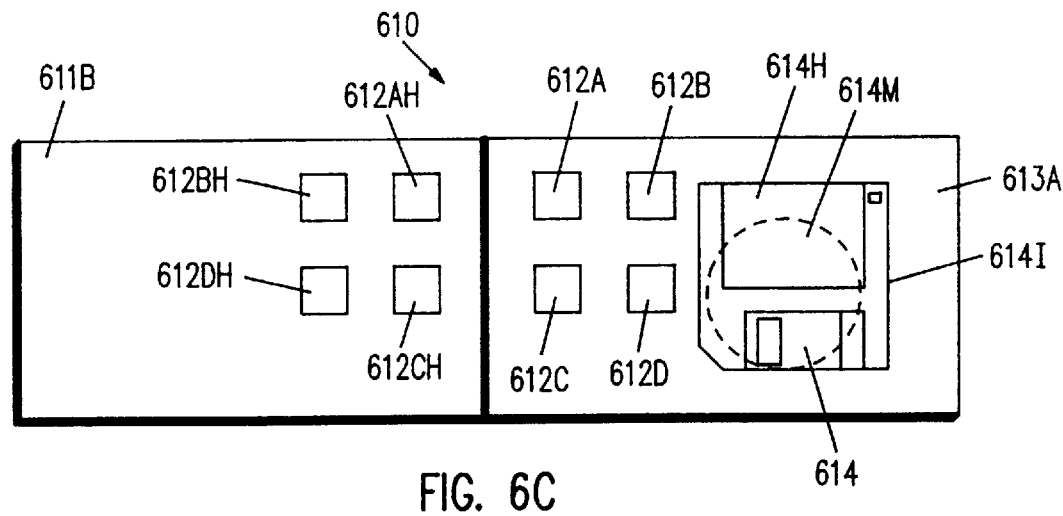
Figure 6D:
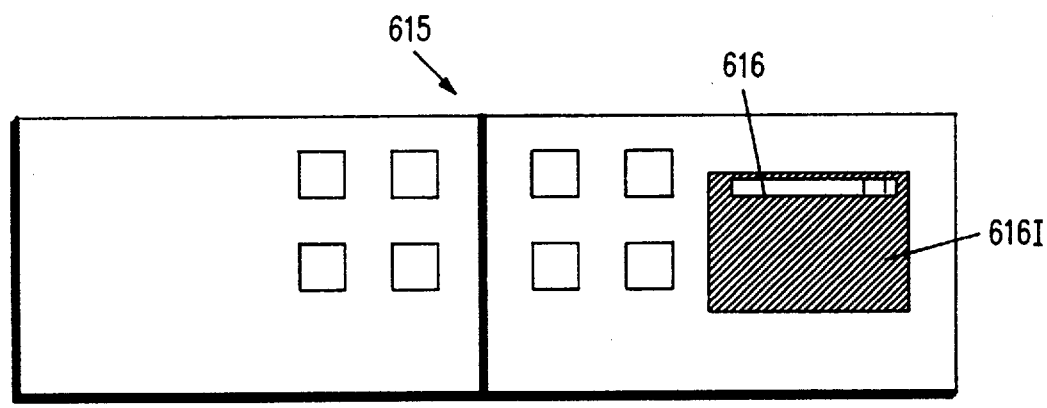
FIGS. 6D and 6E are illustrations of alterative embodiments of a storage media remote control.

FIGS. 6B and 6C are illustrations of one embodiment of a storage media remote control 610 in the closed and open position respectively. Storage media remote control 610 is intended for pre-school children and is called "TRAINS, PLANES and AUTOMOBILES". Storage media remote control 610 has four buttons 612A, 612B, 612C and 612D visually associated with text content "TRAIN", "FIRE TRUCK", "HELICOPTER" and "AIRPLANE" respectively located adjacent to the respective buttons. Buttons 612A, 612B, 612C and 612D of storage media remote control 610 are mounted on back cover 613A and are accessible through holes 612AH, 612BH, 612CH, and 612DH in front cover 611B when storage media remote control 610 is shut. As front cover 611B and back cover 613A form a printed publication, storage media remote control 610 can also be described as a printed publication remote control (described above).

A storage media in the form of a floppy disk 614 includes a magnetic disk 614M (dotted line) enclosed in a floppy disk housing 614H. Floppy disk 614 is removably mounted in a floppy disk cavity formed by inner periphery 614I of back cover 613A. Floppy disk 614 can be inserted into a floppy drive of a host device to make the associated electronic content encoded in floppy disk 614 accessible to the host device.

The associated electronic content in floppy disk 614 includes four selections namely, a train selection, a fire truck selection, a helicopter selection and an airplane selection. There is a remote electronic association between each of four buttons 612A, 612B, 612C and 612D and a corresponding one of the four selections encoded in floppy disk 614. As buttons 612A, 612B, 612C and 612D are data buttons, storage media remote control 610 can also be described as a data button remote control (described below).

Pressing TRAIN button 612A causes an associated button code to be transmitted by storage media remote control 610. An application on a host device responds by displaying a train selection from floppy disk 614. A train selection can include a drawing, a caption word and/or sentence, an audio recording, and/or a video recording of a train. In one specific embodiment, on receiving the button code of train button 612A, the application displays a thirty second full motion video recording of a train accompanied by high-quality sound.

Figure 6E:
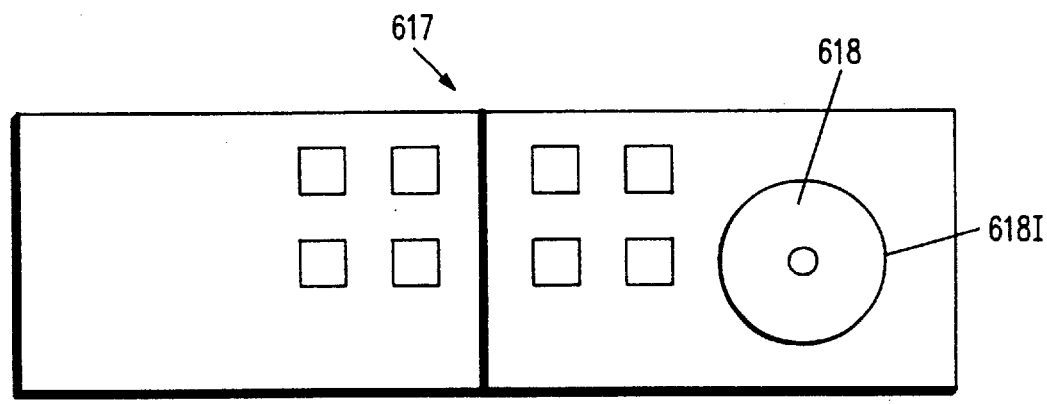

FIGS. 6D and 6E are illustrations of two embodiments of storage media remote controls 615 and 617 which hold a storage media in accordance with this invention. Storage media remote controls 615 and 616 include printed publications with integral storage media holders built into the printed publications. Therefore storage media remote controls 615 and 617 can also be described as printed publication remote controls (described above).

Storage media 615 has a holder with an inner periphery 616I which forms a cavity for holding a game cartridge storage media 616. Storage media 617 has an inner periphery 618I which forms a cavity for holding a CD-ROM storage media 618.

Figure 6G:
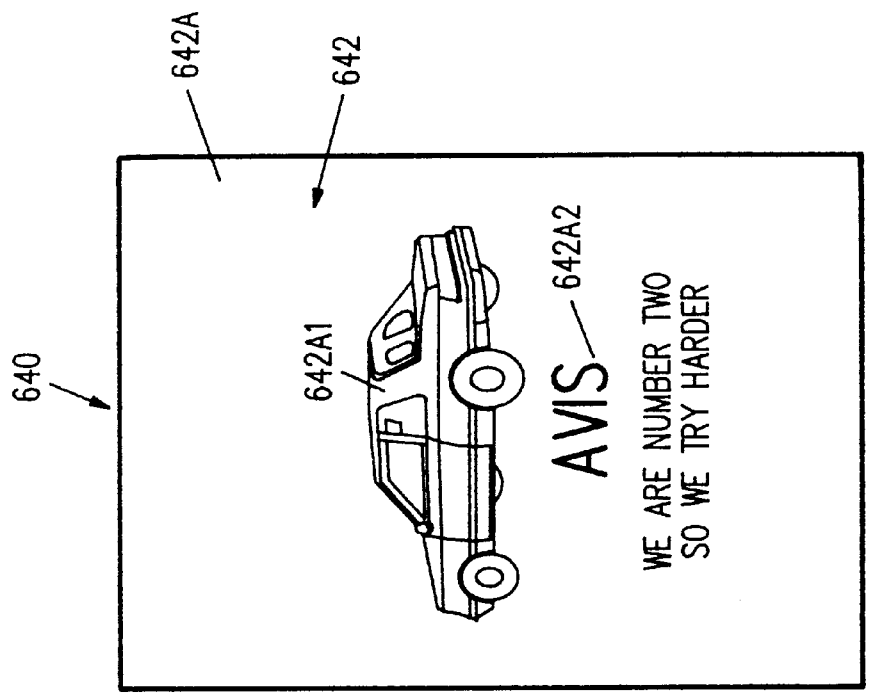
FIGS. 6F, 6G and 6H illustrate an embodiment of a storage media remote control in the form of a magazine.
Figure 6F:
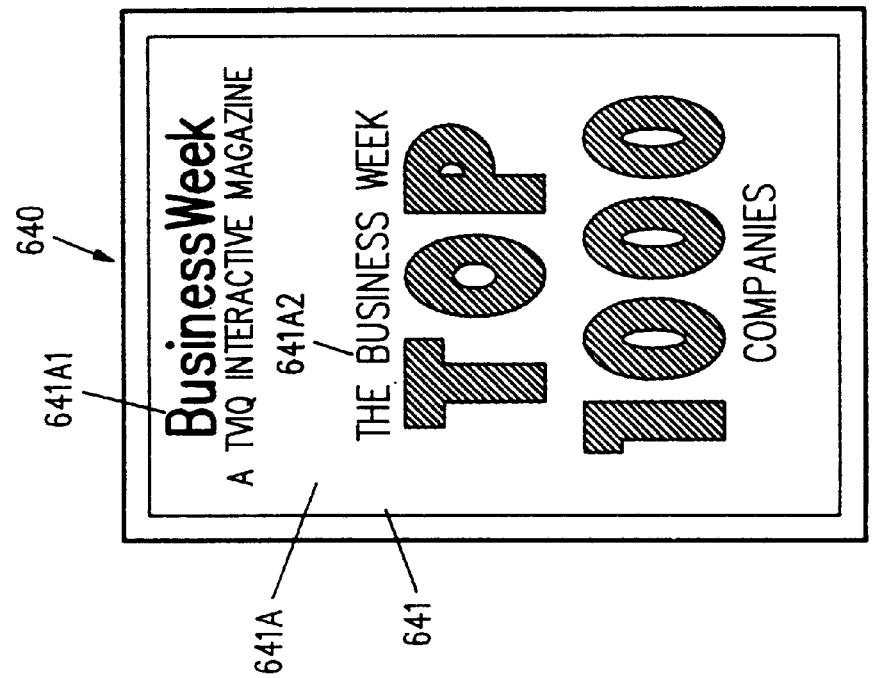
Figure 6H:
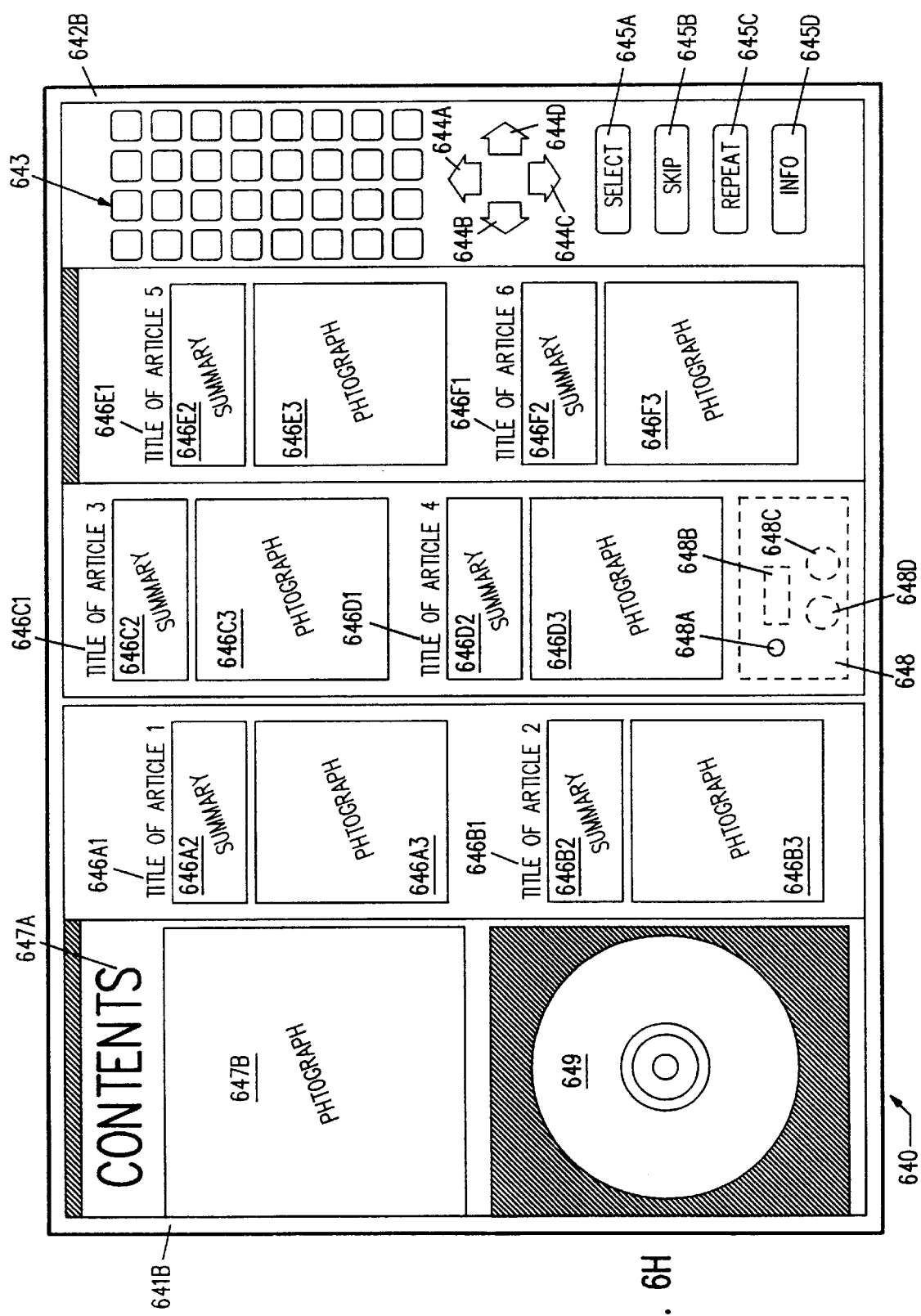

FIGS. 6F, 6G and 6H illustrate an alternative embodiment of a storage media remote control 640 (henceforth "periodical remote control"). Periodical remote control 640 can contain electronic content similar to the articles in a conventional magazine. Periodical remote control 640 has a front cover 641 (FIG. 6F) and a back cover 642 physically attached to each other. In one embodiment, front cover 641 and back cover 642 are the front and back covers of a conventional magazine (such as NEWSWEEK, TV GUIDE and READER'S DIGEST).

In another embodiment, an outer side 641A of front cover 641 has a look and feel similar or identical to the outer side of the front cover of a conventional magazine, and outer side 642A of back cover 642 similar to the outer side of a conventional magazine's back cover (an advertisement). In one embodiment, there are no pages inside periodical remote control 640.

On inner side 641B of front cover 641 (FIG. 6H) is mounted a storage media 649 in the form of a CD ROM. The rest of the inner side 641B of front cover 641 looks similar to the table of contents of a conventional magazine. Inner side 641B of front cover 641 has a text content 647A which reads "CONTENTS" and a graphic content 647B which is a photograph. Front cover inner side 641B and back cover inner side 642B identify a number of electronic content selections encoded in storage media 649.

In the specific embodiment of periodical remote control 640 shown in FIG. 6H, each selection is identified by text and graphic content in the form of a title, a summary and a photograph. For example, a first selection is identified by title 646A1, summary 646A2, and photograph 646A3. A second article selection is identified by title 646B1, summary 646B2 and photograph 646B3.

The inner side 642B of back cover 642 also identifies additional selections such as a third article selection with title 646C1, summary 646C2 and photograph 646C3. Three other selections with titles 646D1, 646E1 and 646F1, with summaries 646D2, 646E2 and 646F2, and photographs 646D3, 646E3, and 646F3 are also identified on back cover 642.

In another embodiment, periodical remote control 640 is a catalog of products with each selection including a video recording of the product, the title (such as title 646C1) being the product's name, the summary (such as summary 646C2) being a product description and the photograph (such as photograph 646C3) being a photograph of the product.

In accordance with this invention, physical attachments 14A, 604A and 674A can be implemented by the adhesion of printed ink to the surface of a button and visual associations 14B, 604B and 674B implemented by the location of the printed content directly on the button surface.

In one embodiment of this invention, each of the text and/or graphic content is printed on the surface of a button capable of causing a wireless signal to be transmitted by remote control 640. For example, title 646A1, summary 646A2 and photograph 646A3 are each printed on a button surface different from each other. In one embodiment, each of the buttons identifying a given selection cause the same button code to be transmitted. In another embodiment, each of the buttons identifying a given selection are all printed on a single button surface.

In one specific embodiment of this invention, the buttons of a periodical remote control are membrane buttons available from EECO Membrane Switch Operations, 2949 N. 31st Ave., Phoenix, Ariz. 85017. Front cover 641 and back cover 642 include a heat stabilized polyester membrane on which text and photographs are screen printed, an upper circuit of heat stabilized polyester on which conductive inks are screen printed, a spacer die cut layer of dielectric, a lower circuit layer of heat stabilized polyester on which conductive inks are screen printed, an adhesive layer and a bottom mounting layer. Such a periodical remote control can be made using membrane switches as described in "Designer's Specification Guide" available from EECO Membrane Switch Operations, 2949 North 31st Avenue, Phoenix, Ariz. 85017, which is incorporated herein in its entirety.

In an alternative embodiment, front cover inner side 641B and back cover inner side 642B are touch panels which when touched cause a wireless signal to be transmitted (as described below in reference to FIGS. 7D, 7E, 7F, 7G and 7H).

Back cover inner side 642B has an array of buttons 643, which can be alphanumeric buttons arranged in a manner similar to conventional PC keyboards or a conventional telephone keypad. Back cover inner side 642B also has other buttons such as arrows 644A, 644B, 644C and 644D which permit a user to remotely move a cursor on monitor 122 (FIG. 1E). Also provided on back cover innerside 642B are special function buttons: SELECT button 645A, SKIP button 645B, REPEAT button 645C and INFO button 645D.

Back cover innerside 642B supports a remote control circuitry 648 which includes infrared LED 648A (covered by a surface transparent to infrared light), a microcontroller 648B and batteries 648C and 648D, all connected in the manner described below (in reference to FIG. 7A). In one embodiment of this invention, the periodical remote control is paper thin and is flexible (using a flexboard instead of a printed circuit board).

Therefore, the buttons for a periodical remote control are simply regions on the Table of Contents printed on the front and back covers of a remote control. To use periodical remote control 640, the user removes storage media 649 from a holder built into front cover 640 and inserts storage media 649 into a host device such as host device 120 (FIG. 1E). In another embodiment of a periodical remote control, there is no storage media and holder, and the host device access associated electronic content from a remote server (FIG. 1E).

In one specific embodiment, a Business Week remote control has a CD storage media. The host is a 3DO game platform with a video CD player available from Panasonic Company of America, 6550 Katella Ave., Cypress, Calif. 90630. To use the Business Week remote control, the user inserts the CD into the video CD player of the 3DO game platform (which has been booted and installed with an autostart driver).

As soon as a storage media of a periodical remote control is inserted into a peripheral of a host device 150 (FIG. 1F), monitor 141 displays a 30 second preview of major selections available in the inserted storage media. Thereafter, the application in host device 150 displays a continuous commercial break which involves randomly selecting and displaying forever, one of 40 commercials encoded in the inserted storage media. Each commercial has a format identical to a television commercial.

The continuous commercial break continues until the user selects an article by pressing one of the article selecting buttons in the Table of Contents of the periodical remote control. For example, to display a selection described in title 646A1, summary 646A2 and photograph 646A3, a user merely touches any one of touch sensitive regions 646A1, 646A2 or 646A3.

When any one of the touch sensitive regions is touched, periodical remote control 640 sends a wireless signal to host device 120. An application in host device 120 retrieves from storage media 649 an article preview selection which is a 30-second preview of the article indicated by the touched region and displays the retrieved results. Double touching of a touch sensitive region retrieves the article selection rather than the article preview selection. An article selection can include an hour long real TV program which is displayed on monitor 122. During display of an article selection in one embodiment, a commercial selection is randomly retrieved and displayed every few minutes, interrupting the display of the article selection.

While a selection is being displayed, touching a SKIP button 645B causes periodical remote control 640 to send a wireless signal which causes the host device application to skip the selection currently being displayed and jump to a continuous commercial break (where random commercials are automatically played until another article selection is indicated by the user). If SKIP button 645B is pressed during a commercial interruption of an article selection display, the interrupted article selection display is resumed.

If SKIP button 645B is pressed during a continuous commercial break, the currently playing commercial is interrupted (skipped) and another randomly selected commercial is started immediately.

If REPEAT button 645C is pressed during a continuous commercial break, the commercial selection currently being displayed is interrupted and the commercial displayed immediately previous to the current commercial is displayed.

Pressing INFO button 645D starts a DETAIL mode program that opens up a dialog box (not shown) on monitor 141 which allows the user to interactively access more detailed information about the product being advertised. For example, in one embodiment (see step 865F in FIG. 8D described below) the user is presented with a form to be filled out to create a purchase order of the product being advertised. Once the user fills out (see step 865G) the form, host device 120 automatically communicates (see step 865H) with the advertiser via modem 144A and phone line 145A. In another embodiment of this invention, the DETAIL mode dialog box permits access to a complete index of advertisers from which the user can interactively choose a desired commercial selection to be displayed.

Pressing INFO button 645D during display of an article selection opens a DETAIL mode dialog box which provides detailed information about the article selection being currently displayed.

Pressing REPEAT button 645C during display of a commercial selection results in the commercial selection previously displayed to be re-displayed immediately. REPEAT button 645C can be pressed multiple times to sequentially go backwards to any commercial selection previously displayed (up to 255 commercials with wrap-around).

A special preview selection provides a preview of all the article selections encoded in storage media 648. The preview selection has a normal television commercial selection format (similar to a 30 second synopsis of the television show "60 minutes").

In one embodiment of this invention, a periodical remote control includes a front cover, a back cover and printed pages between the front cover and back cover. The printed pages are identical to the pages between the covers of the conventional printed version of a magazine. Some of the printed pages are normal printed pages while other printed pages are touch sensitive pages. The printed pages containing the Table of Contents are touch sensitive (as described above).

Although periodical remote control 640 has been described above as having a removable storage media 648 another periodical remote control in accordance with this invention has all of the features of periodical remote control 640 except for storage media 649 and the corresponding holder.

Figure 6I:
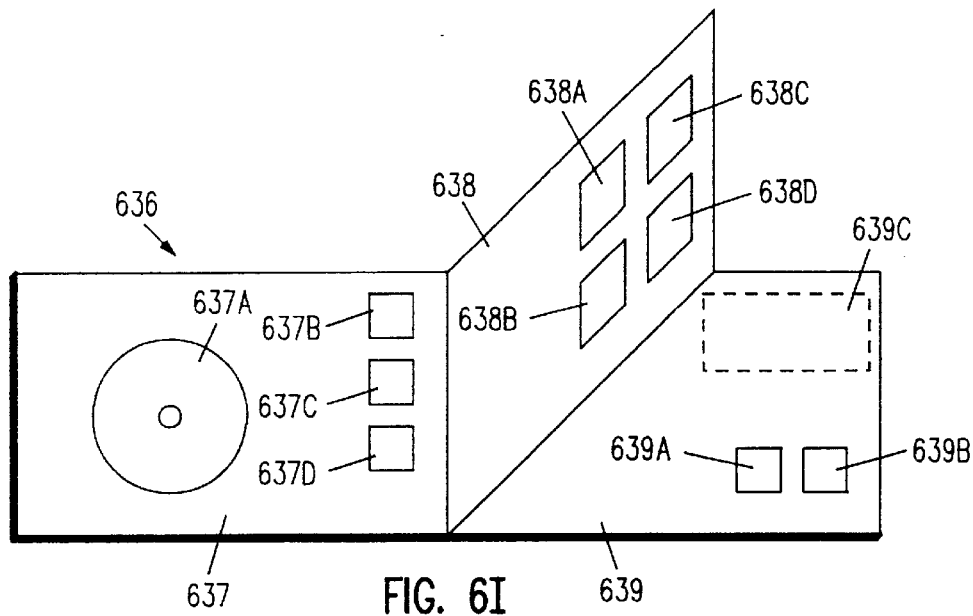
FIG. 6I illustrates an embodiment of a storage media remote control having multiple pages.

FIG. 6I illustrates an alternative embodiment of a storage media remote control 636 in the form of a multi-page book having a front cover 637, a page 638 and a back cover 639. On front cover 637 are mounted a CD ROM 637A and buttons 637B, 637C and 637D. Page 638 has buttons 638A, 638B, 638C and 638D. On back cover 639 are mounted buttons 639A and 639B and remote control circuitry 639C (which includes components such as, a microcontroller and an infrared LED). Although only one page 638 is shown in FIG. 6J, multi-page remote control 636 can have any number of pages in accordance with this invention.

Figure 6K:
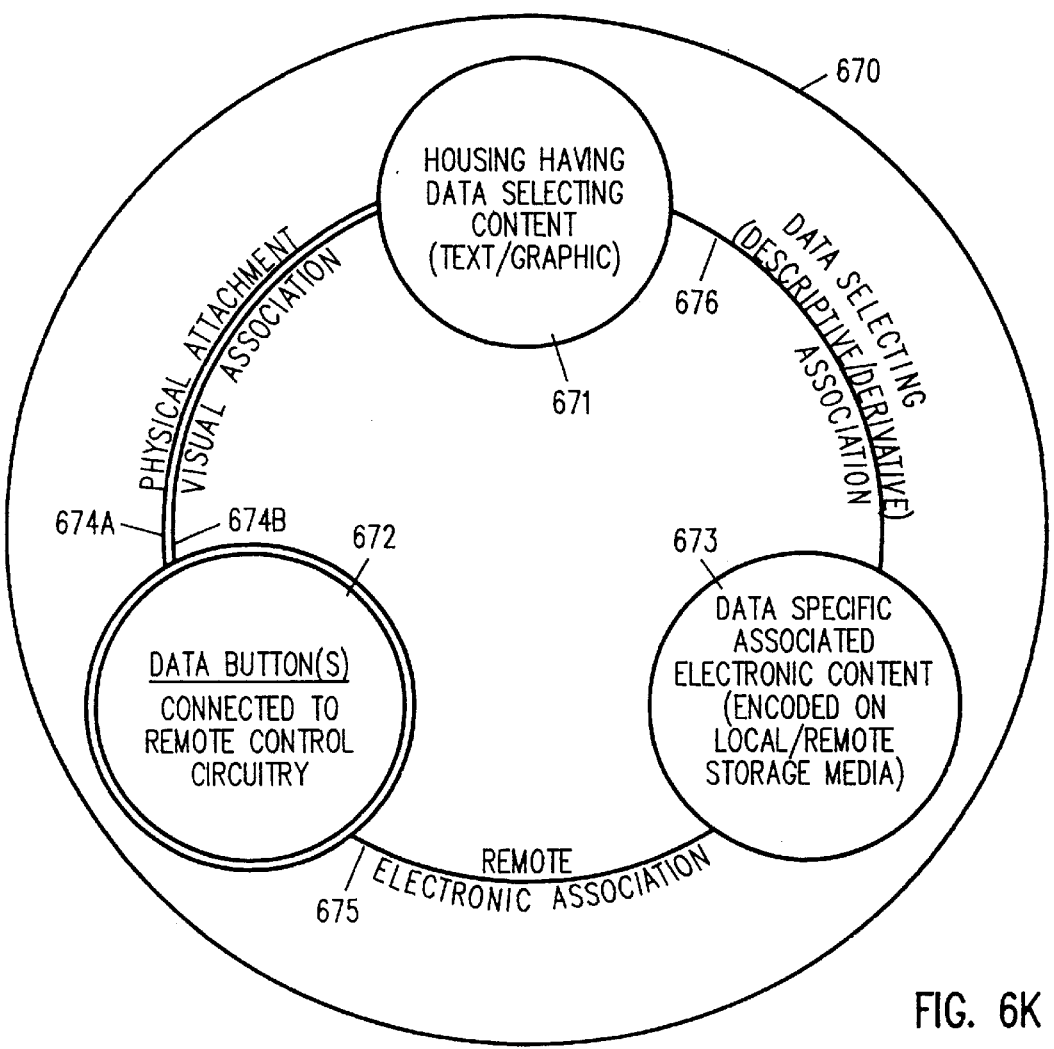
FIG. 6K illustrates a data button remote control in accordance with this invention.
Figure 6J:
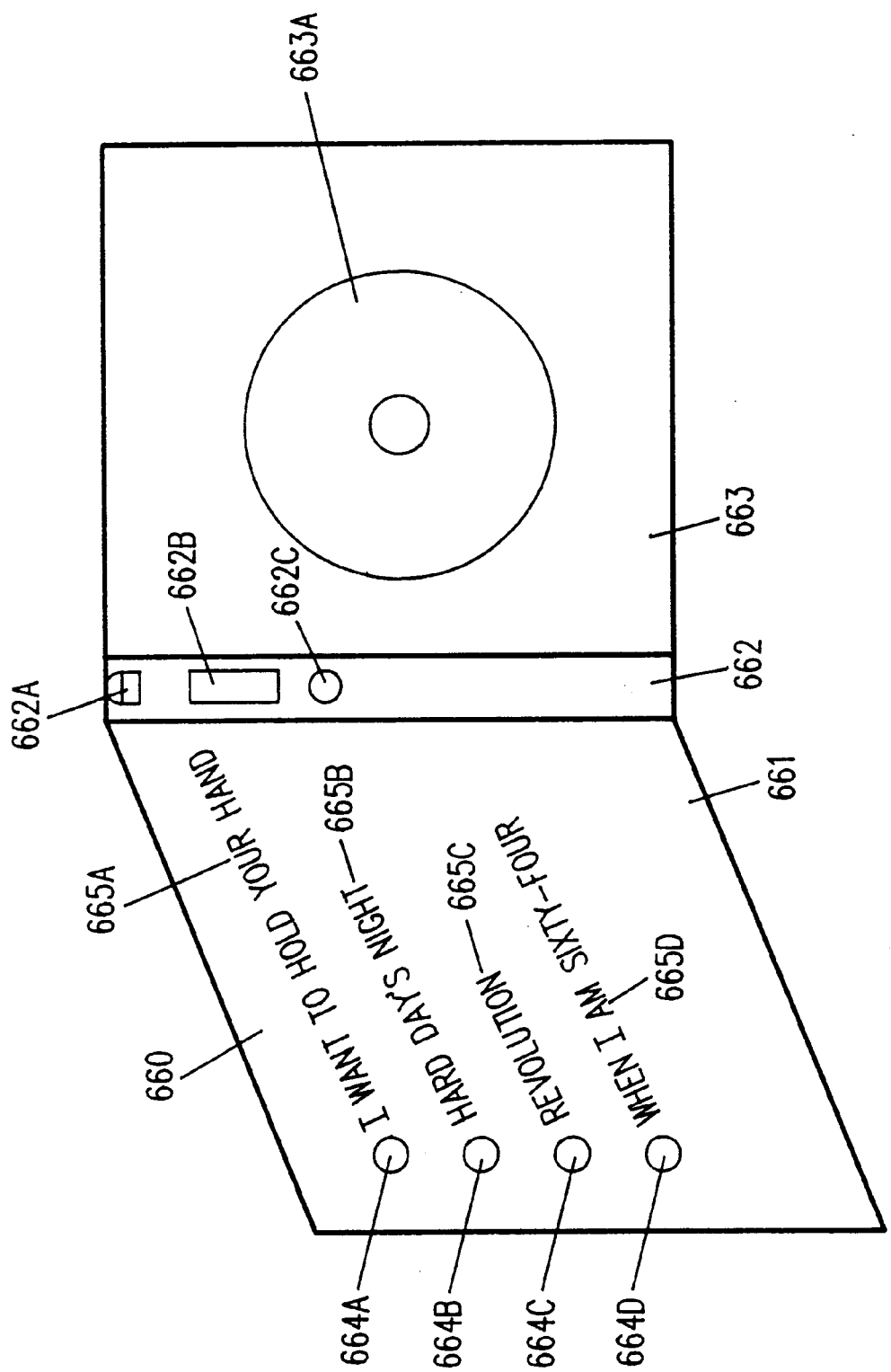
FIG. 6J illustrates an embodiment of a storage media remote control in the form of a CD box.

FIG. 6J shows one embodiment of a storage media remote control 660 in accordance with this invention. Storage media remote control 660 is in the form of a CD box with a front cover 661, a spine 662 and a back cover 663. Mounted on spine 662 is an LED 662A, a microcontroller 662B and a battery 662C. Mounted on the inside of front cover 661 are membrane buttons 664A, 664B, 664C, and 664D corresponding to "I WANT TO HOLD YOUR HAND" song name 665A, "HARD DAYS NIGHT" song name 665B, "REVOLUTION" song name 665C and "WHEN I AM SIXTY-FOUR" song name 665D of music video selections encoded in CD 663A. CD 663A is removably mounted on the inside of back cover 663.

To enjoy to a music video selection encoded in CD 663A, a user removes CD 663A from remote control 660 and inserts CD 663A in a suitable peripheral of a host device, such as CD drive 121 of host device 120. On touching one of membrane buttons 664A, 664B, 664C, and 664D a microcontroller 632B sends a selection identifying button code via LED 632A to an application running in host device 120 to identify the desired selection. The application on host device 120 retrieves the desired music video selection and displays the results through speaker 124 and/or monitor 122. A similar format can be used for an audio only CD in accordance with this invention. One advantage of a storage media remote control is that the normal channels of sales, such as a CD music store a book store and a newspaper stand can be used to sell such storage media remote controls.

In alternative embodiments of this invention a remote control can include a CD containing a catalog, a dictionary or an encyclopedia. An application which displays specific information sought by the user when the user presses one or more buttons on the remote control can be distributed on the storage media of the remote control in addition to article selections. Once such an application is running on the host device, touching a button on the remote control causes the desired selection encoded in the CD to be retrieved and displayed on a monitor of the host device.

FIG. 6K illustrates a data button remote control 670 in accordance with this invention. Data button remote control 670 includes a housing 671 having data selecting content (text/graphic), one or more data button(s) 672 and data specific associated electronic content 673. Housing 671 can be a housing of any arbitrary shape or size and includes but is not limited to storage media housings and printed publications. In FIG. 6K, data button(s) 672 are shown highlighted (double circle) to indicate the data button feature included in remote control 670.

Data button(s) 672 have a physical attachment 674A to housing 671. Also, data button(s) 672 have a visual association 674B with the data selecting content of housing 671. Data button(s) 672 have remote electronic association 675 with associated electronic content 673.

Data specific associated electronic content 673 has data selecting (descriptive/derivative) association 676 with housing 671. Data specific associated electronic content 673 can be encoded in a local storage media or a remote storage media accessible via a remote server.

Any data button remote control 670 in accordance with this invention is not limited to having only data buttons and can also include other features such as function selecting text/graphic content and corresponding function buttons.

One advantage of a data button remote control is that the user need not read instructions in a manual. Also the user need not remember the syntax and semantics of commands to be typed to retrieve a desired selection. Moreover the user need not remember the names of the selections. By simply touching a button visually associated with a data selecting content, the user can get instantaneous access to the desired selection. Therefore a data button remote control is simple and utilizes the user's intuition rather than knowledge of commands and file names of selections usually given in an instruction manual. A data button remote control also makes interactive media easier to create, market and use (as discussed below).

The above described storage media remote control 660 is an embodiment of a data button remote control because buttons 664A, 664B, 664C and 664D are data buttons each of which has a remote electronic association with a music video recording selection encoded on CD 663A.

Periodical remote control 640 is also a data button remote control because buttons such as 646A1, 646A2, 646A3, 646B1, 646B2, 646B3, 646C1, 646C2 and 646C3 are data buttons, each of which has a remote electronic association with an article selection (data) encoded on CD-ROM 648.

Figure 6L:
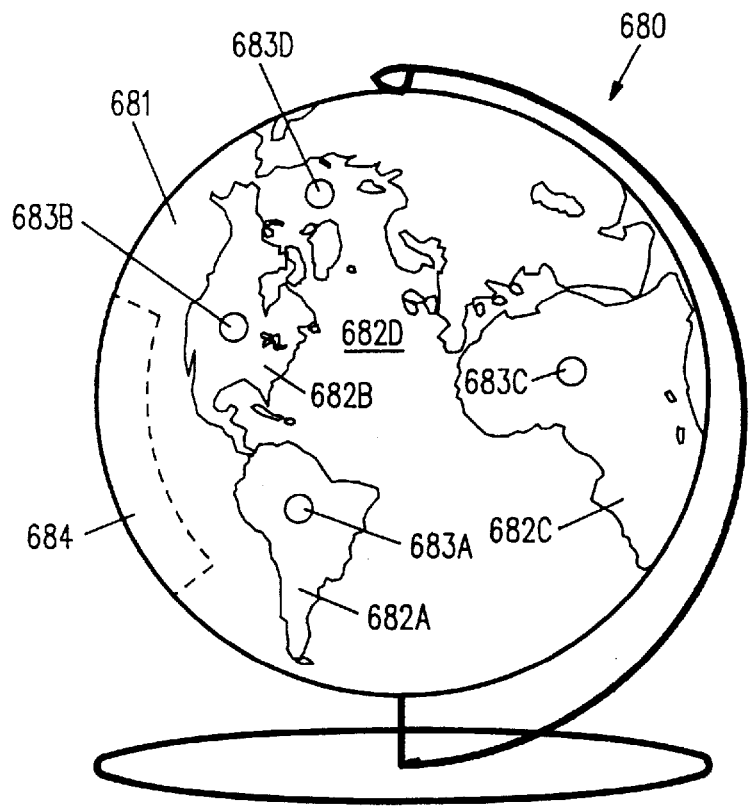
FIG. 6L illustrates one embodiment of a data button remote control in the form of a globe of planet earth.

FIG. 6L illustrates a globe remote control 680 which is another embodiment of a data button remote control 670. Globe remote control 680 includes a housing 681 which has imprinted on it data selecting graphic content 682A, 682B, 682C and 682D. Housing 681 is a spherical globe showing the various continents of the planet earth. Data selecting graphic content 682A is illustrative of the South American continent. Data selecting graphic content 682B is illustrative of the North American continent. Data selecting graphic content 682C is illustrative of the African continent. Data selecting graphic content 682D is illustrative of the Atlantic Ocean.

Globe remote control 680 also includes data buttons 683A, 683B, 683C and 683D which are membrane buttons connected to remote control circuitry (not shown in FIG. 6L). Each of data buttons 683A, 683B, 683C and 683D is physically attached to one of data selecting graphic contents 682A, 682B, 682C and 682D of housing 681. Each of data selecting graphic contents 682A, 682B, 682C, and 682D has a visual association with data buttons 683A, 683B, 683C, and 683D respectively because each data button is located on the graphic content associated with the data button.

Pressing one of data button 683A, 683B, 683C, and 683D results in remote control 680 transmitting an associated button code to a host device such as host device 120. An application in host device 120 retrieves associated electronic content which is representative of the graphic content associated with the pressed button. For example, if a button 683B is pressed, a selection (such as a video recording) of the North American continent is retrieved by host device 120 from a local or remote storage media and the results are displayed on a monitor. In one specific embodiment of this invention, remote control 680 includes a storage media holder 684 encased within spherical housing 681 for holding a local storage media.

Figure 6M:
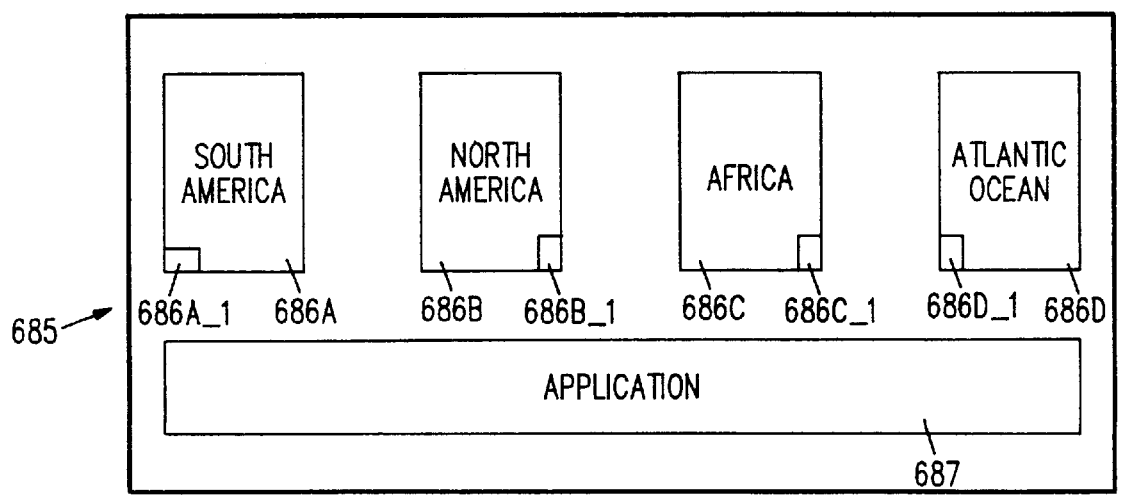
FIG. 6M illustrates the associated electronic content for the globe remote control of FIG. 6L.

FIG. 6M illustrates electronic content 685 associated with globe remote control 680. Associated electronic content 685 can be encoded in a local or remote storage media accessible to a host device. Associated electronic content 685 includes South America category 686A, North America category 686B, Africa category 686C and Atlantic Ocean category 686D and application 687.

In one embodiment, a user can decide a category and touch a data button which has an association with the category. Each of categories 686A, 686B, 686C and 686D contains a button code 686A_1, 686I_1, 686C_1 and 686D_1 respectively which when equal to a button code received from a globe remote control 680 causes application 687 to randomly select and display a selection from the category identified by the received button code.

FIGS. 6N and 6O illustrate orbiter remote controls 690 and 696 which are two embodiments of a data button remote control 670 in accordance with this invention. Orbiter remote control 690 (FIG. 6N) includes a housing 691 having data selecting text content 692A (which reads "MARS"), 692B (which reads "JUPITER"), 692C (which reads "MOON"), G92D (which reads "EARTH"), 692E (which reads "SATURN") and 692F (which reads "PLUTO").

Figure 6P:
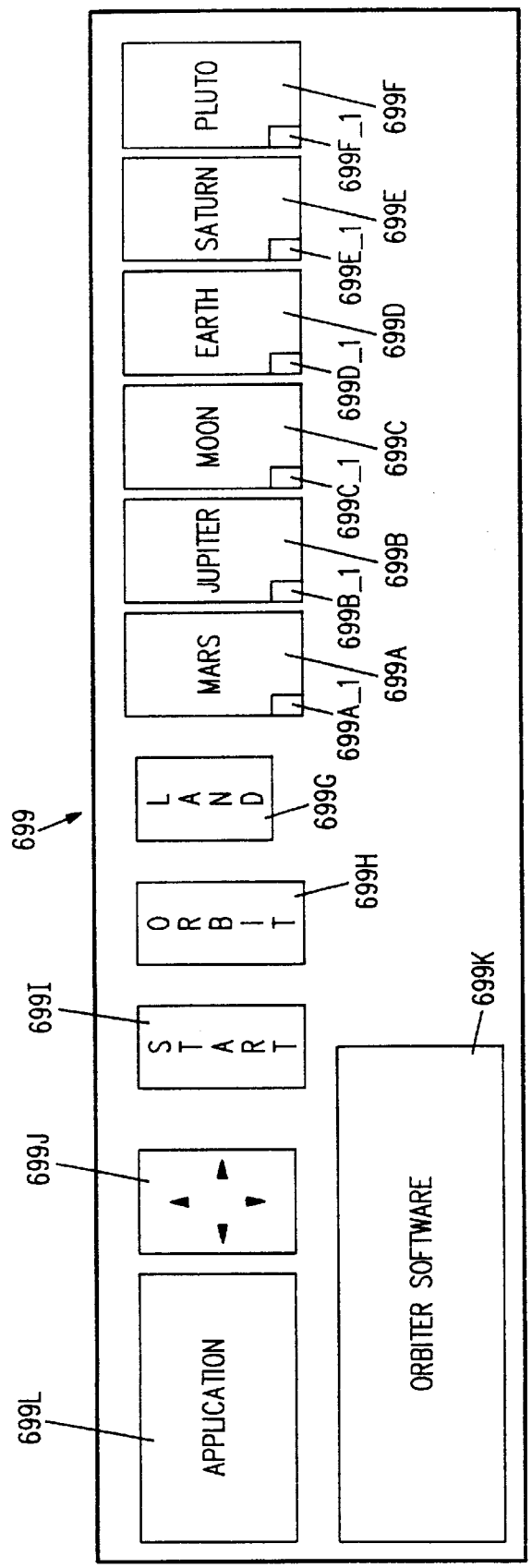
FIG. 6P illustrates the associated electronic content for the orbiter remote controls of FIGS. 6N and 6O.

Data selecting text content 692A of orbiter remote control housing 691, has a data selecting descriptive/derivative association with selection 699A in associated electronic content 699 (although for remote control 690, associated electronic content 699 is stored on a remote storage media). Similarly data selecting text content 692B, 692C, 692D, 692E and 692F each has a data selecting descriptive/ derivative association with respective selections 699B, 699C, 699D, 699E and 699F of (FIG. 6P).

Orbiter remote control 690 also includes buttons 693A, 693B, 693C, 693D, 693E and 693F each of which is a data button physically attached to housing 691. Furthermore, each of data buttons 693A, 693B, 693C, 693D, 693E and 693F has a visual association with data selecting text content 692A, 692B, 692C, 692D, 692E and 692F of housing 691.

Remote control 690 includes function selecting text/ graphic content such as arrows 694A, 6942, 694C, and 694D "START" text 694E, "ORBIT" text 694F and "LAND" text 694G which are visually associated with function buttons 695A, 695B, 695C, 695D, 695E, 695F and 695G respectively. In addition housing 691 has "STOP" text 694H which is also associated with function button 695E, so that function button 695E acts as a toggle between STOP and START functions.

Orbiter remote control 696 shown in FIG. 6O is similar to Orbiter remote control 690 of FIG. 6N. Orbiter remote control 696 has data buttons 697A, 697B, 697C, 697D, 697E and 697F visually associated with "MARS" text content 696A, "JUPITER" text content 696B, "MOON" text content 696C, "EARTH" text content 696D, "SATURN" text content 696E and "PLUTO" text content 696F respectively. Orbiter remote control 696 also has function buttons 697G, 697H, 697I, 697J, 697K, 697L and 697M. Orbiter remote control 696 also includes a storage media holder 698 in the form of a PCMCIA card holder in which is slideably mounted PCMCIA card 698M. Encoded on PCMCIA card 688M is the associated electronic content 699 (FIG. 6P).

As shown in FIG. 6P, associated electronic content 699 contains selections 699A, 699B, 699C, 699D, 699E and 699F. These selections 699A, 699B, 699C, 699D, 699E and 699F are for orbiter remote controls 690 and 696 and include video recordings and environmental parameters for the solar system components: Mars, Jupiter, Moon, Earth, Saturn and Pluto respectively. Each of selections 699A, 699B, 699C, 699D, 699E, and 699F have a data selecting descriptive/derivative association with the corresponding data selecting text content of the orbiter remote controls 690 and 696. Each of selections 699A, 6992, 699C, 699D, 699E and 699F have remote electronic associations with the corresponding data buttons of the orbiter remote controls 690 and 696.

In one specific embodiment of this invention, each of selections 699A, 699B, 699C, 699D, 699E and 699F includes a button code 699A_1, 699B_1, 699C_1, 699D_1, 699E_1 and 699F_1 which is compared to a button code received from a remote control in order to determine the specific environmental parameters and video recordings to be used by orbiter software 699K. Orbiter software 699K is a video game software selection which displays a video game of an Orbiter flight simulator in the environment of a solar system component.

Software for navigation function selection 699J, START function selection 699I, ORBIT function selection 699H and LAND function selection 699G has a remote electronic association with function buttons 697G, 697H, 697J, 697I, 697K, 697L and 697M.

A block diagram of the components of multi-button remote control in accordance with this invention is similar to the block diagram shown in FIG. 4A and which has been described above.

FIG. 7A is a plan view of a four button printed circuit board (PCB) 700 for use in a four button remote control such as remote controls 200, 610, 615, 617 and 636 described above. PCB 700 is similar to PCB 303 shown in FIG. 3C. except that instead of being enclosed inside a button, PCB 700 has a rubber key pad 701 with buttons 701A, 701B, 701C, and 701D. Also provided on PCB 700 are an infrared LED 703, a microcontroller 705 and watch batteries 702A and 702B connected to buttons 701A, 701B, 701C and 701D.

Figure 7B:
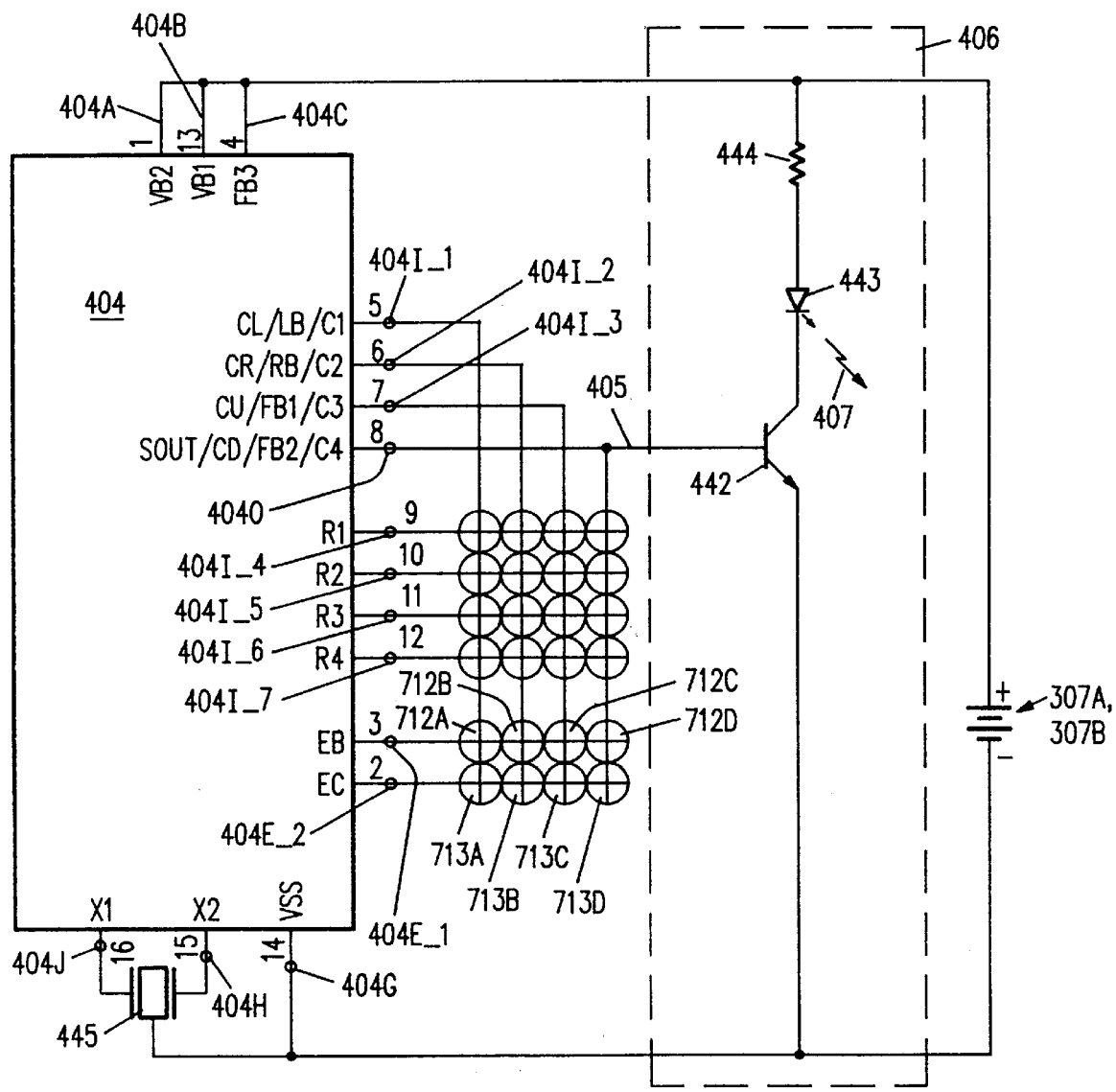
FIG. 7B is an illustrative circuit diagram of the remote control circuitry connected to the switches of the buttons of a multiple button remote control in one embodiment of this invention.

FIG. 7B is an illustrative circuit diagram for one embodiment of a multi button remote control. The circuit diagram in FIG. 7B is similar to the circuit diagram in FIG. 4B described above. Instead of a single button 402 of FIG. 4B, 24 buttons can be connected by the circuit of FIG. 7B. A matrix of buttons 711 as well as buttons 712A, 712B, 712C, 712D, 713A, 713B, 713C, and 713D are each connected to two pins of microcontroller 404. For example, button 712A is connected to pins 404E_1 and 404I_1 and button 712B is connected to pins 404E_2 and 404I_2. Microcontroller 404 pulses transistor 442 with a specific button code signal when a button (such as button 712C) is depressed to short two pins (such as pins 404E_1 and 404I_3). Transistor 442 in turn causes infrared LED 443 to transmit an encoded infrared signal 407.

Figure 7C:
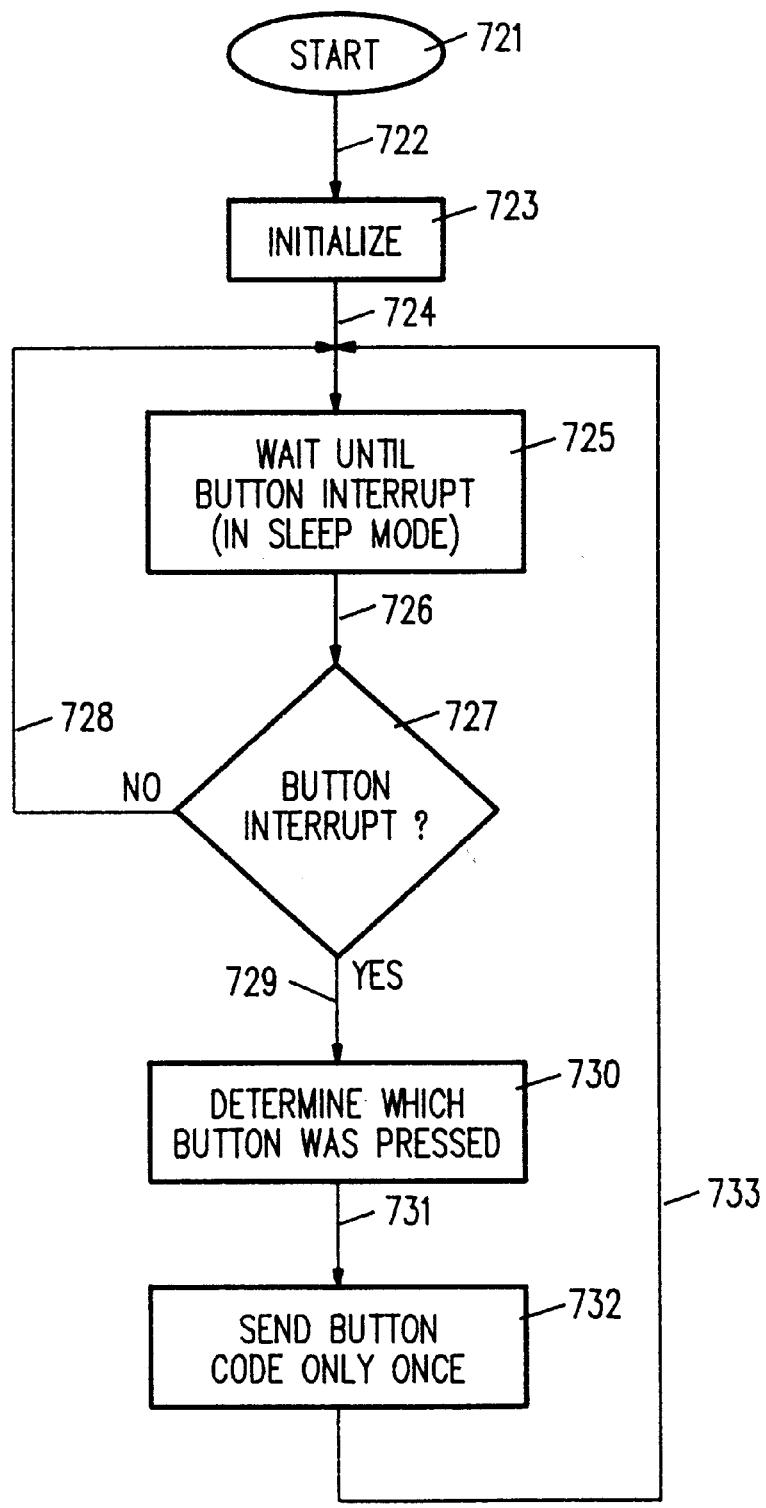
FIG. 7C is an illustrative flow chart of software running in the microcontroller of FIG. 7A.
Figure 7D:
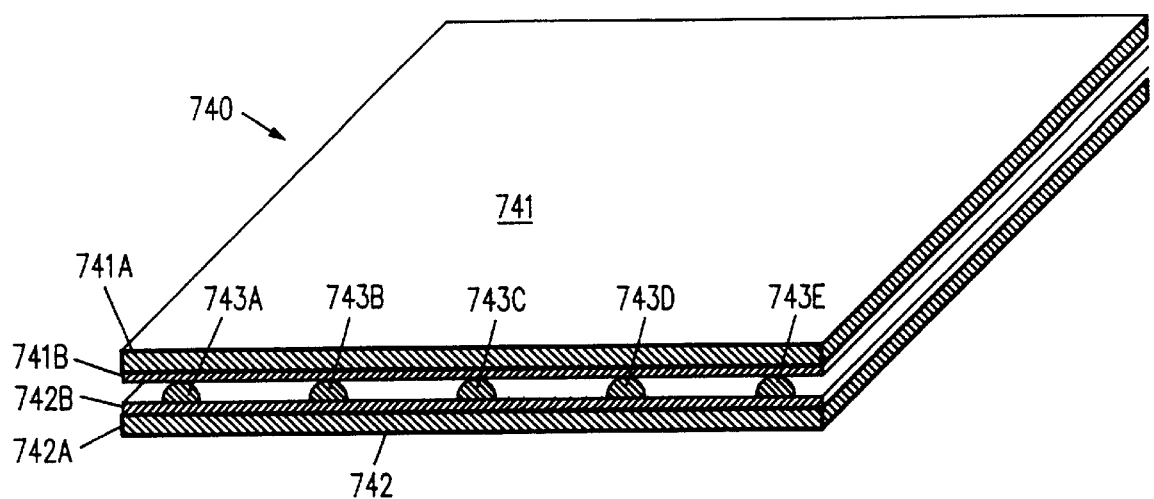
FIG. 7D is a perspective view of a touch panel for a remote control in accordance with this invention.

FIG. 7C is an illustrative flow chart of the software running in microcontroller 404 of FIG. 7B. Software for implementing the flow chart of FIG. 7B is listed in Appendix A. The software can be compiled and linked by Motorola M68HC705KICS. Microcontroller 404 starts at step 721 and goes via branch 722 to step 723. In step 723 microcontroller 404 initializes variables. Then microcontroller 404 goes via branch 724 to step 725. In step 725 microcontroller 404 goes to SLEEP mode and wakes up when it receives an interrupt when a button is pressed.

On waking from SLEEP mode, microcontroller 404 goes via branch 729 to step 730. In step 730 microcontroller 404 determines the identity of the pressed button by checking every combination of two pins to find the pins that are shorted to each other, (Appendix A).

For example, microcontroller 404 determines that button 712D is depressed applying a high signal (logic 1) to EB pin 404E_1 and checking whether SOUT/CD/FB2/C4 pin 4040 is high (logic 1). Microcontroller 404 is triggered from a sleep state by setting pins 404E_1, 404E_2, 404E_4, 404E_5, 404E_6 and 404I_7 to high and by tying pins 404I_1, 404I_2, 404I_3 and 4040 to a button interrupt. Then microcontroller 404 goes from step 730 via branch 731 to step 732. In step 732 microcontroller 404 sends a button code via infrared LED 443 only once and then goes via branch 733 and branch 724 back to step 725.

A multi-button remote control (such as remote control 640) can be used with a host device having a receiver (illustrated in FIG. 4D) and which uses the software illustrated in FIG. 4E in a microcontroller. Furthermore, an autostart driver (such as autostart driver 500A described above) can be used to automatically start the application for using a multi-button remote control.

FIG. 7D illustrates a touch panel 740 which can form buttons on front cover innerside 641B and back cover innerside 642B of the remote control 640 of FIGS. 6E, 6F and 6G. Touch panel 740 is similar to conventional computer touch screens and includes two sheets 741 and 742 attached to each other. In one embodiment of a remote control including touch panel 740, the buttons and housing have a physical attachment (such as physical attachments 14A, 604A and 674A of FIGS. 1A, 6A and 6K respectively) formed by printing, engraving, or otherwise attaching the housing content directly to sheet 741 and/or sheet 742.

Sheet 741 includes a clear mylar sheet 741A with a conductive coating of indium tim oxide 741B. Similarly sheet 742 includes a clear mylar sheet 742A with a conductive coating of indium tin oxide 742B. Sheets 741 and 742 are separated and electrically insulated from each other by small nipples such as nipples 743A, 743B, 743C, 743D, and 743E which are molded in sheet 742.

Figure 7E:
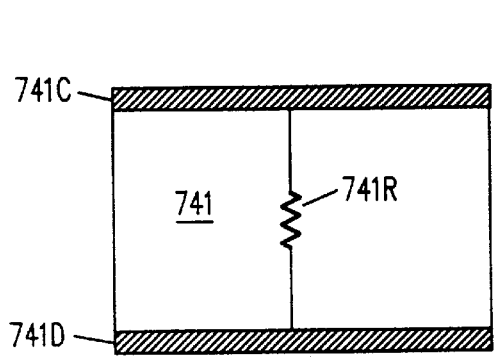
FIGS. 7E and 7F are plan views of the top and bottom sheets respectively of the touch panel of FIG. 7D.
Figure 7F:
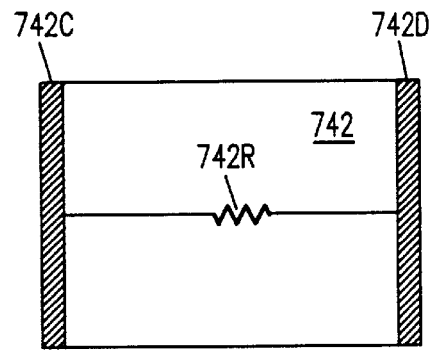

Sheet 741 has a first terminal 741C and a second terminal 741D at two opposite edges (FIG. 7E). A resistance 741R is formed by the indium tin oxide between the first terminal 741C and the second terminal 741D of sheet 741. Similarly sheet 742 has a first terminal 742C and a second terminal 742D (FIG. 7F) formed at the edges of sheet 742 such that a resistance 742R is formed between terminals 742C and 742D. When sheets 741 and 742 are assembled together to form touch panel 740, any object such as a human fingertip touching touch panel 740 results in sheet 741 making contact with sheet 742 at the point of the touch, such as point 744 in FIG. 7G.

Figure 7G:
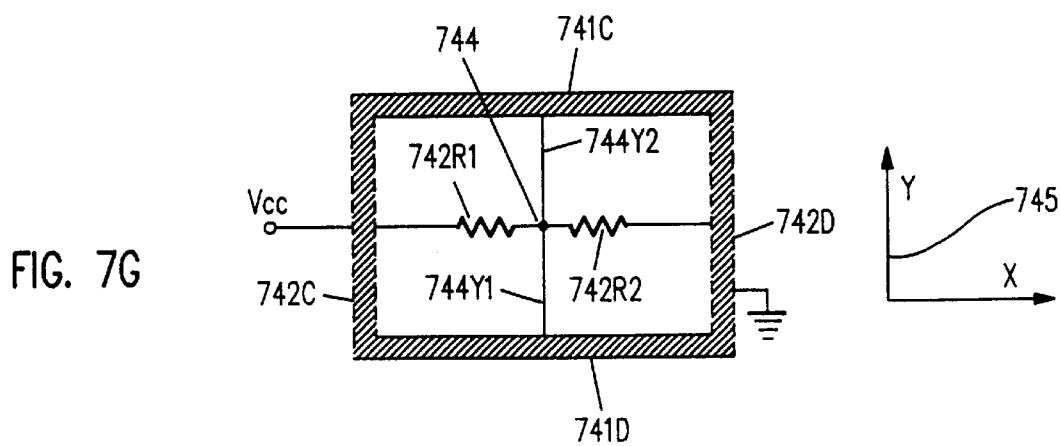
FIG. 7G is a composite plan view of the touch panel of FIG. 7D formed by overlaying the top sheet of FIG. 7E on the bottom sheet of FIG. 7F.

The coordinates of point 744 in the coordinate system 745 are determined by the following method: connect terminal 742C to VCC (or logic 1) and terminal 742D to ground and measure the voltage on terminal 741D to determine the X coordinate. Next connect terminals 741 and 741D to VCC and ground respectively and measure the voltage on terminal 742C (or 742D) to determine the Y coordinate. The measured voltage provides the location of the X coordinate or the Y coordinate because the measured voltage varies depending on the location of the point of touch. A contact between sheet 741 and 742 effectively results in a voltage divider as shown in FIG. 7G for the X axis.

The number of buttons formed from touch panel 740 are limited only by the resolution of the voltmeter used to measure the voltage. In one embodiment of this invention as described below in reference to FIG. 7H, up to 255 positions can be determined individually in each of X and Y directions resulting in a total of 65,536 possible buttons. Furthermore, in accordance with this invention, an arbitrarily shaped button can be formed by associating the points which fall within the button's shape with the same button code of the button.

Figure 7H:
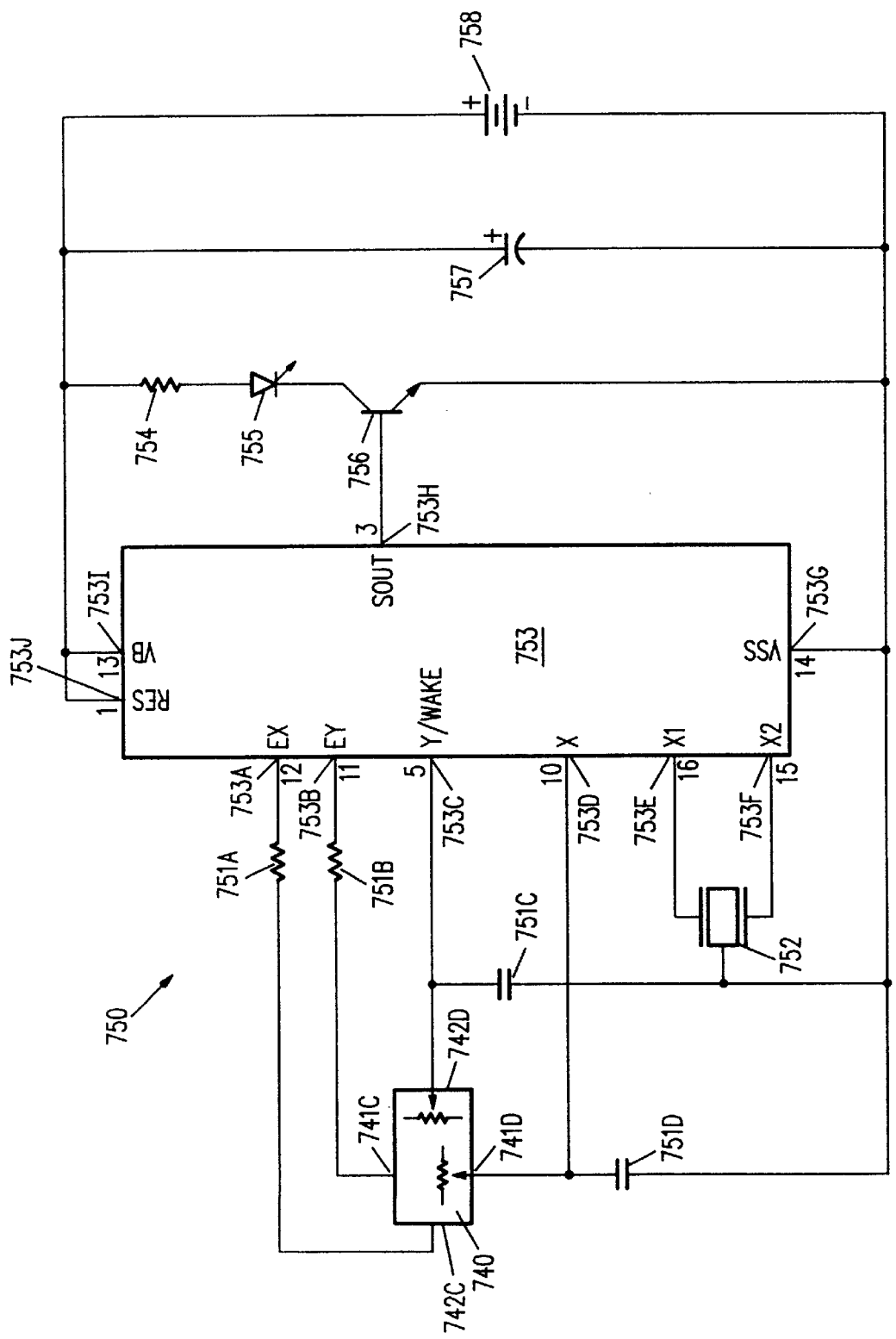
FIG. 7H is an illustrative circuit diagram of the remote control circuitry connected to a touch panel of a remote control in accordance with this invention.

FIG. 7H illustrates one embodiment of a remote control circuit 750 for a remote control using the touch panel of FIGS. 7D–7G. Remote control circuit 750 includes touch panel 740 with terminals 741C and 742C connected via resistors 751B and 751A to EY input pin 753B and EX input pin 753A respectively of microcontroller 753. Terminals 741D and 742D are connected to X input pin 753D and Y/WAKE pin 753C of microcontroller 753. Terminals 741D and 742D are also connected via capacitors 751D and 751C to the negative terminal of battery 758. Remote control circuit 750 also has a resonator 752 connected between X1 input pin 753E and X2 input pin 753F.

Microcontroller 753 has a VSS pin 753G connected to the negative terminal of battery 758. Microcontroller 753 has a RES pin 753J and a VB pin 753I connected to the positive terminal of battery 758.

Microcontroller 753 has an SOUT pin 753H connected to the base of transistor 756. The collector of transistor 756 is connected to the cathode of diode 755. The anode of diode 755 is connected via a resistor 754 to the positive terminal of battery 758. The emitter of transistor 756 is connected to the negative terminal of battery 758. Battery 758 has a capacitor 757 connected across its positive and negative terminals.

The component ratings for the various components shown in FIG. 7H are listed in TABLE 1:

TABLE 1

| COMPONENT | RATING |
|---|---|
| Capacitors 751C, 751D | 1 $\mu$F |
| Capacitor 757 | 22 $\mu$F |
| Resistor 751A | 1.5 K$\Omega$ |
| Resistor 751B | 680 $\Omega$ |
| Resistor 754 | 0.8 $\Omega$ |
| Transistor 756 | MMBT4401 |
| Battery 758 | 3 V |
| Resonator 752 | KBR3.58 MKS |
| Microprocessor 753 | XC68 HC 705K0 |
| Photo Diode 755 | NEC-SE 1003 |
| Touch Panel 740 | GM Name Plate Zinc Oxide |

In one embodiment of this invention, remote control circuit 750 includes a touch panel available from GM Name Plate, 2095 O'toole Avenue, San Jose, Calif. 95131, (408) 435-1666.

During operation, remote control circuit 750 is normally in a low power SLEEP mode with EX input pin 753A and Y/WAKE pin 753C pull down enabled and positive edge trigger interrupt enabled. EY pin 753B and X pin 753D are set to output high (logic 1).

When panel 740 is touched, an electrical connection is made between terminals 741C and 741D on top sheet 741 and terminal 742D on bottom sheet 742. Therefore touching causes terminal 742D to be pulled up which generates a wake up interrupt to microcontroller 753.

When microcontroller 753 wakes up, the X and Y coordinates of the point being touched are determined as follows. The Y axis coordinate of the touched point is determined in two steps. First the Y axis capacitor 751C is charged to a voltage $V_Y$ set by a voltage divider formed by connecting terminals 741C and 741D to power and ground respectively. Resistor 751B limits the voltage $V_y$ to VCC/3.

During this first Y axis step, pins 753A, 753B, 753C and 753D have the following values: X pin 753D is at logic 1, EY pin 753B is at logic 0, Y/WAKE pin 753C is an input and EX pin 753A is an input. The values for each of the steps are listed in TABLE 2 (I denotes high impedance input):

TABLE 2

| COMMENT | GET X | GET Y | SLEEP |
|---|---|---|---|
| CHARGE | Y = 1 | X = 1 | X = 1 |
|  | EY = I | EX = I | Y = 0 |
|  | EX = 0 | EY = 0 | EY = 1 |
|  | X = I | Y = I | EX = I |
| DISCHARGE | Y = I | X = I | X = 1 |
|  | EX = I | EY = I | Y = I(PD) |
|  | X = I | Y = I | EY = 1 |
|  | EY = 0 | EX = 0 | EX = I |

During the second Y axis step, capacitor 751C discharges through the resistor formed by touch panel 740 between terminals 742D and 742C. During the discharge of capacitor 751C, microprocessor 753 measures the duration of time (for example 500 microseconds) for capacitor 751C to go from voltage $V_Y$ (for example 2.5 volts) to the logic threshold voltage of Y/WAKE pin 753C (logic 1, for example 1.5 volts).

The X coordinate is also measured in two steps in a similar manner. Capacitor 751D is used to measure the X axis coordinate and resistor 751A limits the minimum voltage $V_X$ to VCC/3. The charge and discharge logic levels for the X coordinate are also shown in TABLE 2.

Figure 8A:
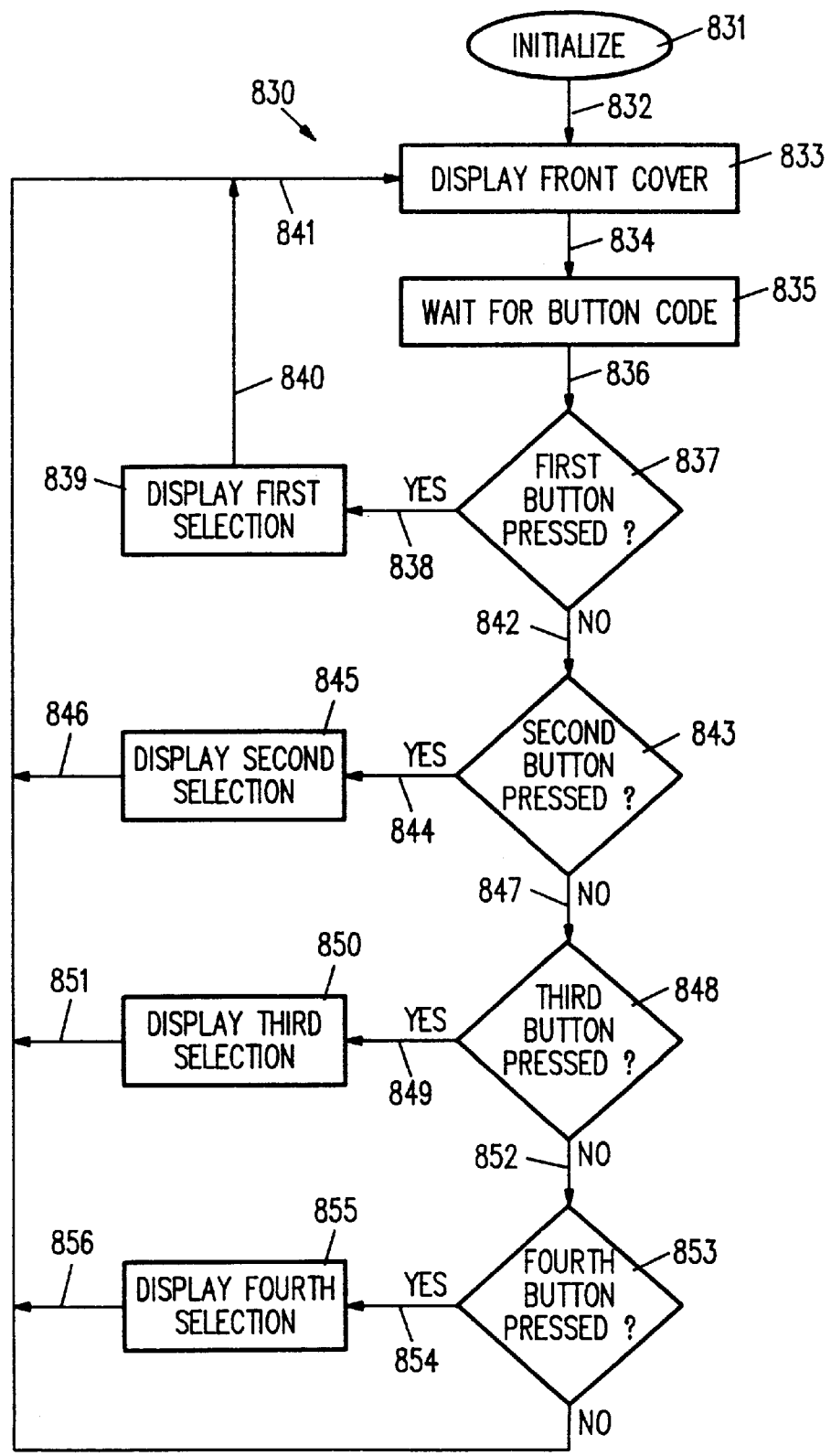
FIG. 8A is an illustrative flow chart of an application running in a host device which is responsive to button codes received from a remote control in accordance with this invention.

FIG. 8A is an illustrative flow chart for the high level control logic of an application 830 running in a host device 120 for using a remote control in accordance with this invention. Application 830 can be used as an application for a four button remote control, such as remote controls 610, 615, 617, 660 and 680 described above.

Application 830 can be started up by a user or automatically either immediately following a boot up sequence or by an autostart driver on detection of an inserted storage media. Application 830 initializes variables in step 831 and goes via branch 832 to step 833. In step 833 application 830 displays the front cover and goes via branch 834 to step 835. In step 835 application 830 waits until a button code is received from a remote control.

If a button code is received, application 830 goes via branch 836 to step 837. In step 837 application 830 checks the received button code to see if a first button (such as button 664A of FIG. 6J) was pressed. If the first button was pressed, application 830 goes via branch 838 to step 839. In step 839 application 830 retrieves the selection associated with the first button (such as a "SONG A" selection if button 664A was pressed) from local (or remote storage media) and displays the retrieved selection. In one embodiment the application displays the audio recording for "Song A" through speaker 124 and optionally displays an associated video recording (if present on CD 663A) through monitor 122. Then application 830 goes via branches 840 and 841 back to step 833.

If in step 837 the first button was not pressed, application 830 goes via branch 842 to step 843. In step 843 application 830 checks to see if a second button (such as button 664B of FIG. 6J) was pressed. If the second button was pressed, application 830 retrieves and displays the associated selection (such as a "SONG B" selection). Then application 830 goes via branches 846 and 841 back to step 833.

Steps 843, 848 and 853 are similar to step 837 and is steps 845, 850 and 855 are similar to step 839. Therefore application 830 takes the appropriate actions if the second, third or fourth buttons are pressed in a manner similar to that described above for the first button.

In one specific embodiment of an application for picture book remote control 610, each time train button 612A is pressed, the application retrieves and displays a different video selection of a train which is selected at random from a category of selections of train video recordings. Such an application allows children to watch selections from the categories of fire engines, trains, airplanes and helicopters by just pressing one of the four buttons 612A, 612B, 612C and 612D of remote control 610. One advantage of such a multiple button remote control 610 is that children have a choice and can watch a scene (such as a scene of a train) as long as they want or watch a different video recording of a train by repeatedly pressing the same train button 612A.

An application similar to application 830 can also be used with other types of remote controls such as remote control 636, 680, 690, and 696. For example, an application for remote control 636 (FIG. 6I), would merely have several additional steps corresponding to each of buttons 637B, 637C, 637D, 638A, 638B, 638C, 638D, 639A and 639B.

Furthermore, an application can make function calls to implement various functions rather than displaying selections retrieved from a storage media. For instance, instead of displaying a first selection in step 839 of application 830, another application could make a function call which performs a first function indicated by a first button. Therefore an application for remote control 200 would have a call to a next page address calculating function for implementing the "NEXT" function/data attributes of the first button 225.

Figure 8B:
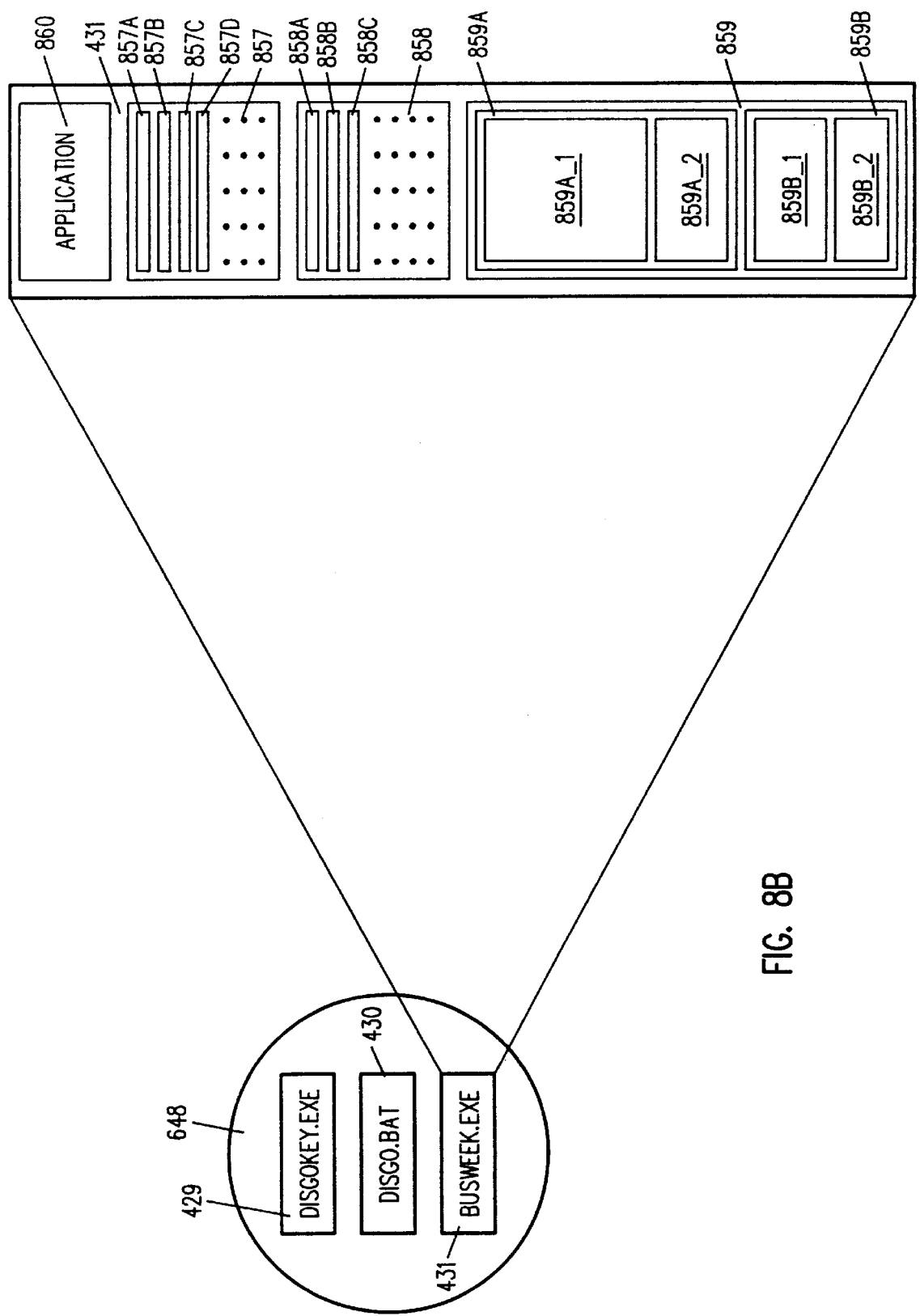
FIG. 8B illustrates the electronic content of a storage media for a periodical remote control in accordance with this invention.

FIG. 8B illustrates the electronic content encoded on a storage media 649 of a periodical remote control 640 of FIGS. 6H, 6F and 6G. Storage media 649 is identical to storage media 428M (FIG. 4A). As described above, when storage media 649 is inserted into CD drive 122 of host device 120, a security key stored in DISGOKEY.EXE 429 is first confirmed and then, DISGO.BAT 430 is executed. DISGO.BAT 430 starts up an application 860, included in BUSWEEK.EXE 431. BUSWEEK.EXE 431 also includes the selections of associated electronic content for remote control 640.

The selections of the associated electronic content in BUSWEEK.EXE are organized in several categories: commercial category 857, article preview category 858 and article category 859. Each of commercial selections 857B, 857C and 857D is a 30 second full motion video recording from an advertiser (of a product or service). A preview commercial selection 857A is a video recording from the publisher of the periodical remote control and contains highlights of all the article selections encoded in storage media 648 (FIG. 6G). Each article preview selection 858A, 858B, and 858C is a 30 second full motion video recording which summarizes the contents of the corresponding article selection. Article selections 859A and 859B include full length (for example, 20 minute) TV program type video recordings. A commercial selection and/or an article selection can include a DETAIL mode video recording and/or a DETAIL mode form and/or a DETAIL mode software (as described below).

A DETAIL mode is a display mode which is more interactive or which provides more information than a normal mode of display. In a DETAIL mode software for a commercial selection, the user can be presented with a window through which the user can navigate to look up various products, prices, phone numbers and names from an electronic catalog. A DETAIL mode form provides more detailed information about the article or commercial selection. A DETAIL mode form can include an interactive form filling program which allows a user to order the article or service being advertised in a commercial selection. Alternatively, a DETAIL mode form can contain text corresponding to a video article identical to the text in the print version of the magazine. Such text can be displayed on monitor 122 or printed on printer 124E (FIG. 1E). A DETAIL mode video recording includes long infomercials. For example, a DETAIL mode video recording can include a one hour long infomercial for Nike™ shoes which contains an interview with a gold medal winner from the last olympics and an interview with a doctor. For example FIG. 8B illustrates an article selection 859A including a full motion video recording 859A_1 on energy conservation and a DETAIL mode software 859A_2 for computing the savings in electricity bills for each user depending on the user's geographic location. Similarly article selection 859B includes a full motion video recording 859B_1 and text content 859B_2 which is the full text of the print version of the article.

Figure 8C:
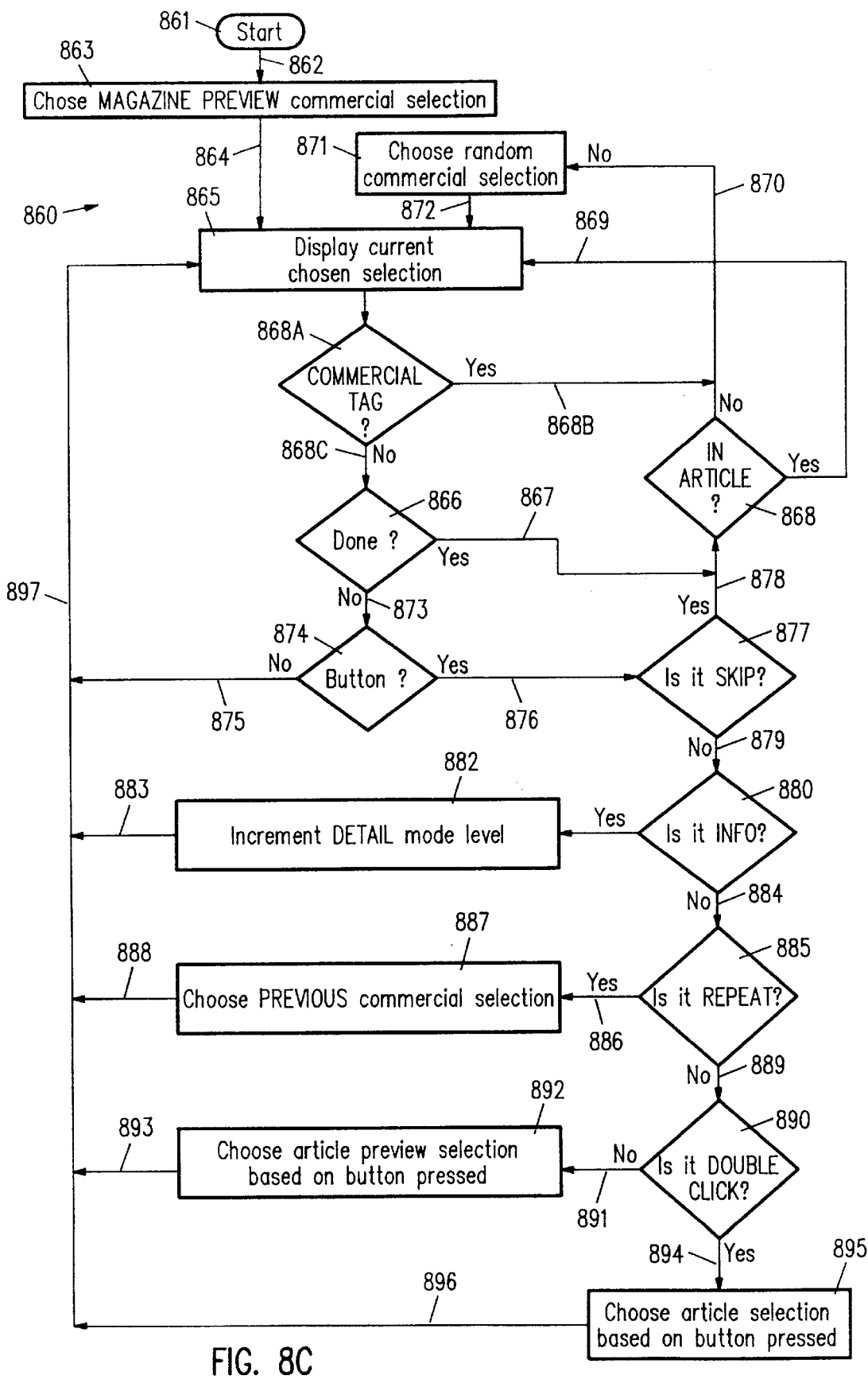
FIG. 8C illustrates a flow chart for an application for a periodical remote control in accordance with this invention.
Figure 8D:
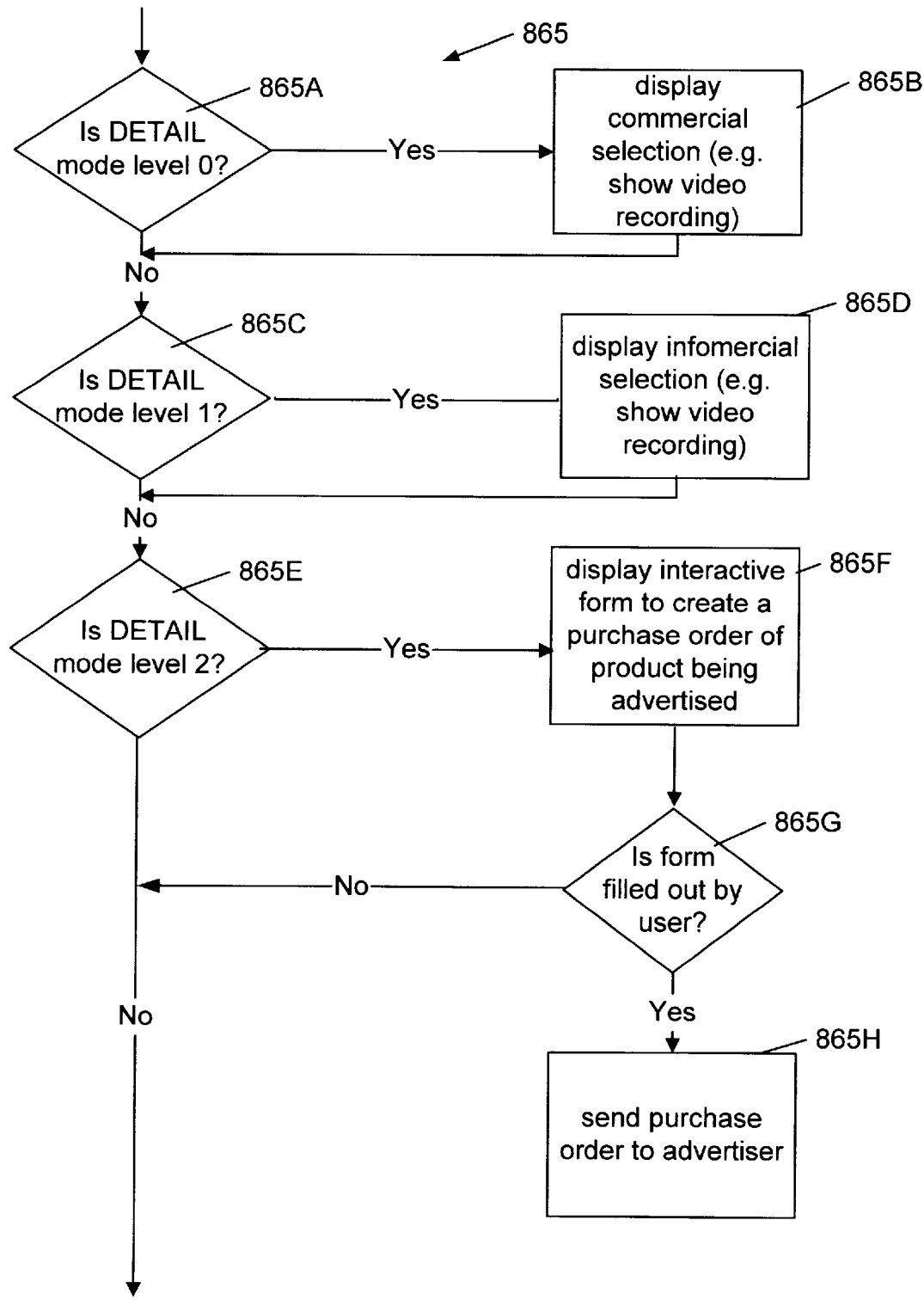
FIG. 8D illustrates, in a flow chart, step 865 of FIG. 8C.
Figure 8E:
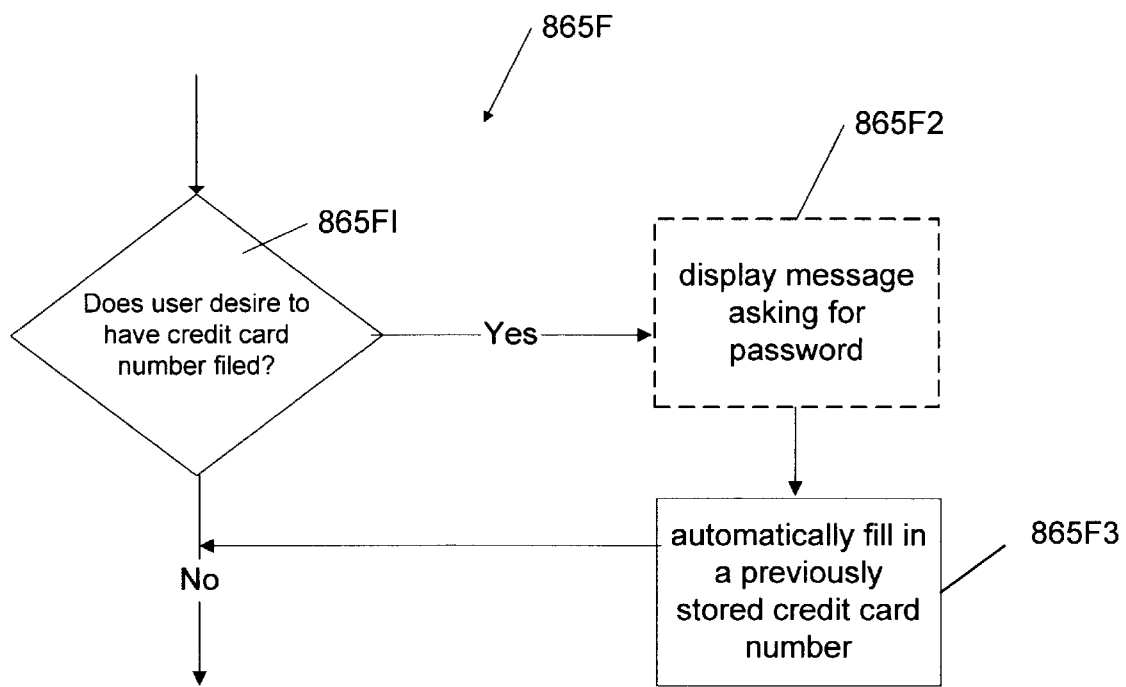
FIG. 8E further illustrates, in a flow chart, act 865F of FIG. 8D.

FIG. 8C is an illustrative flow chart for the high level control logic of an application 860 running in a host device 120 in accordance with this invention.

When started, application 860 initializes variables in step 861 and goes via branch 862 to step 863. In step 863, application 860 chooses the preview commercial selection 857A as the current selection. Then application 860 goes via step 864 to step 865. In step 865, application 860 displays the chosen selection.

In one embodiment of this invention, a randomly selected commercial is displayed during an article selection display at preselected points in the article. An article selection can contain function calls to a function for displaying commercial selections at the preselected points in the article display. The call to a commercial displaying function is inserted at appropriate points in an article selection by an author of the article selection (as described below). In another embodiment of this invention, instead of a call to commercial displaying function, a tag of a unique sequence of digits is inserted.

Application 860, in step 865 (FIG. 8C) continuously compares the data being displayed with the unique sequence of digits which denotes a function call (or a tag). Once application 860 finds the function call (or tag), the article display is interrupted and a randomly selected commercial recording from the commercial category 857 is displayed. After displaying the commercial selection, application 860 resumes display of the interrupted article selection.

Then application 860 goes to step 866 to check if the display of the current selection is finished. While selection is displaying via step 865, application 860 loops continuously, checking for a tag/done signal from comparison steps 868A and 866. If commercial tag is detected, application 860 goes via 868B and 870 to 871. Else, if the current selection display is done, application 860 goes via steps 867 and 878 to step 868. In step 868, application 860 checks to see if the current selection is an article selection by checking an IN_ARTICLE flag. If an article selection is being currently displayed, application 860 goes via branch 869 back to step 865. Application 860 clears the IN_ARTICLE flag when the display of an article is completed.

If an article selection is not being displayed, then application 860 goes from step 868, via branch 870 to step 871 where a commercial selection is randomly chosen, and then retrieved and displayed in step 865. The steps 871, 865, 866, 868A and 868 implement a continuous commercial break which displays one commercial selection after another until a button code is received. The continuous commercial break feature is very advantageous for advertisers because of continuous display of commercials during user inaction.

If application 860 has not finished display of the currently chosen selection, application 860 goes from step 866 via branch 873 to step 874. In step 874 application 860 checks to see if a button code was received from remote control 640. If a button code was not received, application 860 goes from step 874 via branch 875 and branch 897 back to step 865. If a valid button code was received, application 860 goes from step 874 via branch 876 to step 877.

In step 877, application 860 checks to see if the button code received from remote control 640 indicates that SKIP function button 645B was pressed. If SKIP function button 645B was pressed, application 860 immediately terminates the selection being currently displayed and goes from step 877 via branch 878 to step 868 (described above). Therefore a user can press SKIP function button 645B to skip a commercial that has rudely interrupted an article being displayed to the user. Pressing skip while in an article terminates the article and application 860 goes directly to a continuous commercial break. If the received button code does not correspond to the SKIP function button 645B, application 860 goes from step 877 via branch 879 to step 880.

In step 880, application 860 checks to see if the received button code corresponds to the INFO function button 645D. If the button codes match in step 880, application 860 goes via branch 881 to step 882. In step 882, application 860 increments the DETAIL mode level which indicates the level at which an article or a commercial is being displayed.

After incrementing the DETAIL mode level in step 882, application 860 goes via branch 883 and branch 897 back to step 865. Although the application is back in the same selection as before, the DETAIL mode is now higher than when application 860 was last in step 865.

In one specific embodiment of this invention, DETAIL mode level 0 (step 865A of FIG. 8) for commercial selections indicates a 30 second commercial (step 865B), while DETAIL mode level 1 (step 865C) indicates an infomercial (step 865D) and a DETAIL mode level 2 (step 865E) indicates an interactive form (step 865F) to be filled by a user (for example to order the product being advertised in a commercial).

In an alternative embodiment, an application is programmed to perform additional functions in the increased DETAIL mode level. For example, in DETAIL mode 1, the application continues displaying the currently chosen selection and also displays in a window an order form or an 800 telephone number if a commercial selection was being displayed.

Alternatively, an application can execute a software selection which sends a fax through phone line 145A (FIG. 1G) to order the product currently being advertised. In another embodiment, an application shows a menu that allows a user to input information about attributes of the advertised product (such as shoe size) to be ordered for the user.

In one specific embodiment of this invention, an application sends an order for a product via facsimile using fax card 144B and phone line 145A (FIG. 1F). A user's credit card number is automatically filled in by the application, if a user so desires as illustrated by step 865F1 (after asking for a password in some embodiments as illustrated by step 865).

In an increased DETAIL mode level, application 860 can display a form which provides additional information about the advertised product, such as the price and shops in the local neighborhood where the product is available.

The DETAIL mode is decremented when the current selection completes. The DETAIL mode is also decremented when a commercial is terminated due to user input, for example if SKIP function button 645B is pressed by the user. Once the DETAIL mode has been decremented, the next selection is displayed in the normal mode unless INFO function button 645D is pressed by the user during display of the current selection.

In one specific embodiment of this invention, when an inventor presses INFO function button 645D, during a NIKE infomercial, an interactive window with a form for ordering shoes is presented. In this manner, an ambitious advertiser can have several levels of DETAIL mode selections stacked one after another which are accessed by using INFO function button 645D in each level. Less ambitious advertisers can choose not to implement INFO function button 645D so that pressing INFO function button 645D causes nothing to change and the 30 second commercial runs to its conclusion with a little window in a corner displaying the text content "no detail available".

The DETAIL mode can be implemented for an article selection, wherein the normal level of the DETAIL mode (e.g. level 1) is associated with a video, and the next higher level of the DETAIL mode is associated with the full text of the article in the print version of the magazine. Pressing INFO function button 645D multiple times eventually rotates back to level 0. In one embodiment of this invention, a user can search for keywords in article selections using keypad 643 to enter the keyword to be searched (FIG. 6G). In one embodiment for articles, a DETAIL mode of 0 indicates an article preview selection, a DETAIL mode of indicates article selections 1 and a DETAIL mode greater than 1 indicates more information than normal. An article preview selection is displayed when a user single clicks on an article in a periodical the remote control (as discussed below).

Referring back to FIG. 8C, if the button codes do not match in step 880, application 860 goes via branch 884 to step 885. In step 885, application 860 checks to see if the received button code indicates that REPEAT function button 645C was pressed. If the button codes match in step 885, application 860 goes via branch 886 to step 887. In step 887, application 860 selects the most recently displayed commercial selection. Then application 860 goes from step 887 via branches 888 and 897 back to step 865. Therefore in step 865, the previous commercial will be displayed. In one embodiment of this invention, application 860 keeps track of 255 most recently displayed commercials (in reverse chronological order).

If the button codes do not match in step 885, application 860 goes via branch 889 to step 890. In step 890, application 860 checks to see if an article button was double clicked. If there was a double click in step 890, application 860 goes via branch 894 to step 895. In step 895, application 860 selects the article indicated by the button code received from remote control 640 and sets the IN_ARTICLE flag. Then application 860 goes via branches 896 and 897 back to step 865.

If, however, there was no double click in step 890, application 860 goes via branch 891 to step 892. In step 892, application 860 selects the article preview commercial indicated by the button code received from remote control 640. Then application 860 goes via branch 893 and 897 back to step 865.

Application 860 makes it easy to convert existing magazines and TV programs to interactive media format, for remote controls which are easy to market and easy to use (as discussed below).

To author an application for a picture book remote control one simply has to do the following:

1. Create the pictures, scan them into a computer and store them in separate files;
2. Write the captions for each page and store each in a separate file;
3. Record the voice for each caption (using a PC sound card) and store in separate disk files;
4. Run a Compiler Engine to generate an application.

Figure 9A:
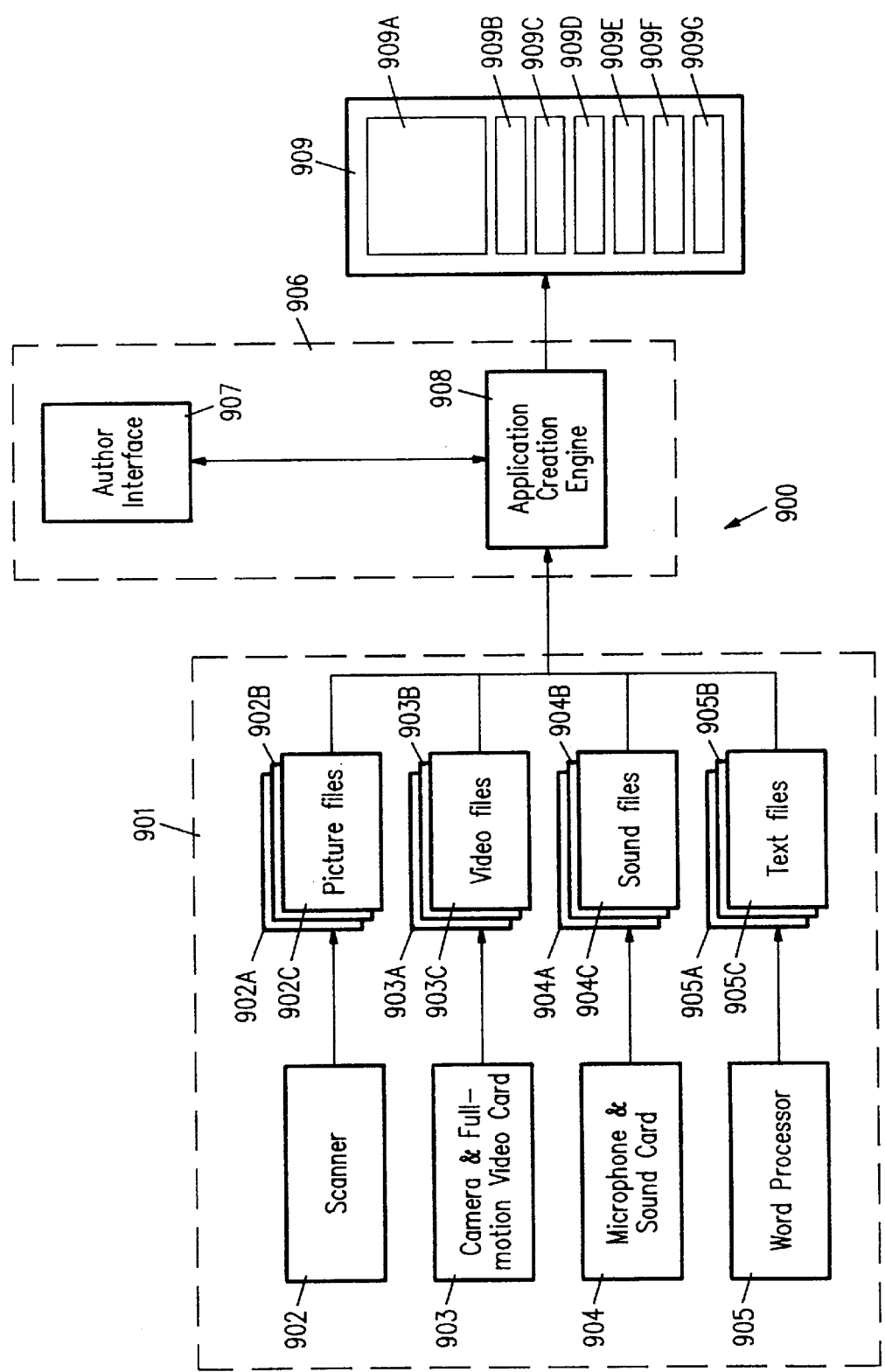
FIG. 9A is an illustrative data flow diagram for an application development system.

FIG. 9A is an illustrative data flow diagram for an interactive media application development system 900. Application development system 900 is used in accordance with a method 910 illustrated in FIG. 9B. Application development system 900 includes a data input system 901 and an application authoring system 906. Data input system 901 includes a scanner 902, a camera and full motion video card 903, a microphone and sound card 904 and a word processor 905. In one specific embodiment of this invention, application development system 900 includes an IBM PC.

In one specific embodiment of this invention an application 909 created by application creation engine 908 includes high level control logic 909A, and selections 909B, 909C, 909D, 909E, 909F and 909G all combined into a single executable image.

Figure 9B:
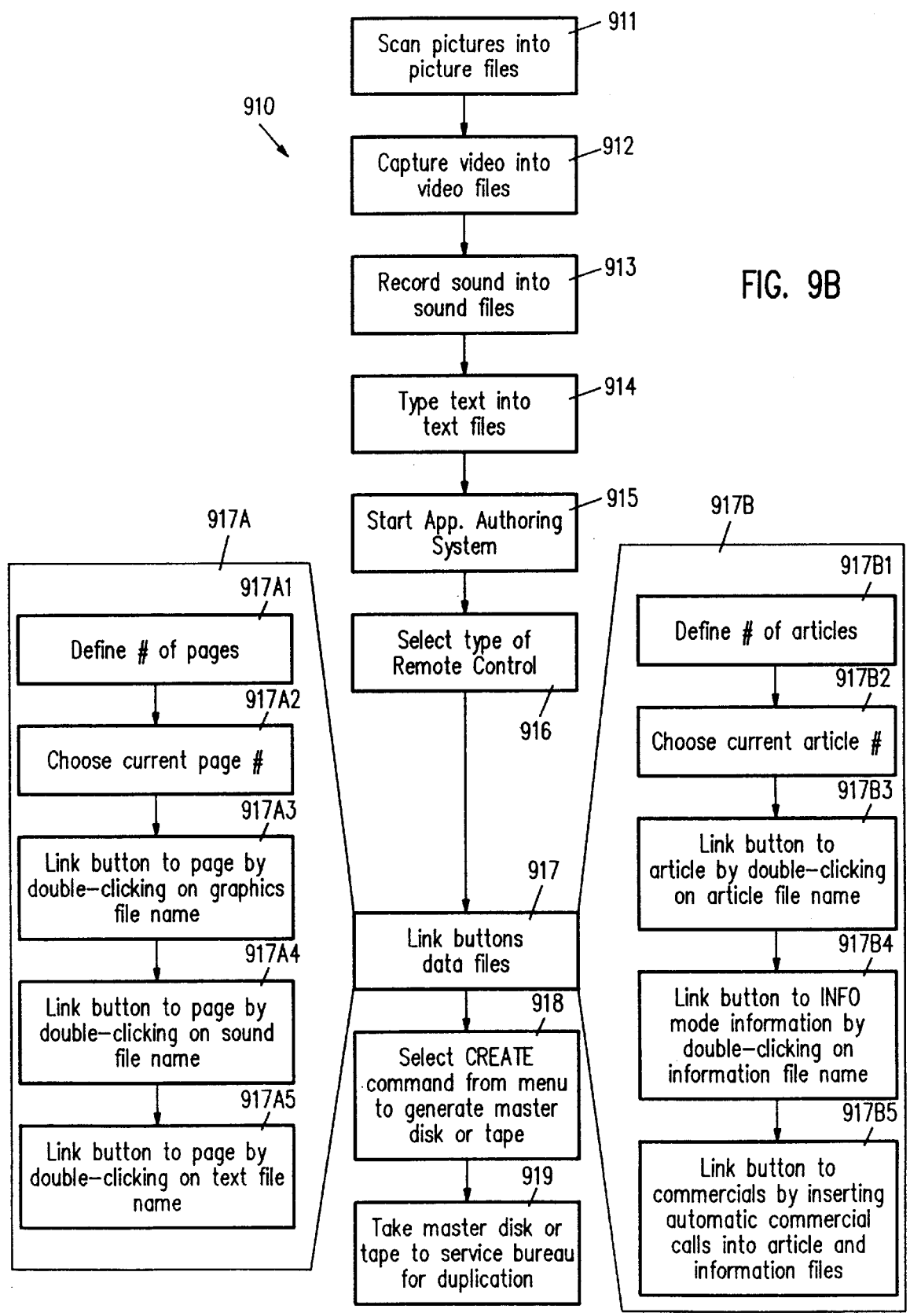
FIG. 9B illustrates a method used to develop an application for an interactive media using the development system of FIG. 9A.

To create an application 909 an author can use a scanner 902 and/or camera and full motion video card 903 and/or microphone and sound card and/or 904 and/or word processor 905 depending on the application to be created. In step 911 of method 910, the author uses a scanner 902. (FIG. 9A) to produce picture files such as picture files 902A, 902B and 902C in step 911 (FIG. 9B). Scanner 902 can be any commercially available scanner such as, HP ScanJet IIcx scanner available from Hewlett Packard Company, 16399 W. Bernardo Drive, San Diego, Calif. 92127. Scanner 902 converts color pages into digitized data for the picture files.

Next in step 912, (FIG. 9B) an author uses camera and full motion video card 903 to create video files 903A, 903B and 903C which have full motion imagery. Camera and full motion video card 903 is any commercially available video card such as, Real Magic MPEG full-motion video card available from Future Tel. Corp., (402) 522-1400, 1092 E. Arques Avenue, Sunnyvale, Calif. 94086.

Next, in step 913, an author uses microphone and sound card 904 to create sound files 904A, 904B and 904C. Microphone and sound card 904 can be any commercially available audio card such as, ProAudio Spectrum 16 audio card available from Media Vision, Inc., 47300 Bayside Parkway, Fremont, Calif. 94538. Sound card 904 digitizes and plays back sounds and voices input by an author.

Next, in step 914, the author uses a word processor 905 to create text files 905A, 905B and 905C. Word processor 905 can be any commercially available word processor such as, WordPerfect available from WordPerfect Corporation, 155 N. Technology Way, Orem, Utah 84057. Word processor 905 is used to type text content.

Files 902A, 902B, 902C, 903A, 903B, 903C, 904A, 904B, 904C, 905A, 905B, and 905C all contain digitized data which are input to application authoring system 906. Application authoring system 906 includes an author interface 907 and an application creation engine 908. Application creation engine 908 receives commands from an author via author interface 907 and uses data files 902A, 902B, 902C, 903A, 903B, 903C, 904A, 904B, 904C, 905A, 905B, and 905C from data input system 901 to create an application 909. Application 909 contains the associated electronic contents for the remote control being created.

In step 915, an author starts application authoring system 906. Then in step 916, an author selects the type of remote control to be created from a menu (not shown) which lists a single button remote control and a multiple button remote control as two choices.

Next, in step 917, an author associates the buttons on a remote control such as remote control 100 with the data files from the data input system 901 to create an application such as application 909. Step 917 is illustrated in detail for two different applications: flow chart 917A illustrates the steps to create an application for a single button remote control while flow chart 917B illustrates the steps to create an application for a multiple button remote control. Flow charts 917A and 917B are discussed in detail below.

Next in step 918 the author selects a create command from a menu (not shown) of application authoring system 906 to generate a master disk or tape which includes application 909. Then in step 919 an author delivers the master disk or tape to a service bureau for duplication. The duplicated disks or tapes containing application 909 can be encased in a holder of a remote control or alternatively, transferred to storage media connected to remote servers which permit access by users' host devices.

Figure 9C:
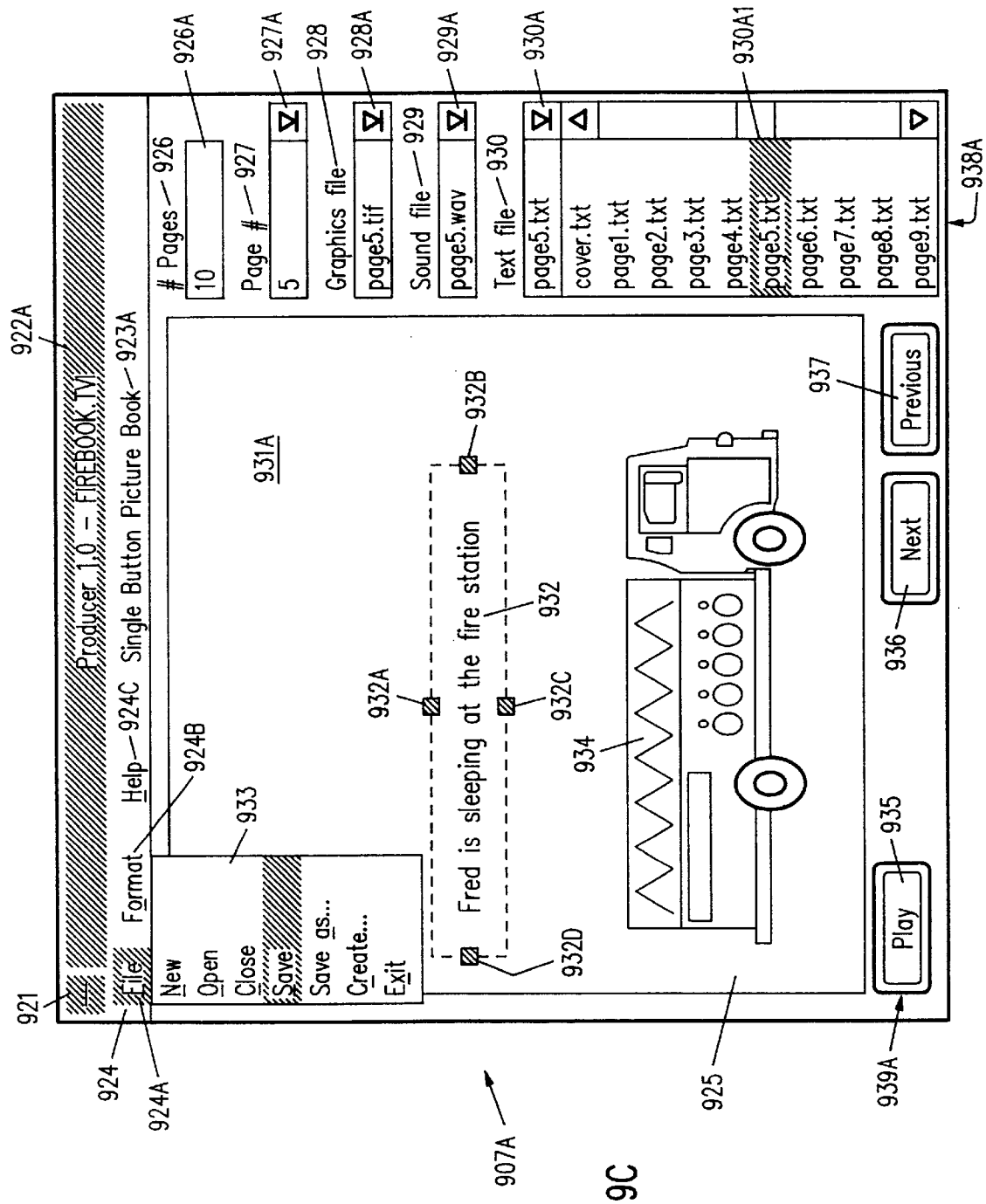
FIGS. 9C, 9D and 9E illustrate screens of an author interface used to develop an application for an interactive media in accordance with this invention.

FIG. 9C illustrates a screen 907A of author interface 907 for creating an application for a single button remote control. Initially an author selects from menu bar 924, format menu 924B. On selecting format menu 924B, a drop down list box (not shown) appears which allows an author to select one of several predetermined layouts of the function/data buttons for single or multiple button remote control. Each of these layouts can be illustrated in screen 931A when an author scrolls through the various choices. For example, the drop down list box for format menu 924B can include choices of "single button picture book remote control", "periodical remote control" and "multiple button remote control". In step 916 (FIG. 9B) the author selects the type of remote control from format menu 924B.

After selecting the layout of the function/data buttons for a remote control, an author must indicate whether to start a new remote control or to work on an existing remote control from drop down list box 933 for file menu 924A. Once a choice has been indicated in drop down list box 933, the current file directory is selected and dialog box 925 is presented to the author.

Dialog box 925 includes screen 931A, authoring boxes 938A and authoring buttons 939A. Dialog box 925 follows the well known design conventions for Microsoft Windows and for the Apple MacIntosh. In the top left corner, dialog box 925 has a system bar 921 which allows an author to exit author interface 907 by double clicking. Furthermore, dialog box 925 has adjacent to system bar 921, a title bar 922A which shows the name of the application being created. Just below title bar 922A in menu bar 924 is presented current book format 923A "Single Button Picture Book" (as soon as the author makes a selection in format menu 924B).

Dialog box 925 also includes a set of authoring boxes 938A (at the right side of FIG. 9C). Authoring box set 938A includes prompt legends 926, 927, 928, 929 and 930 and corresponding input boxes 926A, 927A, 928A, 929A and 930A. Box 927A is a drop down list box which lists all of the valid page numbers available for the current book. Furthermore, boxes 928A, 929A and 930A are drop down list boxes which contain the lists of graphics files, sound files and text files respectively.

In one specific embodiment of this invention, picture files 902A, 902B, and 902C are named with the extension .TIF, sound files 904A, 904B and 904C have the extension .WAV and text files 905A, 905B and 905C have the extension .TXT. Once a valid set of data files are displayed in a drop down list box, an author can select a particular entry in the box by double clicking on the entry. For example, in drop down list box 930A, to select text file "page5.txt" the author double clicks on entry 930A1 as shown in FIG. 9C.

In step 917A1 (FIG. 9B) an author specifies the number of pages for a picture book remote control application in input box 926A. In step 917A2, an author chooses the current page to be worked on in box 927A. Box 927A displays all of the valid pages which can be programmed for the picture book remote control such as, a front cover, page 1, page 2, page 3, and back cover. In one embodiment of this invention, when an author selects the current page of the application to be worked on, that page is automatically associated with the single button of the remote control.

In step 917A3, an author associates the single button of the remote control and associated current page to a graphic file containing the image to be displayed in the current page by double clicking on the graphics file in box 928A. Then in step 917A4, an author associates the single button and the current page to a sound file containing an audio recording to be displayed in the current page by double-clicking on the sound file in 929A. Finally, in step 917A5, an author associates the single button and the current page to a text file by double-clicking on the text file in box 930A.

For example, if a ten page picture book remote control application is to be created, an author types the number 10 in box 926A, and to work on page 5 the author double clicks on the number 5 in box 927A.

Once a data file has been associated with the current page the data file can be accessed through screen 931A (FIG. 9C). For example, as soon as a graphics file is selected in window 928A, the graphics data are displayed on edit screen 931. As another example, when a text file is selected in window 930A, the text file is displayed (overlapping the graphics in the same screen 931A). In one specific embodiment of this invention, the text 932 from text file 930A1 can be moved or the size changed using "handles" 932A, 932B, 932C and 932D in the conventional manner established for Microsoft Windows and for Apple MacIntosh. For example, to move text 932, the cursor is positioned on text 932 and the left mouse button is held down while a mouse (such as mouse 129) is moved.

Also included in dialog box 925 are preview buttons 939A, which include Play button 935, Next button 936 and Previous button 937. Play button 935 displays the sound file associated with the current page. In the example of FIG. 9S, selecting Play button 935 causes the sound file "page5.wav" to be displayed through the speaker/headphone (not shown). Next button 936 and previous button 937 permit an author to move to another page such as the next page or the previous page of the current application.

The application for a single button picture book remote control created by method 910 (FIG. 9B) results in an interactive media in which the pages are arranged in a specific sequential order. The pages are retrieved and displayed sequentially on the receipt of a wireless signal from the button on the remote control. Therefore, although a single button is linked to all pages, an application retrieves and displays only the next page in sequential order after the current page when a button code is received.

In one embodiment of this invention, an application 549 for picture book remote control 100 can be authored as follows. The cover and inside pages of an existing children's book can be scanned and each page graphic saved in a separate file having the extension "TIF", such as, for example "COVER.TIF", "PAGE1.TIF", "PAGE2.TIF", and "PAGE10.TIF". Next the text on each of the pages of the children's book can be read by the author and recorded with each voice recording being stored in a separate file, having the extension "WAV" such as, for example "COVER.WAV", "PAGE1.WAV", "PAGE2.WAV" and "PAGE10.WAV".

Files COVER.TIF, COVER.WAV, PAGE1.TIF, PAGE 2.WAV, PAGE 10.TIF and PAGE 10.WAV from the above steps can be used to create the application by using Compel, a commercial business presentation software published by Asymetrix Corporation of 110–110th Avenue, NE Suite 700, Bellevue, Wash. 98004.

Compel has a menu driven interface. To create an application 549, a blank slide is first created using various Compel menus and dialog boxes. For example, Compel dialog box "Effects" is used to choose "Slide Media Links" which is a pull down menu in Compel. Then "Trigger Event" is chosen which is a pull down scroll box and in menu Trigger Event, the action "Leave Slide" is chosen. When an action is chosen, a pull down scroll box is displayed containing all the data files. One of these files called "Page 2.WAV" can be then selected. Then the Import Graphic Command is used to select "Page 2.TIF" to insert a graphic image on the blank slide. For a cover, Compel "import" and "graphic" menu boxes are used to place a "COVER.TIF" graphic on top of the very first blank slide.

Compel automatically advances to the next slide after a trigger event "leave slide" which causes an associated sound recording to be displayed. To display the same graphics after displaying a sound recording, the first slide is duplicated as a second slide. The action "do nothing" is specified for all trigger events for the (duplicated) second slide.

Therefore every page of an interactive media displayed to the user requires two slides. So a third slide can be then opened and the next page's graphic "PAGE1.TIF" placed on the third slide. Then the sound file "PAGE1.WAV" can be associated to the third slide. In this manner all of the graphics files and all of the sound files can be linked to corresponding pairs of slides in the desired sequential order, the first slide of each pair being associated with a sound file and the second slide of each pair having the same graphic as the first slide of the pair.

When application 549 is completed, the application can be saved in a file called "FIREBOOK.CPL". The "FIREBOOK.CPL" and a run-time version of the Compel program (henceforth "compel application") can be transferred to a storage media such as CD-ROM compatible write once optical disk. The transfer can be done by a Sony CD Recording Unit CDW-900E available from Sony Electronics, Inc., 3300 Zanker Road, San Jose, Calif. 95134.

A compel application, when started up and prompted with "FIREBOOK" responds to a button code from the remote control. In particular, the compel application causes advancing of each slide on receipt of a left mouse button code from a remote control. Therefore if a left mouse button code is received by compel application during display of the first slide, compel application exits the first slide and while exiting displays the sound file associated with the first slide. Then compel application displays the second slide (which has a graphic identical to the graphic of the first slide). If a left mouse button is received during display of the second slide, compel application exits the second slide and immediately displays the third slide.

After displaying the last slide of a selection, compel application re-displays the first slide on receipt of a left mouse button code. Although the left mouse button code is used in one embodiment of an application for a picture book remote control, other applications can use other button codes such as scan codes for F1 key or enter key in accordance with this invention. The file name of an application such as FIREBOOK.EXE can be included in a file such as DISGO-.BAT 430 (FIG. SE).

In an alternative embodiment of this invention, a storage media can be used with a host device not configured with the autostart driver by the user manually issuing the command COMPEL X:FIREBOOK wherein X denotes the peripheral containing the inserted storage media.

While in one embodiment of this invention, the Compel application was used, a programmer skilled in the art can create such an application or other compatible applications using a programming language (such as C) and associated development systems for an IBM compatible PC or an Apple Macintosh. A programmer can also create similar applications by using software development systems available from video game machine manufacturers such as Sega, Nintendo and 3DO.

An application which maps every page to the same button and which allows sequential access of the pages is well suited for a children's picture book remote control such as picture book remote control 100.

An application for random access of articles for a multiple button remote control can be created by associating buttons to different articles. One such application for a periodical remote control is illustrated in FIG. 8C.

To create an application for a periodical remote control, an author selects "periodical remote control" from format menu 924B. Then an author either starts a new periodical remote control application or opens an existing periodical remote control application from file menu 924A.

Figure 9D:
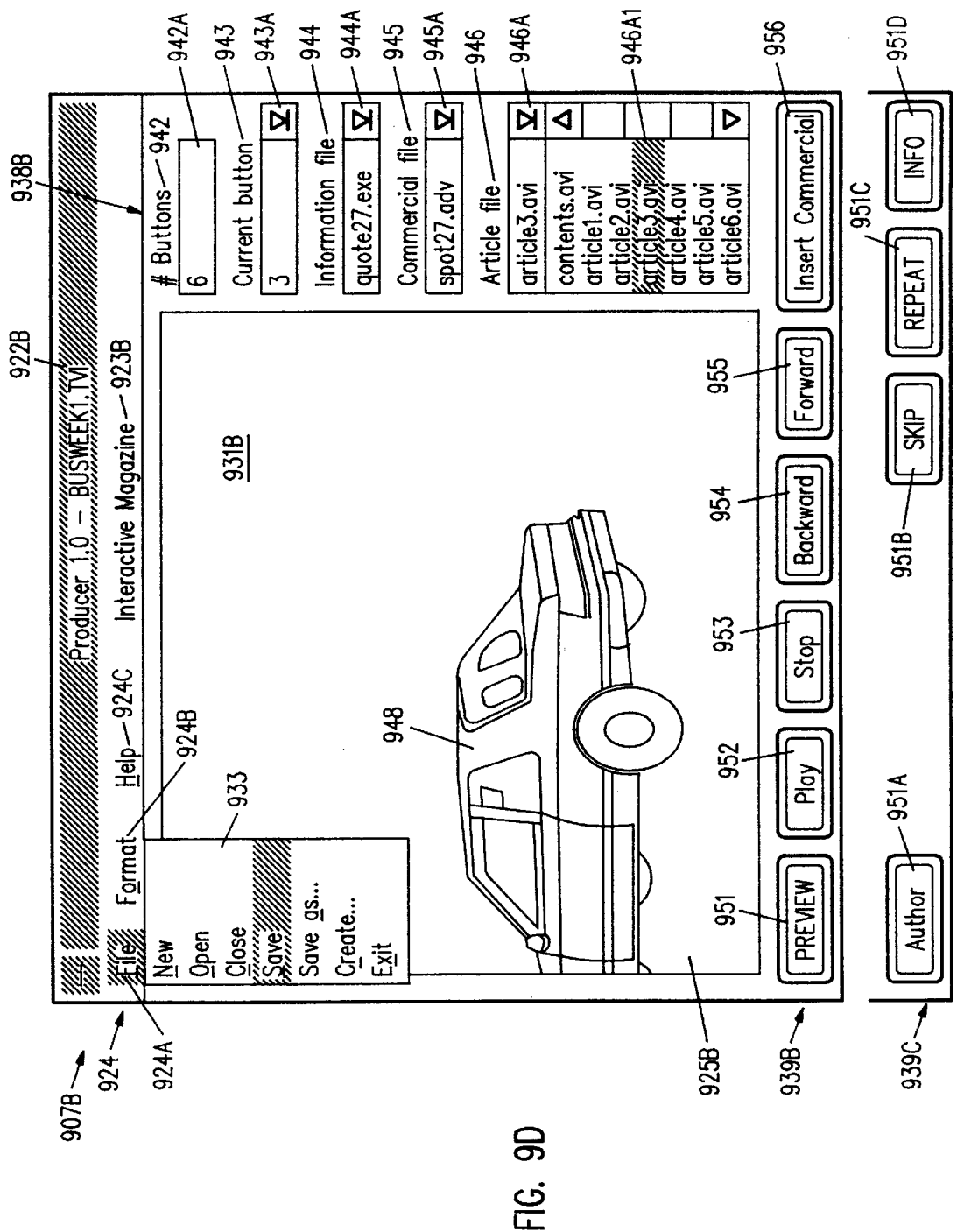

FIG. 9D illustrates a screen 907B of author interface 907 for creating an application for a periodical remote control. Authoring buttons 938B for a periodical remote control include #Buttons legend 942, Current button legend 943, Information file legend 944, Commercial file legend 945, Article file legend 946 and corresponding input boxes 942A, 943A, 944A, 945A and 946A. An author specifies the number of article selections in input box 942A, in step 917B1 (FIG. 9B).

Using the number of article selections, an author can choose one layout from several preprogrammed layouts for the buttons of a periodical remote control. For example, to create a six-selection remote control, an author types in the number "6" in the input box 942A.

Next in step 917B2 the author chooses a button to be worked on from drop down list box 943A. Each button number uniquely identifies the location of a button on a layout for a remote control which is displayed to the author on screen 931 (not shown). For example, to work on article 3, an author double clicks on the number "3" in the box 943A.

Next in step 917B3 the author associates the video recording article file that will be displayed with the corresponding button on the remote control by double clicking on the desired article file such as "article3.AVI" 946A1 in box 946A. A video recording article preview file is associated with a corresponding button on the remote control by single clicking on the desired article preview file such as "contents.avi."

In one embodiment of this invention, a DETAIL mode file can be associated with an article selection or a commercial selection. The DETAIL mode file is displayed when a user touches button INFO 645D during the display of a commercial selection or an article selection.

Information box 944A lists choices of DETAIL mode files which can be associated with article and/or commercial selections. For example, file "quote27.exe" can be associated with an article selection by clicking on a desired article selection such as "article3.avi", and then double clicking on file "quote27.exe". Alternatively, DETAIL mode file "quote27.exe" can be associated with a commercial selection such as "spot27.adv" by first clicking on the commercial selection in box 945A and then double clicking on the DETAIL mode file.

Multiple levels of DETAIL can be setup by associating a DETAIL mode file to a lower level DETAIL mode file until the lowest level DETAIL mode file is reached and the lowest level DETAIL mode file is associated with the article selection or the commercial selection from which the DETAIL mode was originally entered. For example, an author clicks on "quote 27.EXE" in 944A and then while holding down the CTRL key, double clicks on "ORDER27.EXE" in 944A. In accordance with this invention, DETAIL mode files can be full motion video, and/or text and/or graphics and/or computer programs.

In FIG. 9D, screen 931B, an edit screen, shows the first frame of the current video article "article3.AVI". Dialog box 925B includes authoring buttons 939B which include PREVIEW button 951, Play button 952, Stop button 953, Backward button 954, Forward button 955 and Insert Commercial button 956.

When Play button 952 is clicked by an author, the current article, commercial or DETAIL mode file is displayed on screen 931B. When Stop button 953 is clicked, the display of current video and/or and audio recording selection is frozen. When Backward button 954 or the Forward button 955 are clicked, the video and/or audio recording is rewound or advanced respectively. The rate of video advance and rewind starts and runs very slowly. The rate of video advance accelerates when the mouse button is held down for an extended period of time.

When Insert Commercial button 956 is clicked during display of an article selection, a function call (or a tag) for an automatic commercial call is inserted at the current position in the article selection "article3.AVI."

In an alternative embodiment of this invention, an author can insert selected commercials into an article selection (rather than calls to display a random commercial). The available commercials are listed in Commercial file box 945A and selected by double-clicking a commercial selection in box 945A immediately after inserting a function call (or a tag).

When the Preview button 951 is clicked, author interface 907 switches from editing mode to a preview mode which allows an author to "test drive" the current periodical remote control. Authoring buttons 939B are replaced with preview buttons 939C which include Author button 951A, SKIP button 951B, REPEAT button 951C and INFO button 951D.

When Author button 951A is clicked, screen 931 returns to the editing mode.

To preview the periodical remote control after entering the preview mode an author double clicks on a file name 946A1 in Article File box 946A. Article selection "article 3.avi" 946A1 will play in screen 931 with automatic commercials being called when appropriate, as if a user had touched button 3. INFO button 951D, SKIP button 951B and REPEAT button 951C function in the manner specified above in reference to periodical remote control 640.

Figure 9E:
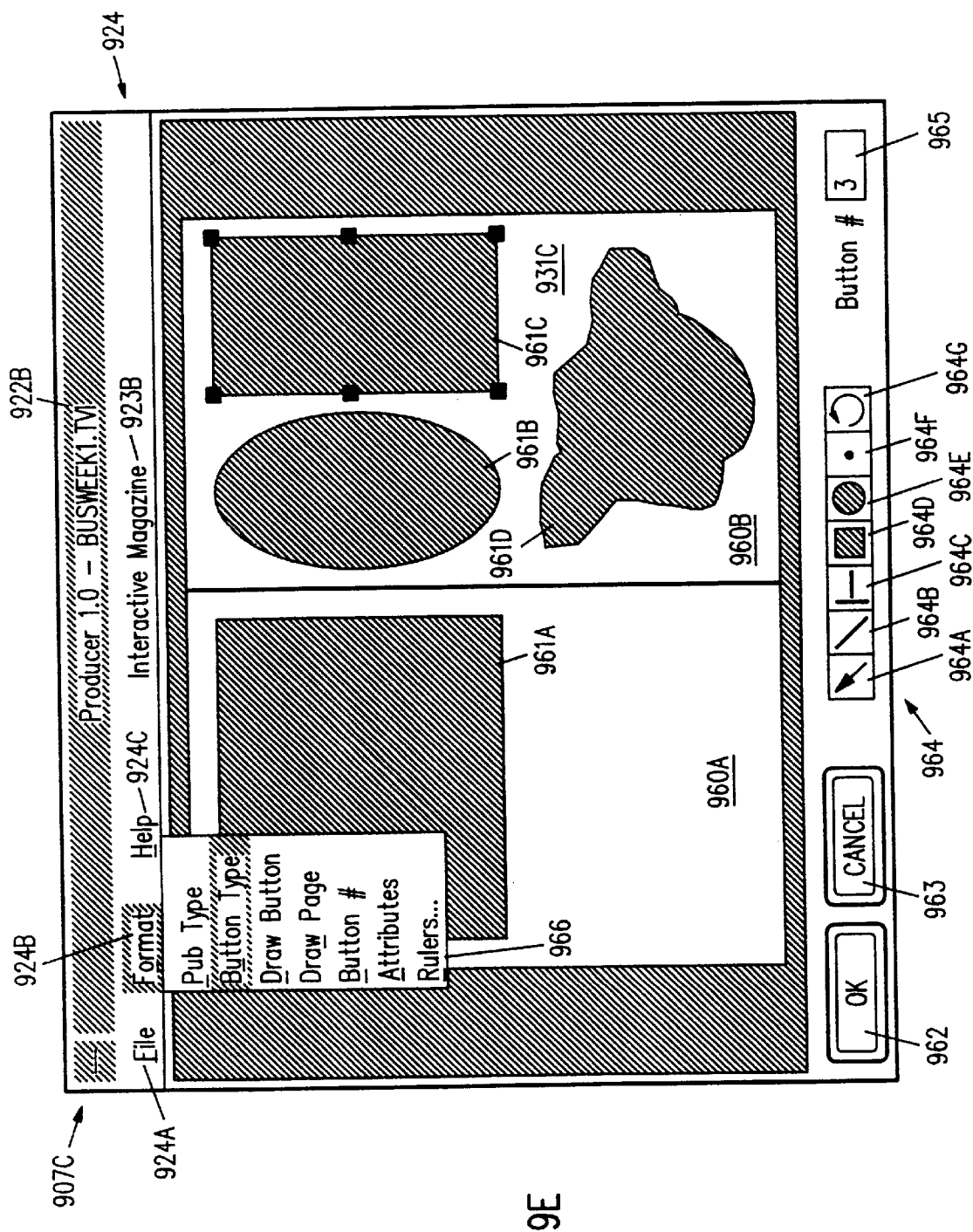

FIG. 9E illustrates a screen 907C of author interface 907 for creating an application for use with a touch panel remote control. Format menu 924B includes choices (Pub. Type, Button Type, Draw Button, Draw Page, Button #, Attributes, and Rulers) in a drop down list box 966. An author can specify arbitrary shaped buttons on a touch panel remote control by selecting "Draw Button" in drop down list box 966 for the format menu 924B.

Then screen 931C displays two pages 960A and 960B. The author then chooses Draw Page from drop down list box 966 of format menu 924B to define the size and shape of the magazine page as well as the buttons. The author then selects one of tools 964A, 964B, 964C, 964D, 964E, 964F and 964G from the button drawing tool list 964. For instance, an author selects the box tool 964D to draw button 961A on screen 960A and button 961C on 960B. On drawing the periphery of a button the author interface 907C prompts the author to specify a button number in input box 965 before proceeding to draw the periphery of another button. Button 961B is drawn with a circular drawing tool 964E while the button 961D is drawn with a free form drawing tool 964F. Selection tool 964A can be used to reposition a button while rotation tool 964G can be used to rotate the button.

When an author has completed drawing of all of the buttons on a touch panel, the author then clicks the OK button 962 to save the current configuration of buttons on a touch panel. Alternatively, clicking on CANCEL button 963 aborts any changes made during the current drawing session.

Figure 9F:
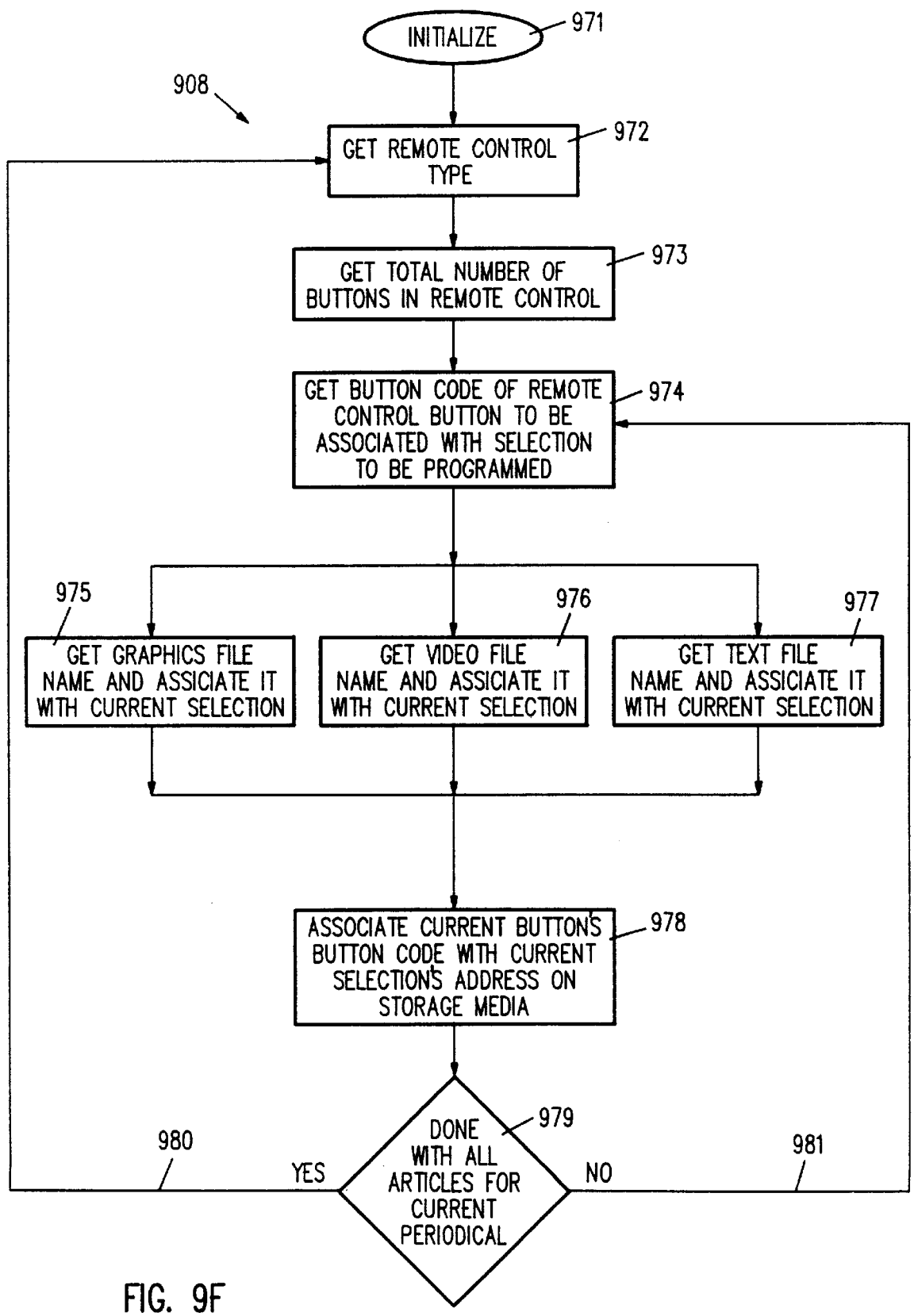
FIG. 9F is an illustrative flow chart for the application creation engine shown in FIG. 9A.

FIG. 9F is an illustrative flow chart for application creation engine 908 of FIG. 9A. Application creation engine 908 initializes variables in step 971 and goes to step 972 where it gets the remote control type-from the author (in format menu 924B). Then application creation engine 908 goes to step 973 where it gets the total number of selections in the remote control application being created (in input box 942A of FIG. 9D). Next in step 974, application creation engine 908 gets the button code of the function/data button which is to be associated with current selection being programmed (in input box 943A).

In one embodiment of this invention, an author needs to merely enter the total number of selections and the number of selections automatically indicates the preselected layout. In such an embodiment, selecting a button number in input box 943A indicates the location of the button and also a unique button code to be encoded in a wireless signal identifying the selected button.

In step 975, application creation engine 908 gets a graphics file name and associates the graphics file with the current selection. In step 976, application creation engine 908 gets the video file name and associates the video file with the current selection. In step 977, application creation engine 908 gets the text file name and associates the text file with the current selection. Steps 975, 976 and 977 are optional steps which can be executed in any order by an author. However, at least one of steps 975, 976, and 977 must be executed before proceeding to next step 978.

In step 978, application creation engine 908 associates the button code of the currently selected button with the memory address of the selection formed by the preceding steps 975 and/or 976 and/or 977. In one embodiment, application creation engine 908 stores the button code in the selection data storage location which is offset from the selection's beginning memory address by a predetermined amount of offset. As noted above, such storage allows the selection associated with a button code to be identified by an application.

Finally in step 979, application creation engine 908 checks to see if all of the selections for the current interactive media have been associated with the respective button codes. If all of the selections have been associated, the current application is finished and application creation engine 908 goes from step 979 via branch 980 back to step 972 to get the next remote control type. If not all of the selections for the current remote control have been programmed, application creation engine 908 goes from step 979 via branch 981 to step 974 where it gets the button code of the next button.

One advantage of the remote control application authoring system and method described above is simplicity, which allows anyone to author an application for an interactive media with minimal training. The above procedure is also less labor intensive with the resultant cost savings and allows rapid prototyping with short time to market.

A remote control in accordance with this invention improves a user's interaction with interactive media for a number of reasons. One is interactive media is easier to produce because this invention makes it easy to repurpose existing non-interactive media into interactive media. For example, a normal children's printed book, such as a picture book, can be made interactive by simply scanning pages of the book and then recording and saving the pages into graphic files and then recording text audio for the text on each page into voice recording files. Such a remote control allows the child to simply push a button to read the book on a television, a page at a time. For example, a thousand Disney titles can be taken and repurposed virtually overnight into interactive media. Interactive media is also made easier to sell or market because the remote control looks like non-interactive media in the store so a publisher can sell the remote in normal conventional bookstores or for example in the case of a disk video CD or audio CD in normal record stores in normal record stores like Blockbuster video. Interactive media is also easier to use with the remote control because the interactive media still feels like normal TV or normal book or normal magazine rather than like computer software. Normal computer software is difficult because software requires the use of a mouse and double clicking and icons and typing commands and some minimal computer skills which can be roadblocks to people who never used computers. In the case of a printed publication remote control, a user does exactly what the user does with a normal book. The user opens a book and the user looks at the table of contents and the user says to himself or herself touching the picture, "This is what I want to watch." The TV program that the user just selected is then shown on the TV or the CD audio selection that the user wants to listen to is played as soon as the user touches the title. The user never needs to think about what to do. In all cases, the remote allows the user immediate access to interactive media without having to read the manual.

A data button remote control looks like a normal remote control but has different buttons for example MARS, EARTH and PLUTO. Where as conventional computer game remote controls require that the user first read the manual, with a remote control in accordance with this invention it is not necessary to read the manual to understand what the controls do, what the remote control does. The user doesn't have to remember the instructions. A remote control in accordance with this invention relates in an intuitive way to the user, because the buttons on the remote control can be optimized for each game (rather than be universal) and different for each game (rather than requiring the user to remember that a button C for example causes one thing for one game and the same button C causes the game to quit for another game).

It is to be understood that the above description is intended to be illustrative and not restrictive. Many variations of the invention will become apparent to those of skill in the art upon review of this disclosure. For example, a video cassette recorder (VCR) tape can be used as the storage media and data buttons can be supported on the VCR tape housing for remotely selecting movies encoded in the VCR tape. One embodiment of a printed publication remote control can be similar to a restaurant menu for purchasing various dishes. Another embodiment of a printed publication remote control can be an information brochure such as a product brochure and a company brochure. Yet another embodiment of a printed publication remote control can have the appearance of a picture post card. A remote control in accordance with this invention can have the appearance of a conventional TV program guide, or a conventional newspaper and need not contain a storage media (i.e. in the form of a printed publication remote control).

Although the remote control embodiments have been shown with a number of data buttons for accessing certain selections and/or a number of function buttons for implementing functions, any types of buttons having any attributes of data and/or function can be built into a remote control in accordance with this invention.

Moreover, associations between button codes and selections can be implemented as a table of pointers, with the button code as the index into the table and the pointers being addresses of the selections on the storage media. Alternatively, the associations can be implemented using other data structures such as linked lists which are well known to a person of skill in the art.

The scope of this invention is limited only by the appended claims.

What is claimed is:

1. A method of operating a computer to display a commercial selection and to send a purchase order, said computer having at least a processor, a monitor and a signal receiver, said method comprising:

displaying one or more articles on said monitor;

displaying on said monitor said commercial selection automatically inserted by said computer during said display of said one or more articles;

using said signal receiver, to sense a wireless signal encoded with a button code from a remote control during said displaying of commercial selection; and sending a purchase order to an advertiser of said commercial selection after receipt of said button code.

2. The method of claim 1 further comprising a step of choosing said commercial selection at random from a plurality of commercial selections prior to said displaying step.

3. The method of claim 1 wherein said commercial selection includes a video recording and said step of displaying comprises showing said video recording on said monitor.

4. The method of claim 1 further comprising filling in a credit card number in said purchase order.

5. The method of claim 1 further comprising displaying a message on said monitor requesting entry of a password.

6. The method of claim 1 further comprising displaying a form on said monitor.

7. The method of claim 1 wherein said step of sending comprises using a modem.

8. The method of claim 1 wherein said step of sending comprises faxing.

9. The method of claim 1 further comprising displaying on said monitor detailed information advertised in said commercial selection in response to a wireless signal encoded with another button code, wherein said detailed information is about a product or service.

10. The method of claim 9 wherein said detailed information includes price.

11. The method of claim 9 wherein said detailed information includes information on a shop.

12. The method of claim 1 further comprising displaying on said monitor a message requesting entry of at least one attribute advertised in said commercial, wherein said at least one attribute is of a product or service.

13. The method of claim 1 further comprising displaying on said monitor an index of advertisers.

14. The method of claim 1 wherein said computer includes a battery for protecting against loss of information stored in memory, and the method further comprises using a credit card number from the memory.

15. The method of claim 1 comprising repeatedly displaying different commercials on said monitor.

16. The method of claim 1 wherein said processor executes an application during said of displaying.

17. The method of claim 1 further comprising using a telephone to communicate with said advertiser.

18. The method of claim 1 wherein said displaying on said monitor of said commercial selection includes detecting a commercial tag.

19. The method of claim 1 wherein said sending a purchase order further includes transmitting a signal through the Internet.

20. A computer readable storage media encoded with software and configured to cause a computer that executes said software to perform the following:

display one or more articles;

automatically insert a display of a commercial selection during said display of said one or more articles;

prepare a purchase order in response to receipt of a wireless signal encoded with a button code from a remote control; and send said prepared purchase order to an advertiser of said commercial.

21. The computer readable storage media of claim 20 being encoded with a plurality of commercial selections, wherein said software when executed causes said computer to choose said commercial selection at random from said plurality of commercial selections.

22. The computer readable storage media of claim 20 wherein said commercial selection includes a video recording and said software when executed causes said computer to show said video recording on said monitor.

23. The computer readable storage media of claim 20 wherein said software when executed causes said computer to fill in a credit card number in said purchase order.

24. The computer readable storage media of claim 20 wherein said software when executed causes said computer to display a message requesting entry of a password.

25. The computer readable storage media of claim 20 wherein said software when executed causes said computer to display a form on said monitor.

26. The computer readable storage media of claim 20 wherein said software when executed causes said computer to send said prepared purchase order by facsimile.

27. The computer readable storage media of claim 20 wherein said software when executed causes said computer to send said prepared purchase order via modem.

28. The computer readable storage media of claim 20 wherein said software when executed causes said computer to display detailed information advertised in said commercial, wherein said detailed information is about a product or service.

29. The computer readable storage media of claim 20 being further encoded with a price advertised in said commercial, wherein said software when executed causes said computer to display said price and wherein said price is of a product or service.

30. The computer readable storage media of claim 20 being further encoded with a shop advertised in said commercial, wherein said software when executed causes said computer to display said shop and wherein said shop is for a product or service.

31. The computer readable storage media of claim 20 wherein said display of commercial selection further includes detection of a commercial tag.

32. The computer readable storage media of claim 20 wherein said prepared purchase order is transmitted through the Internet.

33. A computer system comprising:
- a signal receiver capable of receiving a signal from a remote control;
- means for displaying one or more articles, said means for displaying being operatively coupled to said signal receiver;
- means for automatically inserting a display of a commercial selection during a display of said one or more articles, said means for automatically inserting being operatively coupled to said means for displaying;
- means for preparing a purchase order in response to receipt of said signal, said means for preparing being operatively coupled to said signal receiver and to said means for displaying; and
- means for sending a prepared purchase order to an advertiser indicated by said commercial selection, said means for sending being operatively coupled to said means for preparing.

34. The computer system of claim 33 further comprising means for choosing said commercial selection at random from a plurality of commercial selections.

35. The computer system of claim 33 wherein said means for preparing comprises means for automatically filling in a credit card number in said purchase order.

36. The computer system of claim 35 further comprising a memory card coupled to a battery for protecting against loss of memory, said memory card being coupled to said means for preparing, and wherein said means for preparing further comprises means for retrieving a credit card number from said memory card, and further wherein said means for preparing automatically fills in the credit card number retrieved by said means for retrieving.

37. The computer system of claim 33 wherein said means for preparing comprises means for displaying a message requesting entry of a password.

38. The computer system of claim 33 further comprising means for displaying detailed information about a product or service advertised in said commercial selection in response to receipt of an another signal by said signal receiver, said means for displaying detailed information being operatively coupled to said signal receiver and said means for displaying a commercial selection.

39. The computer system of claim 33 further comprising means for displaying a message requesting entry of attributes of a product or service advertised in said commercial selection in response to receipt of an another signal, said means for displaying a message being operatively coupled to said signal receiver and to said means for displaying a commercial selection.

40. The computer system of claim 33 wherein said means for sending comprises a modem.

41. The computer system of claim 33 wherein said means for sending comprises a fax card.

42. The computer system of claim 33 wherein said means for displaying a commercial selection further includes means for detecting a commercial tag.

43. The computer system of claim 33 wherein said means for sending a prepared purchase order further includes means for transmitting orders through the Internet.

44. A method of operating a computer to display a commercial selection and to send a purchase order, said computer having at least a processor and a monitor, said method comprising:
- displaying information on said monitor;
- automatically detecting, during said displaying, a tag in said information, said tag indicating a commercial to be displayed;
- automatically inserting said commercial to be displayed on said monitor during displaying of said information; and
- sending a purchase order to an advertiser indicated in a commercial selection selected by a user.

45. The method of claim 44 further includes selecting a commercial at random from a plurality of commercial selections.

46. A computer readable storage media encoded with software and configured to cause a computer that executes said software to perform the following:
- display one or more articles;
- automatically detect, during said display, a tag indicating a commercial to be displayed;
- automatically insert said commercial to be displayed during display of said one or more articles; and
- send a purchase order to an advertiser indicated in a commercial selection selected by a user.

47. The computer readable storage medium of claim 46 wherein the computer is programmed to perform the following during automatic detection:
- select a commercial at random from a plurality of commercial selections.

48. A computer system comprising:
- logic for displaying one or more articles;
- logic for automatically detecting a tag indicating a commercial to be displayed;
- logic for automatically inserting said commercial to be displayed during displaying of said one or more articles; and
- logic for sending a purchase order to an advertiser indicated in a commercial selection selected by a user.

49. The computer system of claim 48 wherein said logic for automatically detecting further includes logic for selecting a commercial at random from a plurality of commercial selections.

* * * * *